(12) United States Patent
Ramanujan et al.

(10) Patent No.: US 10,728,149 B1
(45) Date of Patent: Jul. 28, 2020

(54) PACKET REPLICATION ROUTING WITH DESTINATION ADDRESS SWAP

(71) Applicant: Architecture Technology Corporation, Eden Prairie, MN (US)

(72) Inventors: Ranga S. Ramanujan, Medina, MN (US); Benjamin L. Burnett, Prior Lake, MN (US); Barry A. Trent, Chanhassen, MN (US); Jafar Al-Gharaibeh, Bloomington, MN (US)

( * ) Notice: Subject to any disclaimer, the term of this patent is extended or adjusted under 35 U.S.C. 154(b) by 0 days.

(21) Appl. No.: 15/593,883

(22) Filed: May 12, 2017

Related U.S. Application Data

(62) Division of application No. 14/613,894, filed on Feb. 4, 2015, now abandoned.

(60) Provisional application No. 61/935,661, filed on Feb. 4, 2014.

(51) Int. Cl.
*H04W 40/26* (2009.01)
*H04L 12/741* (2013.01)
*H04L 12/707* (2013.01)
*H04L 12/771* (2013.01)
*H04L 12/933* (2013.01)

(52) U.S. Cl.
CPC ............ *H04L 45/745* (2013.01); *H04L 45/24* (2013.01); *H04L 45/56* (2013.01); *H04L 49/109* (2013.01)

(58) Field of Classification Search
CPC .................................................. H04W 40/26
See application file for complete search history.

(56) References Cited

U.S. PATENT DOCUMENTS

| | | | |
|---|---|---|---|
| 5,115,433 A * | 5/1992 | Baran | ................ H04L 45/04 370/400 |
| 6,658,481 B1 | 12/2003 | Basso et al. | |
| 6,985,476 B1 | 1/2006 | Elliott et al. | |
| 7,317,733 B1 | 1/2008 | Olsson et al. | |
| 9,225,637 B2 | 12/2015 | Ramanujan et al. | |
| 2001/0027484 A1 | 10/2001 | Nishi | |
| 2003/0046390 A1 | 3/2003 | Ball et al. | |
| 2003/0112808 A1 | 6/2003 | Solomon | |
| 2003/0125028 A1 | 7/2003 | Reynolds | |
| 2004/0032873 A1 | 2/2004 | Basso et al. | |

(Continued)

OTHER PUBLICATIONS

U.S. Patent and Trademark Office, "Office Action", U.S. Appl. No. 15/425,364, Mar. 16, 2018, pp. 1-13.

(Continued)

*Primary Examiner* — John D Blanton
(74) *Attorney, Agent, or Firm* — Carlson, Caspers, Vandenburgh & Lindquist, P.A.

(57) ABSTRACT

A method of routing a packet from a routing device includes receiving a first packet having a first header and a first data field. The first header has a final destination corresponding to a destination device communicatively coupled to the routing device via at least two parallel network links. A second packet having a second header and a second data field is sent over the first network link. The second data field is identical to the first data field. A destination address in the second header corresponds to a device on a first of the parallel network links. A third packet having a third header and a third data field is sent over the second network link. The third data field is identical to the first data field. a destination address in the third header corresponds to a device on a second of the parallel network links.

20 Claims, 65 Drawing Sheets

(56) References Cited

U.S. PATENT DOCUMENTS

| | | | |
|---|---|---|---|
| 2006/0187858 A1 | 8/2006 | Kenichi et al. | |
| 2008/0049641 A1 | 2/2008 | Edwards et al. | |
| 2010/0061231 A1 | 3/2010 | Harmatos et al. | |
| 2010/0142395 A1 | 6/2010 | Yasuie et al. | |
| 2010/0235514 A1 | 9/2010 | Beachem | |
| 2010/0268935 A1 | 10/2010 | Rodgers et al. | |
| 2010/0329270 A1 | 12/2010 | Asati et al. | |
| 2011/0075552 A1* | 3/2011 | Mitsumori | H04L 49/30 370/218 |
| 2011/0125921 A1 | 5/2011 | Karenos et al. | |
| 2011/0211463 A1* | 9/2011 | Matityahu | H04L 43/028 370/252 |
| 2012/0063316 A1 | 3/2012 | Ghanwani et al. | |
| 2012/0082073 A1 | 4/2012 | Andreasen et al. | |
| 2012/0106566 A1 | 5/2012 | Zarrabi et al. | |
| 2012/0327811 A1 | 12/2012 | Nozaki | |
| 2013/0215810 A1 | 8/2013 | Wang et al. | |
| 2014/0105033 A1* | 4/2014 | Vasseur | H04L 45/24 370/248 |
| 2014/0348024 A1 | 11/2014 | Mishra et al. | |
| 2014/0363152 A1* | 12/2014 | Hironaka | H04Q 1/0005 398/5 |
| 2014/0369489 A1 | 12/2014 | Ermann et al. | |
| 2015/0010002 A1 | 1/2015 | Duda et al. | |
| 2015/0124586 A1 | 5/2015 | Pani | |
| 2015/0215210 A1* | 7/2015 | Shen | H04L 47/125 370/235 |
| 2015/0257081 A1 | 9/2015 | Ramanujan et al. | |
| 2015/0318911 A1 | 11/2015 | Samios | |
| 2016/0255667 A1 | 9/2016 | Schwartz | |

OTHER PUBLICATIONS

U.S. Patent and Trademark Office, "Examiner Interview Summary", U.S. Appl. No. 15/253,173, dated Sep. 19, 2018, pp. 1, 2.

U.S. Patent and Trademark Office, "Examiner Interview Summary", U.S. Appl. No. 15/425,364, dated Jul. 31, 2018, pp. 1-3.

U.S. Patent and Trademark Office, "Final Office Action", U.S. Appl. No. 15/253,173, dated Sep. 19, 2018, pp. 1-17.

U.S. Patent and Trademark Office, "Final Office Action", U.S. Appl. No. 15/425,364, dated Sep. 10, 2018, pp. 1-11.

U.S. Patent and Trademark Office, "Office Action", U.S. Appl. No. 15/425,364, dated Apr. 26, 2019, pp. 1-20.

"Airborne Network Laydown", Final Report, ATC-NY, pp. 1-116, Jun. 30, 2009.

"Internet Protocol, DARPA Internet Program Protocol Specification", Sep. 1981, pp. 1-50, USA.

"OSPF Design Guide", Cisco, pp. 1-55, 2005.

"Tactical Targeting Network Technology, Dynamic, Robust Waveform enabling NetCentric Communications for Today's Warfighter", Rockwell Collins, pp. 1-8, 2009, USA.

"Talk II—SINCGARS, Multiservice Communications Procedures for the Single-Channel Ground and Airborne Radio System", Marine Corps, pp. 1-77, May 1996.

"Transmission Control Protocol, DARPA Internet Program Protocol Specification", Sep. 1981, pp. 1-90, USA.

"Wideband Gapfiller System", GlobalSecurity.org, http://www.globalsecurity.org/space/systems/wgs.htm, pp. 1-5, Oct. 4, 2016.

Berry, et al., "PPP over Ethernet (PPPoE) Extensions for Credit Flow and Link Metrics", Internet Engineering Task Force, Feb. 2010, pp. 1-21, USA.

Burbank, Jack L. et al. "Key Challenges of Military Tactical Networking and the Elusive Promise of MANET Technology," IEEE Communications Magazine, Nov. 2006, pp. 39-45.

Chau, Chi-Kin et al. "IDRM: Inter-Domain Routing Protocol for Mobile Ad Hoc Networks," Technical Report No. 708, 2008. UCAM-CL-TR-708, ISSN 1476-2986 University of Cambridge, Jan. 2008, pp. 1-24.

Lee, Seung-Hoon, "Inter MR: Inter-MANET Routing in Heterogeneous MANETs," Proceedings of MASS' 2010, Nov. 2010, 10 pages.

Macker, Joseph P. et al. "Heterogeneous Architecture Support for Wireless Network Dynamics and Mobility," Naval Research Laboratory NRL/MR/5520-00-8513. Dec. 29, 2000, 32 pages.

Pei, Dan et al. "BGP-RCN: Improving BGP Convergence Through Root Cause Notification," Computer Networks. Sep. 28, 2004, 20 pages.

Perkins, C., "Minimal Encapsulation within IP", Internet Engineering Task Force, Oct. 1996, pp. 1-6, USA.

Pizzi, Steven V. "A Routing Architecture for the Airborne Network" MILCOM Paper Tracking Number: 248, Version 5.40. 2007 The Mitre Corporation. May 21, 2007, pp. 1-7.

Rekhter, Y. et al. "A Border Gateway Protocol 4 (BGP-4)" IETF RFC 1771, Mar. 1995, [online] [retrieved on Jul. 16, 2014], retrieved from the internet 50 pages.

Rekhter, Y. et al. "Application of the Border Gateway Protocol in the Internet" IETF RFC 1772. Mar. 1995, 19 pages.

Spagnolo, Phillip A., et al., "Boeing Quagga Software", The Boeing Company, pp. 1-32, 2006.

U.S. Patent and Trademark Office, "Office Action", U.S. Appl. No. 14/613,894, dated May 9, 2017, pp. 1-4.

U.S. Patent and Trademark Office, "Office Action", U.S. Appl. No. 14/613,894, dated Aug. 30, 2016, pp. 1-14.

U.S. Patent and Trademark Office, "Notice of Allowance", U.S. Appl. No. 15/253,173, dated Mar. 6, 2019, pp. 1-8.

* cited by examiner

```
+----------+------------------+---+--------+
|DESTINATION|LOCAL RADIO SUBNET|LQM|CAPACITY|
+----------+------------------+---+--------+
```

Figure 16

| ALIAS-TAG TABLE (HE1) | | H | L | B |
|---|---|---|---|---|
| 17.0.0.0 | 12.1.4.8 (SATCOM) | 1 | 10 | 2 |
| 17.0.0.0 | 224.1.1.1 (M-CDL1) | 1 | 2 | 6 |
| 17.0.0.0 | 224.1.1.1 (M-CDL2) | 2 | 3 | 6 |
| 17.0.0.0 | 10.71.103.2 (TTNT) | 2 | 3 | 7 |
| 0.0.0.0 | 17.0.0.0) | * | * | * |

Figure 17

```
+-----+-------+--------+-----------+-----------+----------------------+
|DSCP | AND/OR| IP PROTO | POLICY TYPE | PRIMARY LINK| LINK1, LINK2, LINK3, ETC. |
+-----+-------+--------+-----------+-----------+----------------------+
```

Figure 18

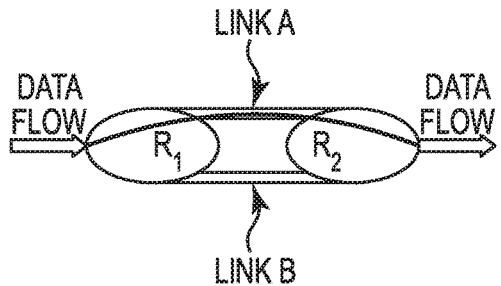
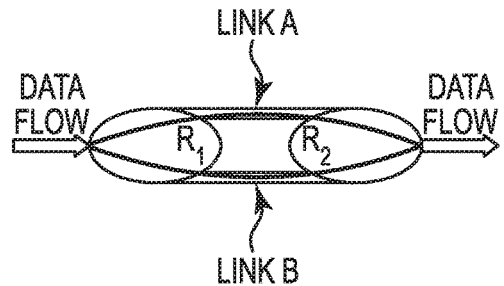
A. MULTIPLE LINKS WITHOUT LOAD BALANCING
B. MULTIPLE LINKS WITH LOAD BALANCING
Figure 26A
Figure 26B
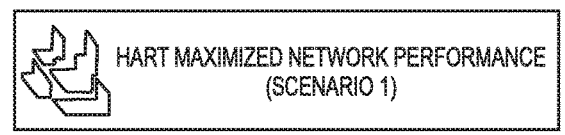
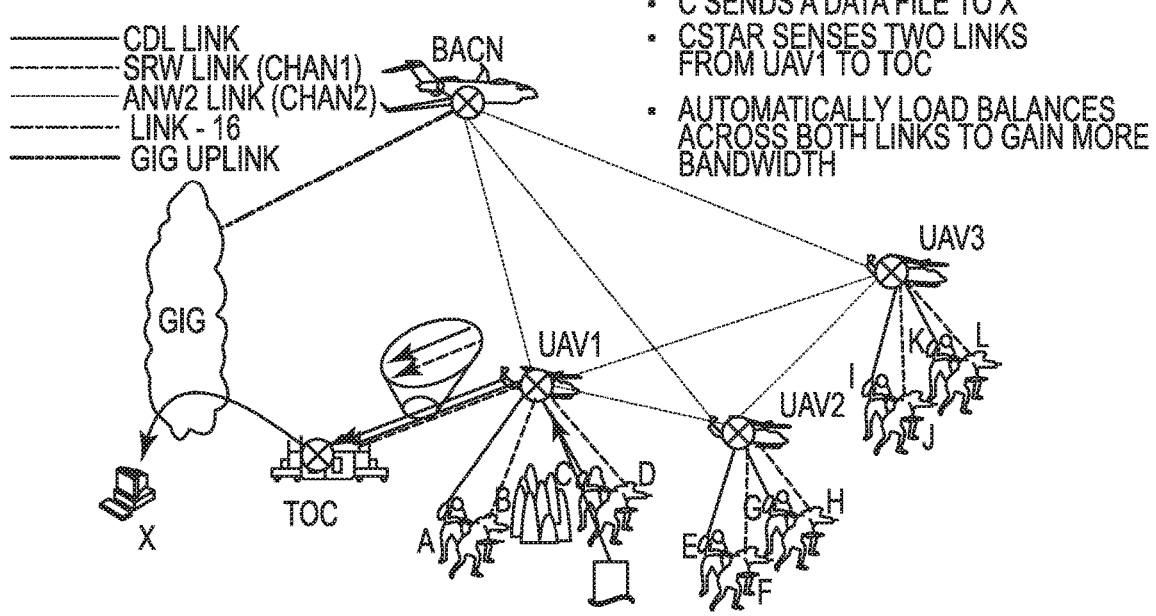
Figure 27

SUBNET CONVERGENCE FUNCTION: FLOW CONTROL

- PREVENTS RADIO BUFFER OVERRUN AND PACKET LOSS DUE TO HEAD-OF-LINE BLOCKING

- SENDS AT RATE MATCHED TO RECEIVER CAPABILITY
  - TOKEN-BUCKET SCHEME
  - WINDOW-BASED CONTROL

- LINUX KERNEL ROUTER
- OSPF OVERLAY NETWORK OF CSTAR ROUTERS
- QUAGGA ROUTER CONTROL DAEMONS
- KERNEL ROUTING TABLES FOR EACH TRAFFIC CLASS
  - LATENCY-SENSITIVE
  - LATENCY-TOLERANT
- USE OSPF TOS-SPECIFIC LINK STATE ADVERTISEMENTS (LSAs)
- TAG TRAFFIC WITH DSCP/TOS FIELDS OF IP FRAME

- CSTAR "PORTABLE" IP ADDRESS
- REACHABLE ON ANY SUBNET FOR WHICH IT HAS BEEN CONFIGURED
- CSTAR ROUTERS MAINTAIN REACHABILITY INFORMATION ABOUT "PORTABLE" ADDRESS TO SUBNET-SPECIFIC ADDRESS MAPPING

Original Packet

Address switched packet (option 1)

Address switched packet (option 2)

Original Packet

Tunneled Packet

PACKET REPLICATION ROUTING WITH DESTINATION ADDRESS SWAP

RELATED APPLICATIONS

This application claims priority to U.S. patent application Ser. No. 14/613,894, filed on Feb. 4, 2015, entitled "HYBRID AUTONOMOUS NETWORK AND ROUTER FOR COMMUNICATION BETWEEN HETEROGENEOUS SUBNETS", which claims the benefit of U.S. Provisional Patent Application No. 61/935,661, filed on Feb. 4, 2014, entitled "HYBRID AUTONOMOUS ROUTER FOR TACTICAL COMMUNICATION", both of which are hereby incorporated herein by reference.

GOVERNMENT CONTRACTS

This invention was made with government support under contract FA8750-12-C-0213 awarded by the Air Force Research Laboratory (AFRL) Small Business Innovation Research (SBIR). The government has certain rights in the invention.

TECHNICAL FIELD

The present invention relates to networking systems and components in general and, more particularly to networking systems and components for routing packets.

BACKGROUND

Various networking systems, protocols and networking equipment and software exist to connect various discrete components together into a communication network.

However, existing networking approaches are incapable of integrating heterogeneous wireless networks. Such existing networks have:
(1) inability to adapt dynamically to topology changes in the network;
(2) need for excessive manual configuration;
(3) lack of scalability with network size;
(4) inability of routing protocols to factor wireless link quality into routing decisions, resulting in sub-optimal network performance.

SUMMARY

Embodiments disclosed herein provide for a method of routing an Internet Protocol (IP) packet from a routing device. The method includes receiving a first IP packet having a first IP header and a first IP data field. The first IP header has a final destination corresponding to a destination device communicatively coupled to the routing device via at least two parallel network links. The at least two parallel network links include a first network link communicatively coupling the routing device to a first device and a second network link communicatively coupling the routing device to a second device. A second IP packet having a second IP header and a second IP data field is sent over the first network link. The second IP data field is identical to the first IP data field, and a destination address in the second IP header corresponds to the first device. A third IP packet having a third IP header and a third IP data field is sent over the second network link. The third IP data field is identical to the first IP data field, and a destination address in the third IP header corresponds to the second device.

Embodiments disclosed herein also provide for a routing module. The routing module includes a processor readable medium having software stored thereon. The software, when executed by one or more processing devices, is configured to receive a first IP packet having a first IP header and a first IP data field. The first IP header has a final destination corresponding to a destination device communicatively coupled to the routing device via at least two parallel network links. The at least two parallel network links including a first network link communicatively coupling the routing device to a first device and a second network link communicatively coupling the routing device to a second device. The software sends a second IP packet having a second IP header and a second IP data field over the first network link. The second IP data field is identical to the first IP data field, and a destination address in the second IP header corresponds to the first device. The software sends a third IP packet having a third IP header and a third IP data field over the second network link. The third IP data field is identical to the first IP data field, and a destination address in the third IP header corresponds to the second device.

Embodiments disclosed herein also provide for a routing device. The routing device includes a processor readable medium having software stored thereon. The software, when executed by one or more processing devices, is configured to receive a first IP packet having a first IP header and a first IP data field. The first IP header has a final destination corresponding to a destination device communicatively coupled to the routing device via at least two parallel network links. The at least two parallel network links include a first network link communicatively coupling the routing device to a first device and a second network link communicatively coupling the routing device to a second device. The software sends a second IP packet having a second IP header and a second IP data field over the first network link. The second IP data field is identical to the first IP data field, and a destination address in the second IP header corresponds to the first device. The software sends a third IP packet having a third IP header and a third IP data field over the second network link. The third IP data field is identical to the first IP data field, and a destination address in the third IP header corresponds to the second device.

DRAWINGS

FIG. 16 illustrates an alias tag table entry;

FIG. 17 is an illustration of a completed alias tag table;

FIG. 18 is an example of the format of a policy table entry;

Figure 25A:
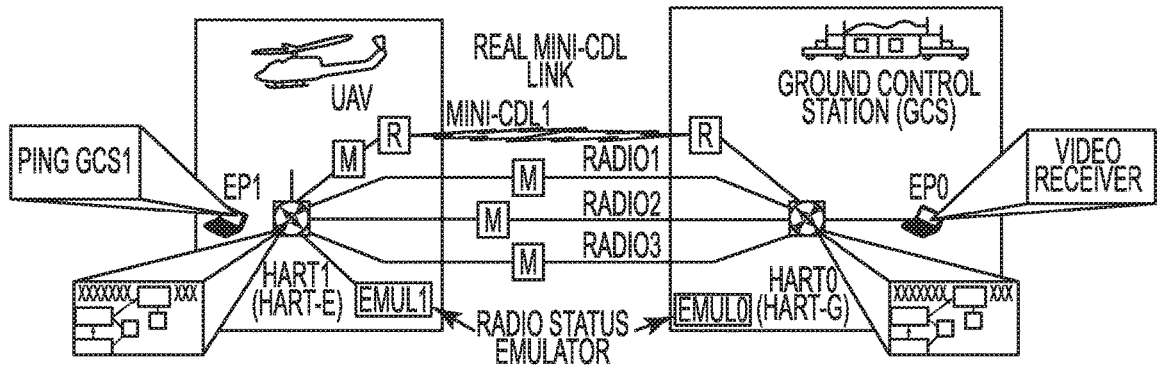
Figure 25B:
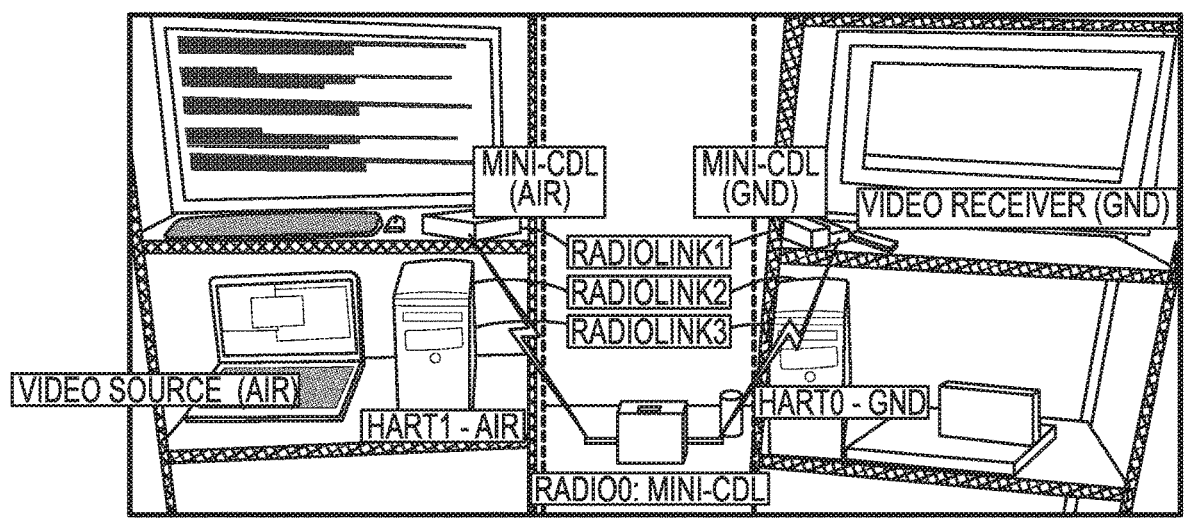
Figure 28:
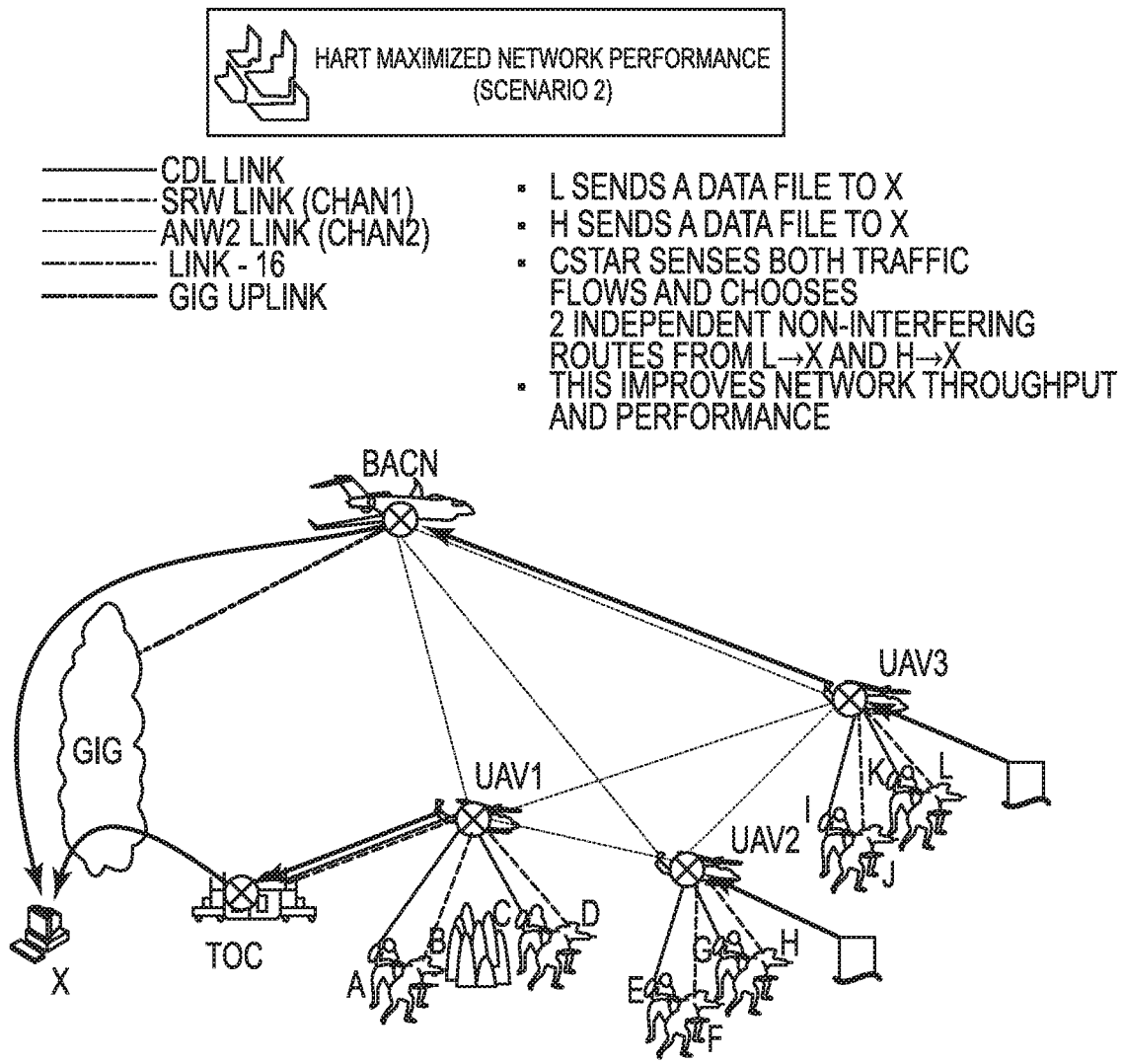
Figure 29:
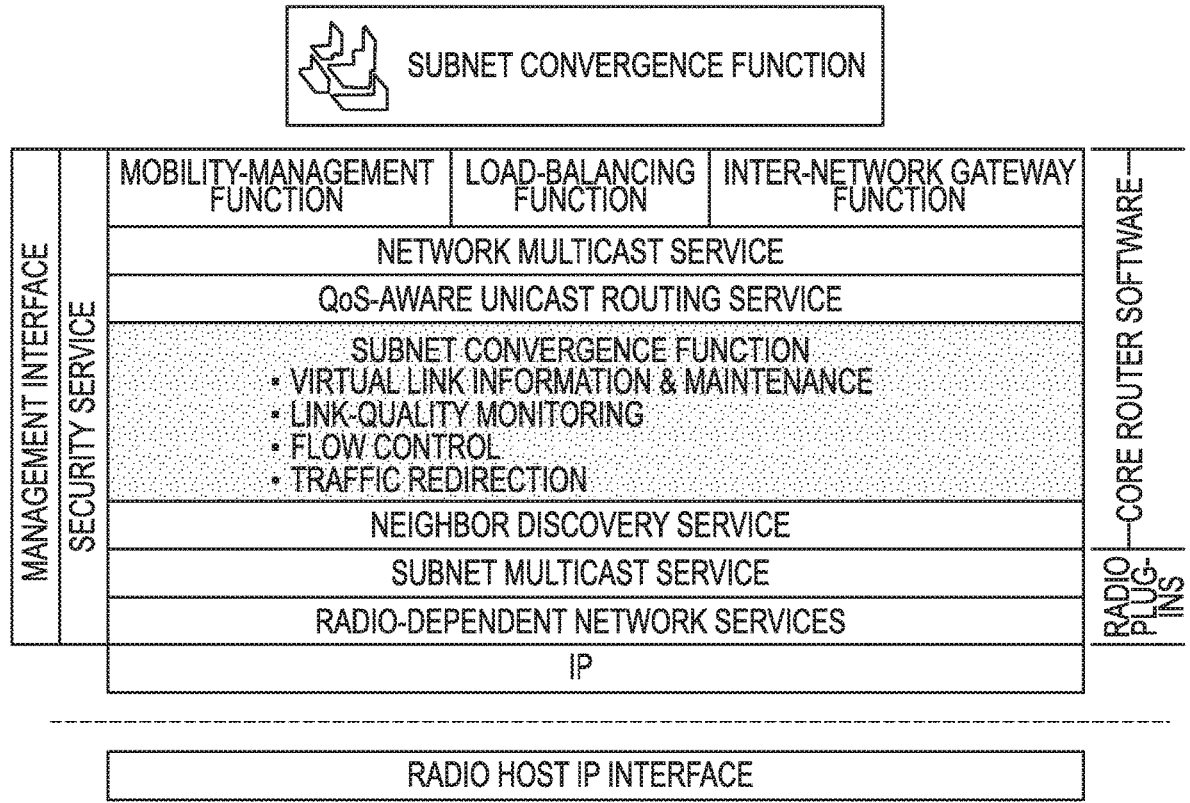
Figure 30:
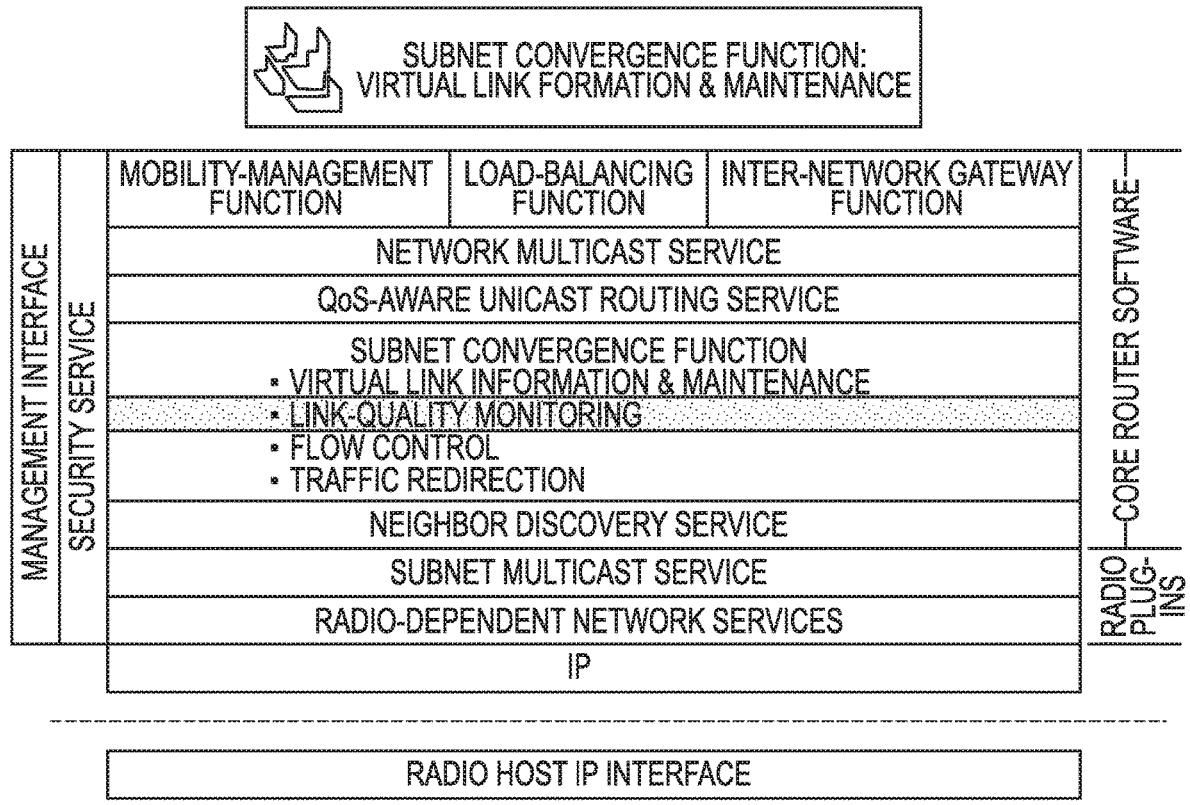
Figure 31:
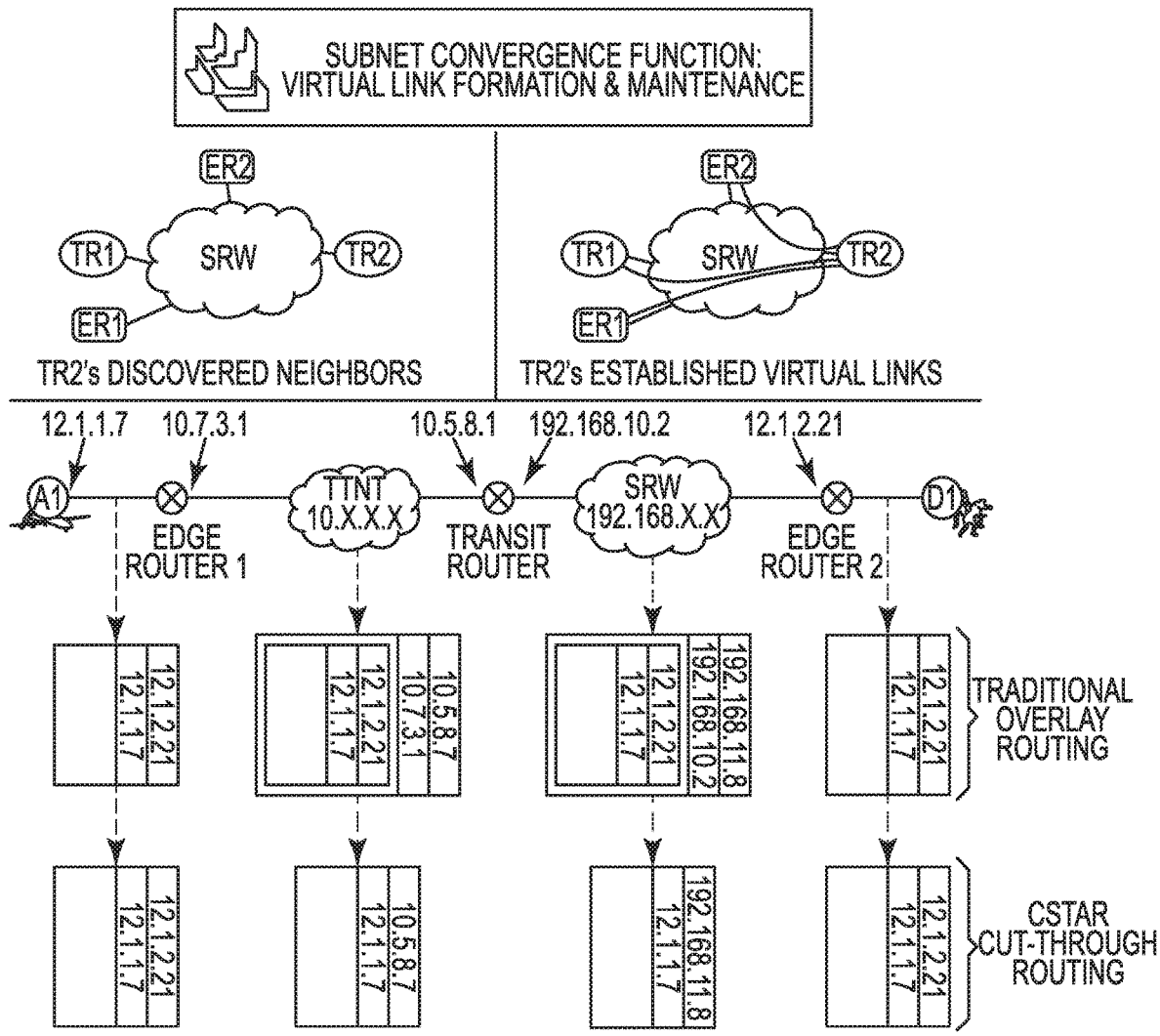
Figure 32:
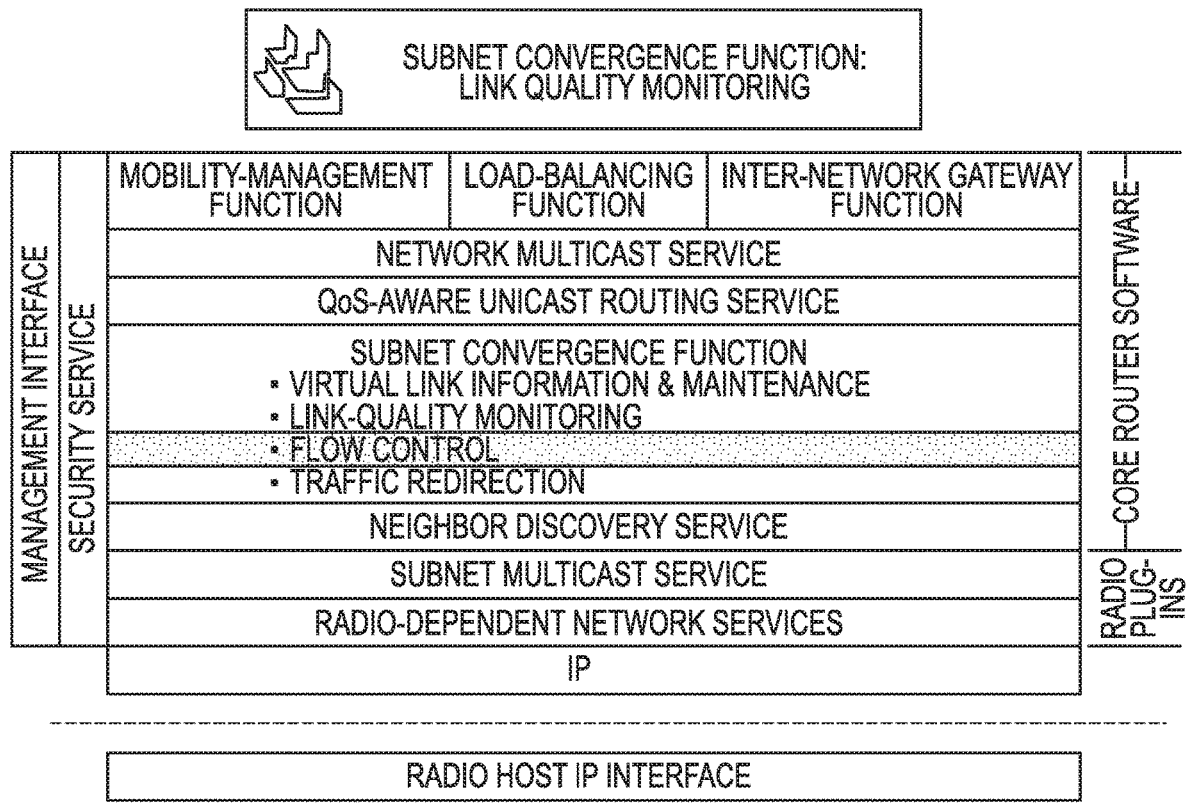
Figure 33:
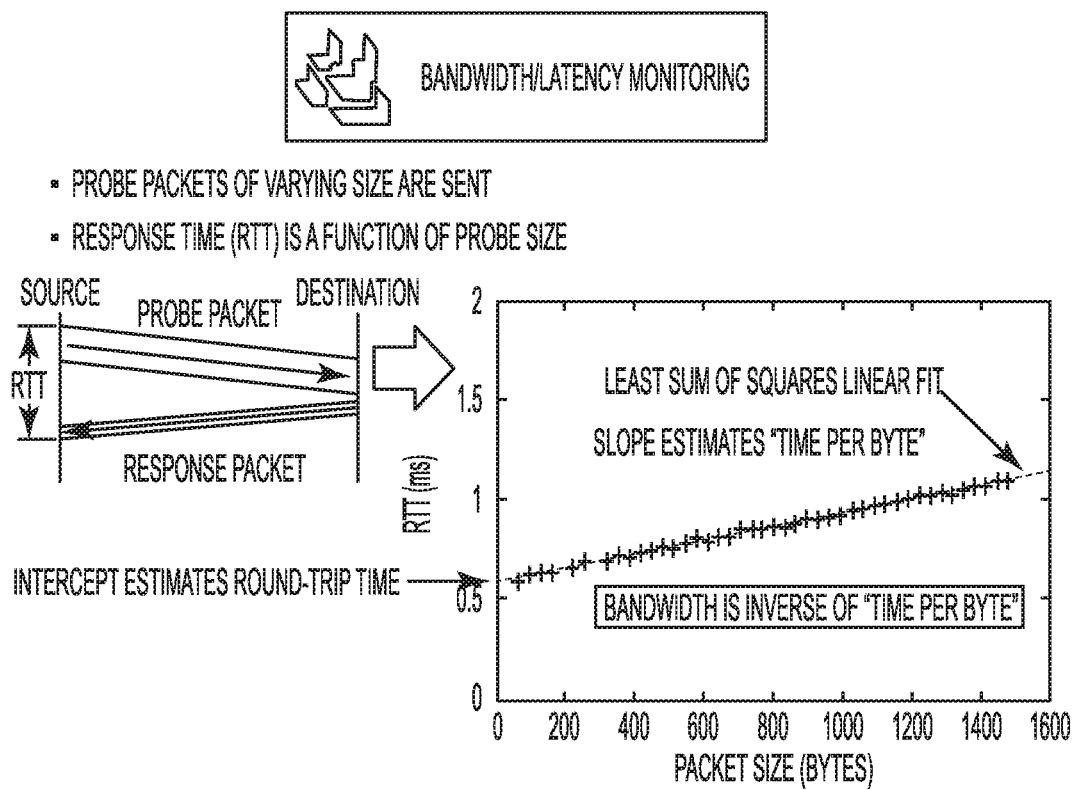
Figure 34:
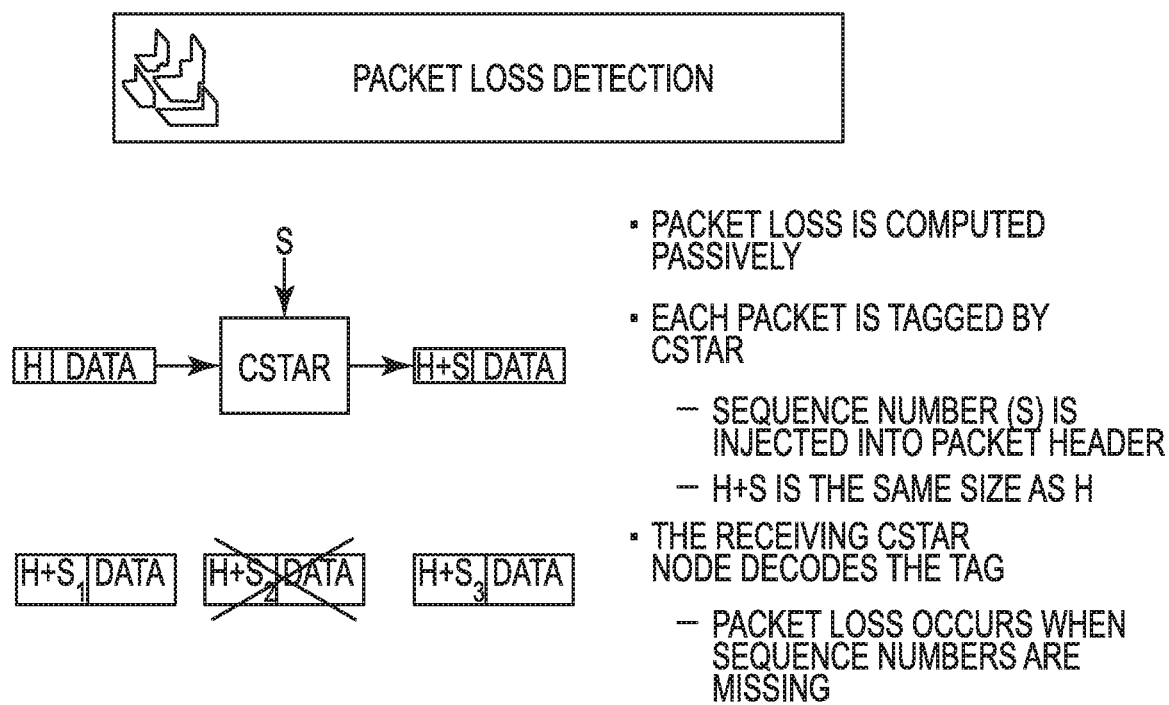
Figure 35:
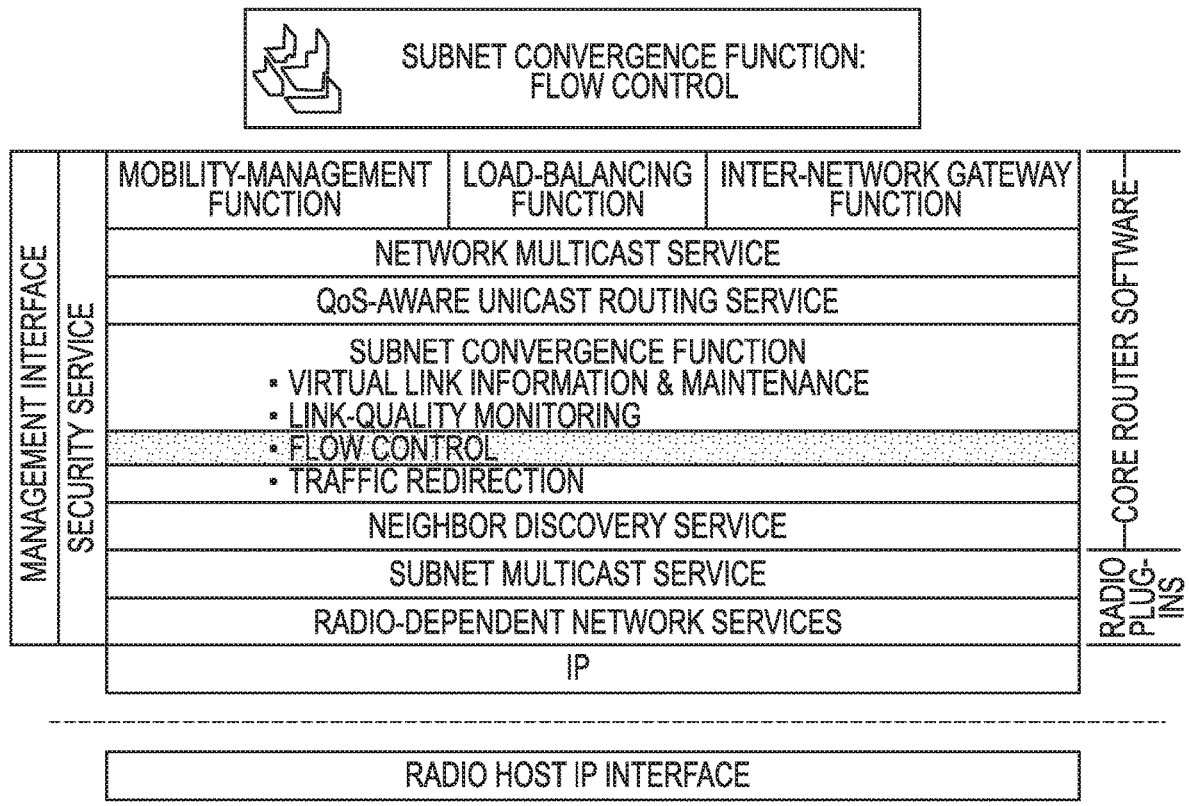
Figure 36:
Figure 36:
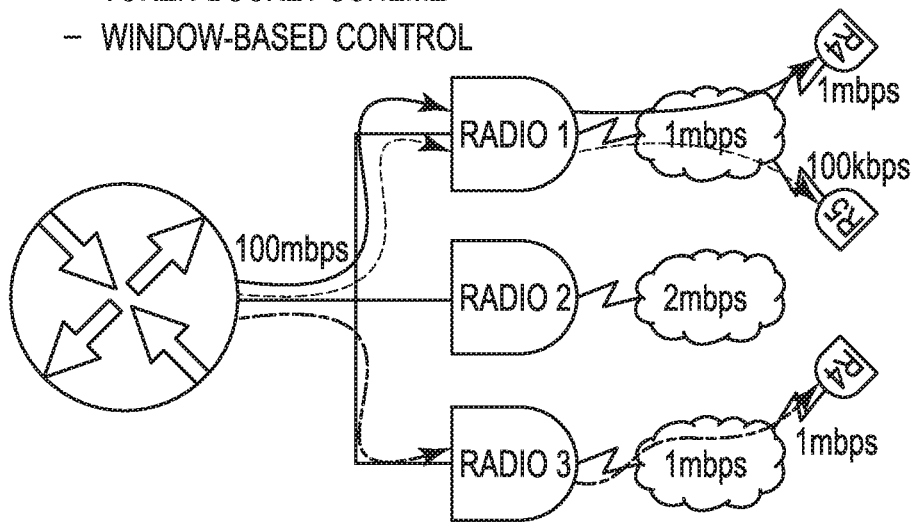
Figure 37:
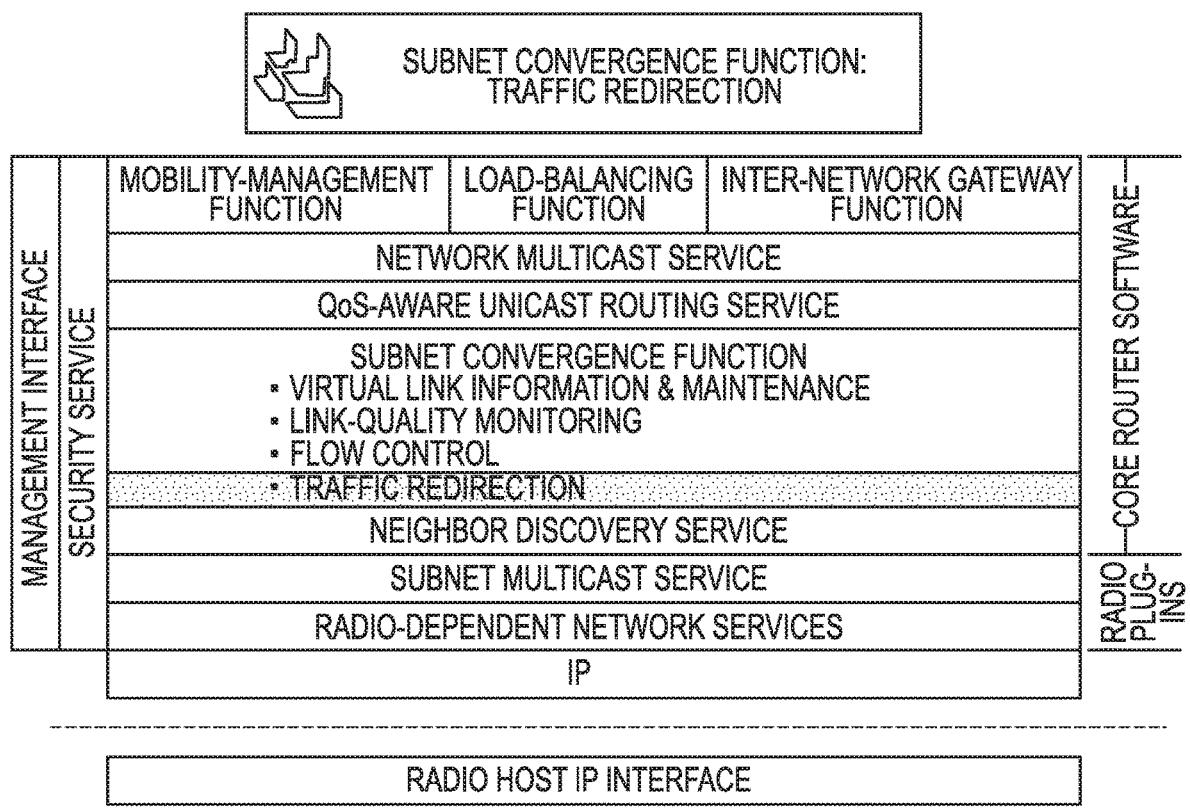
Figure 38:
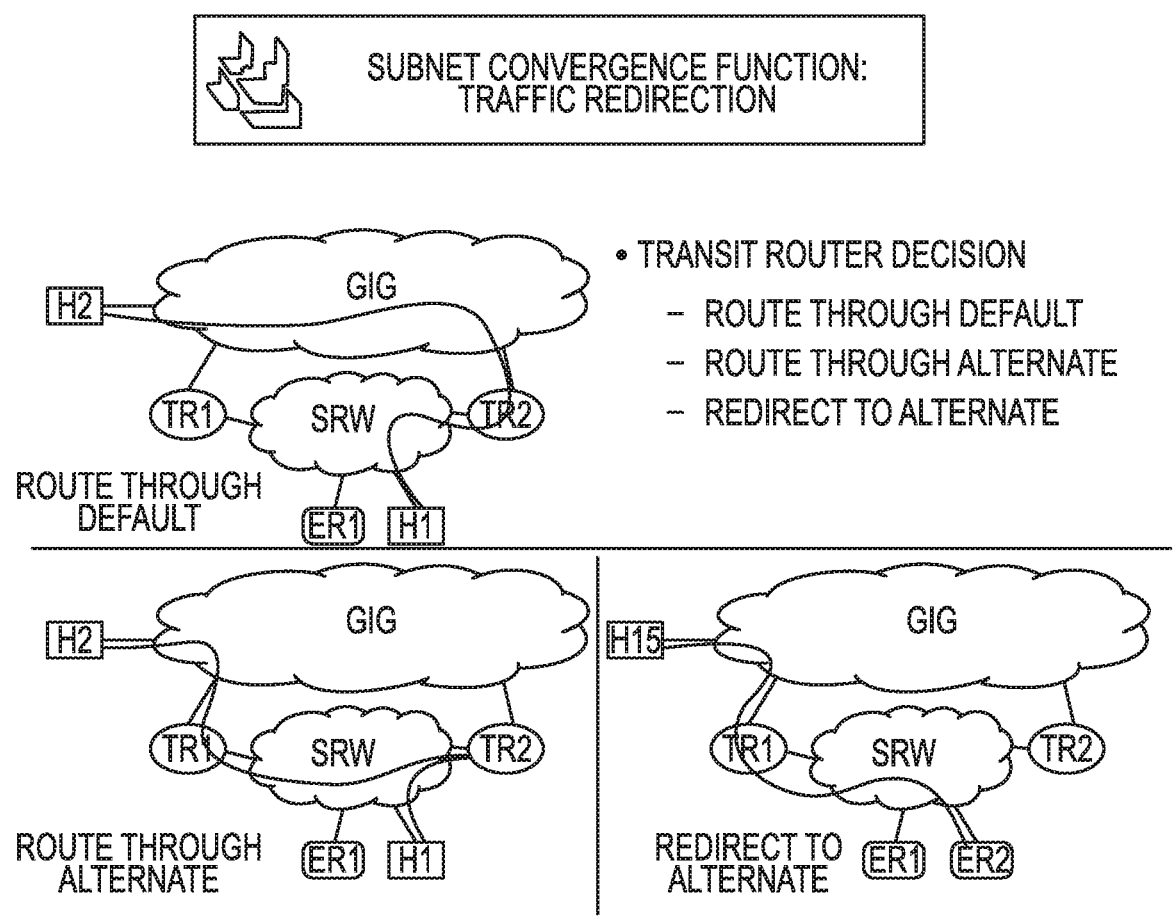
Figure 39:
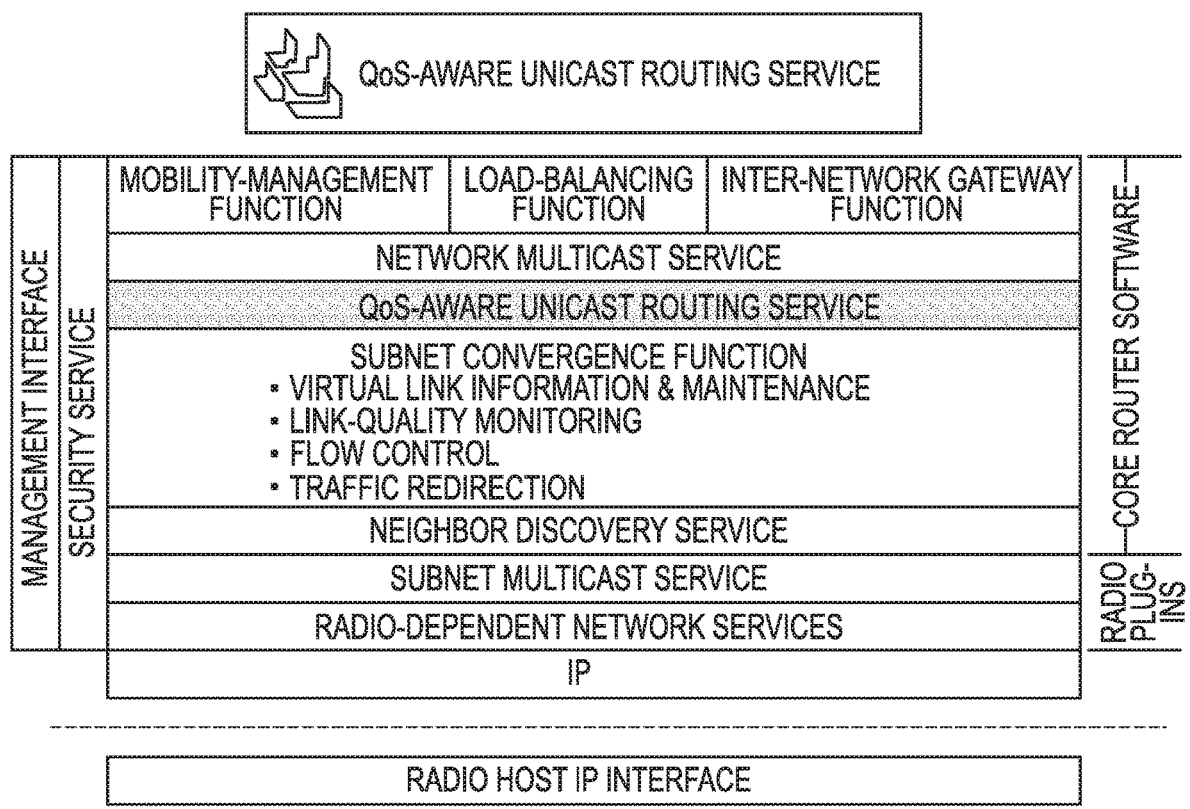
Figure 40:
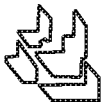
Figure 40:
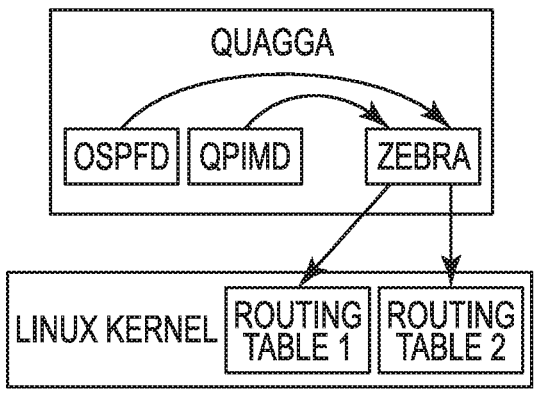
Figure 41:
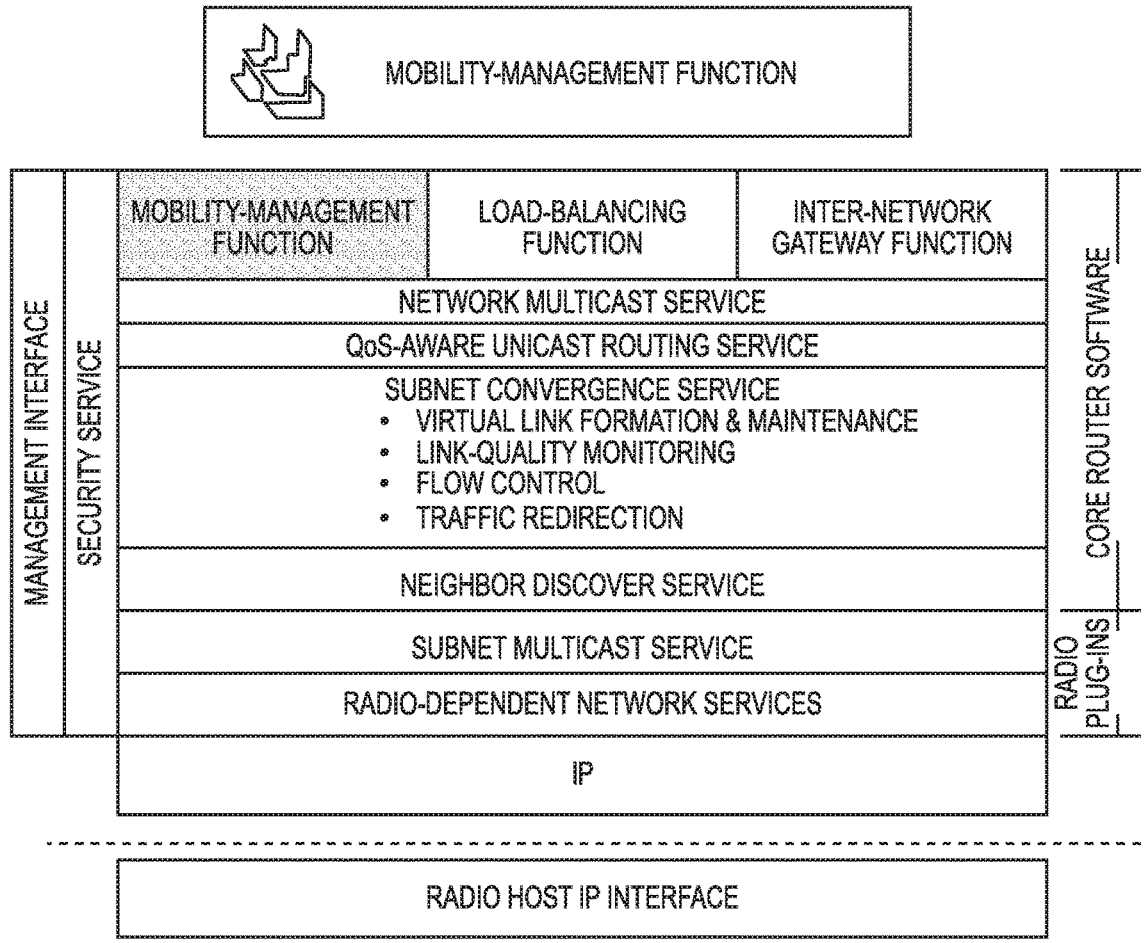
Figure 42:
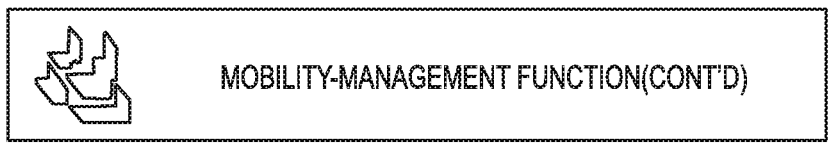
Figure 42:
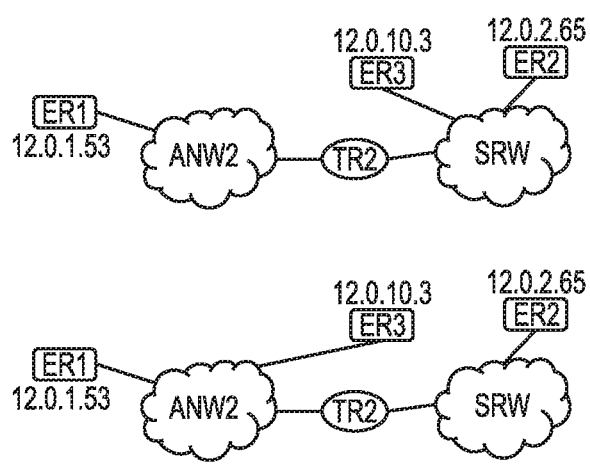
Figure 43:
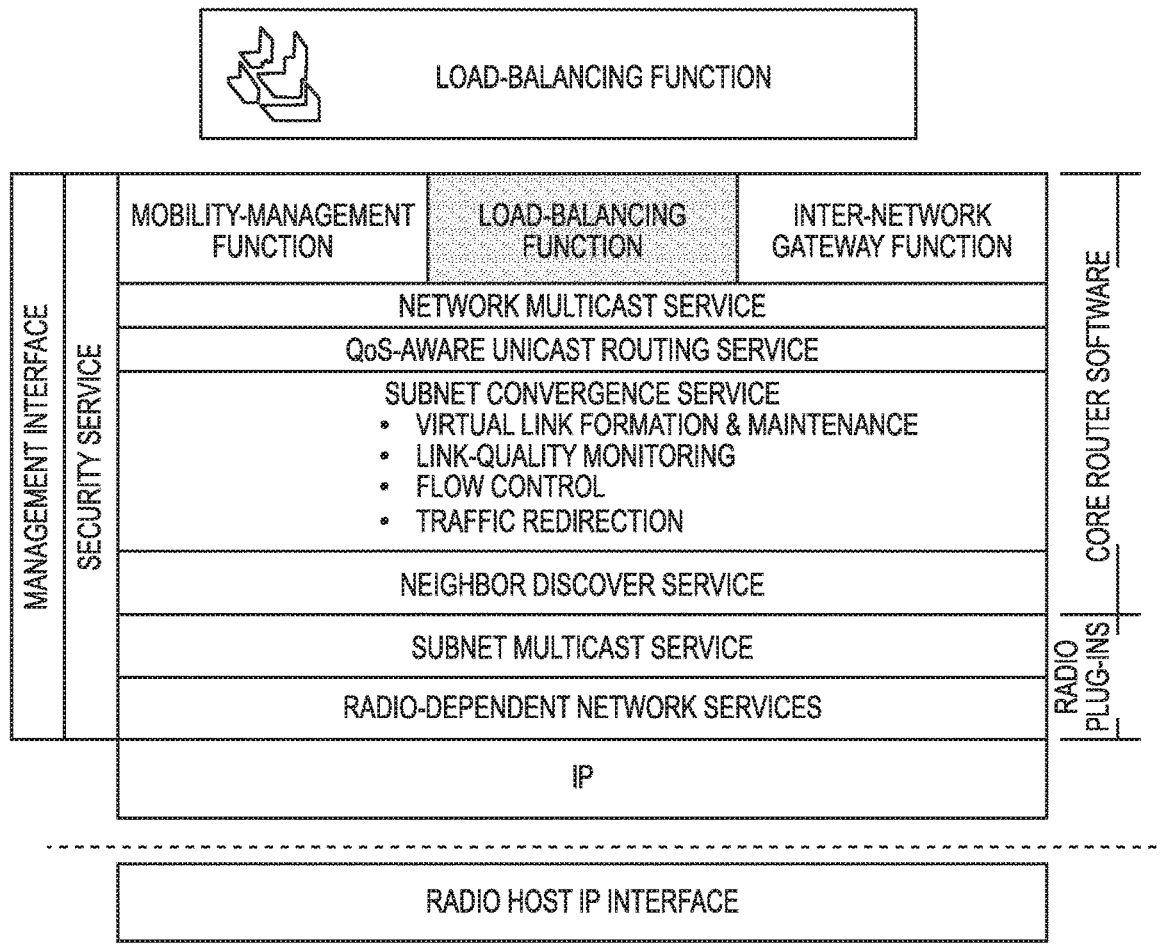
Figure 44:
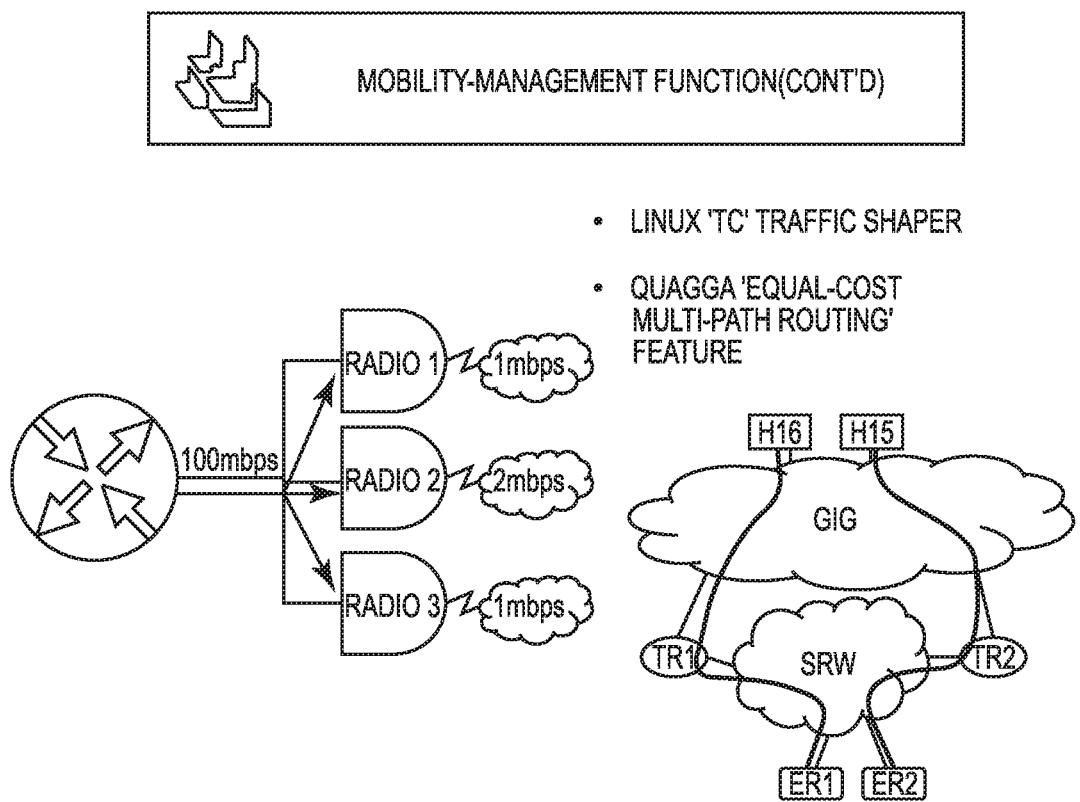
Figure 45:
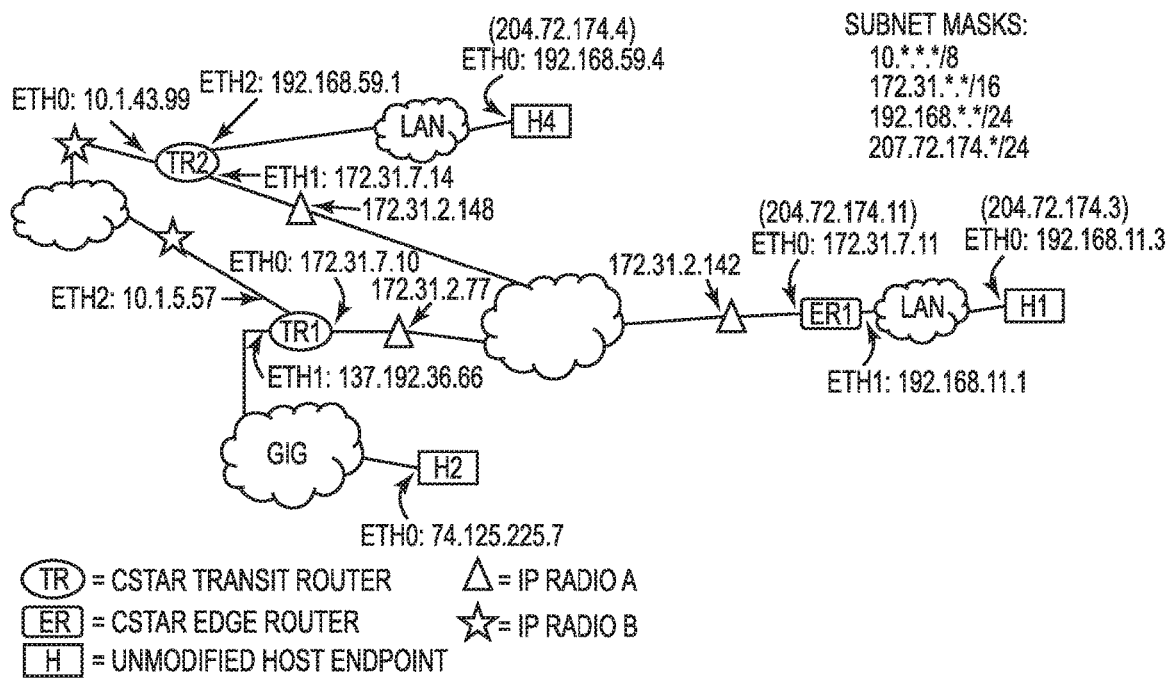
Figure 46:
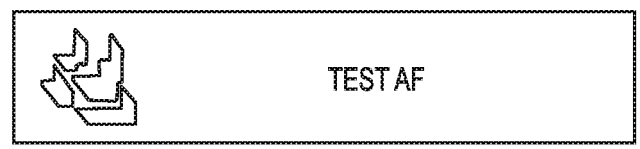
Figure 46:
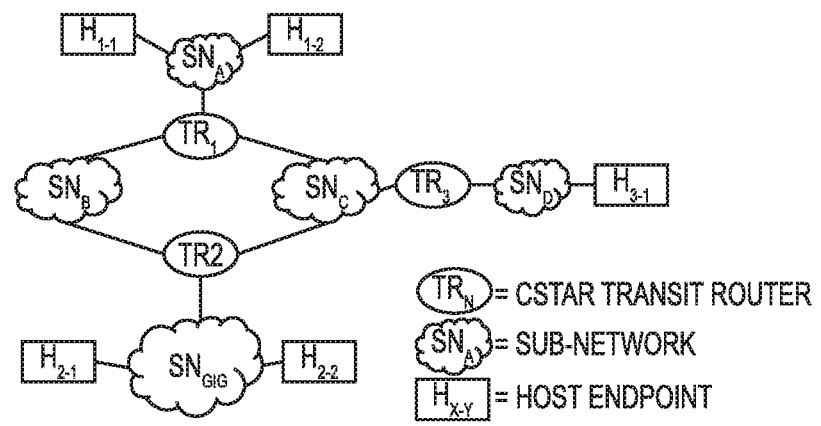
Figure 47:
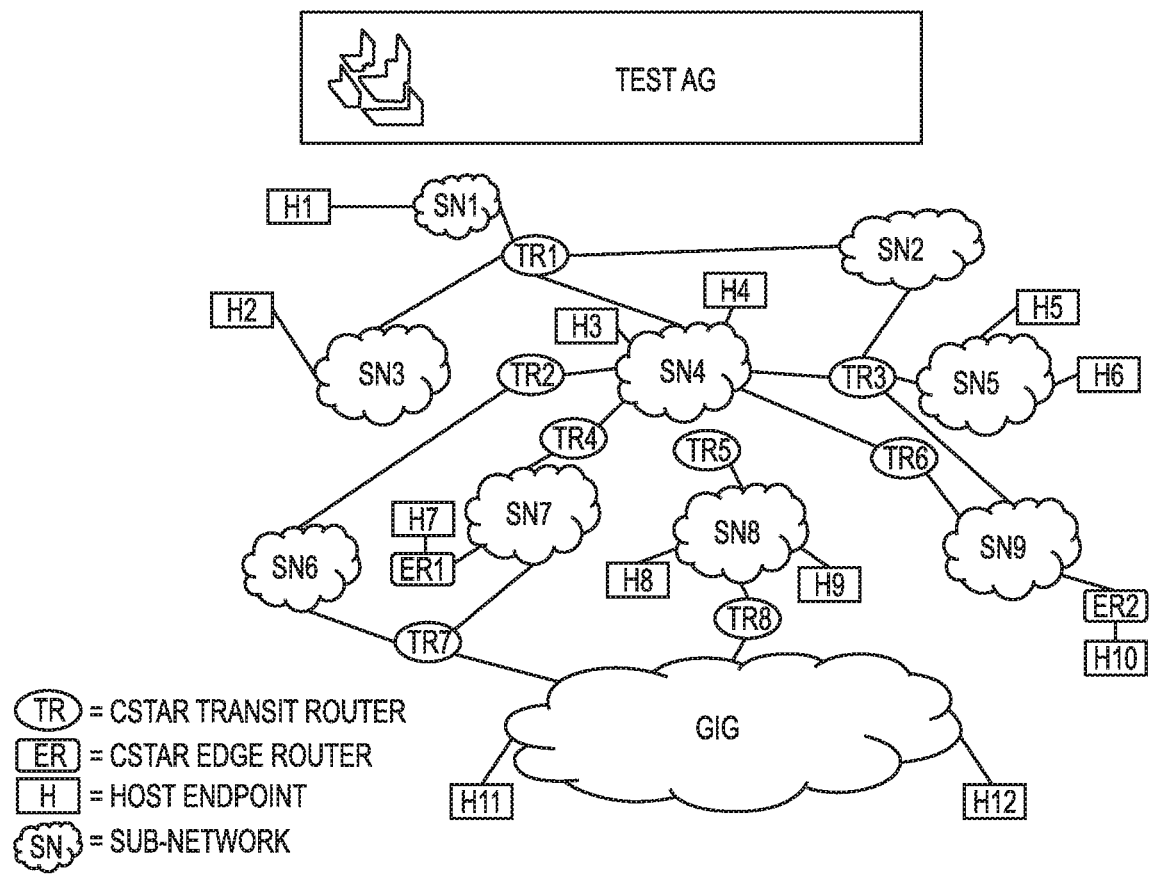
Figure 48:
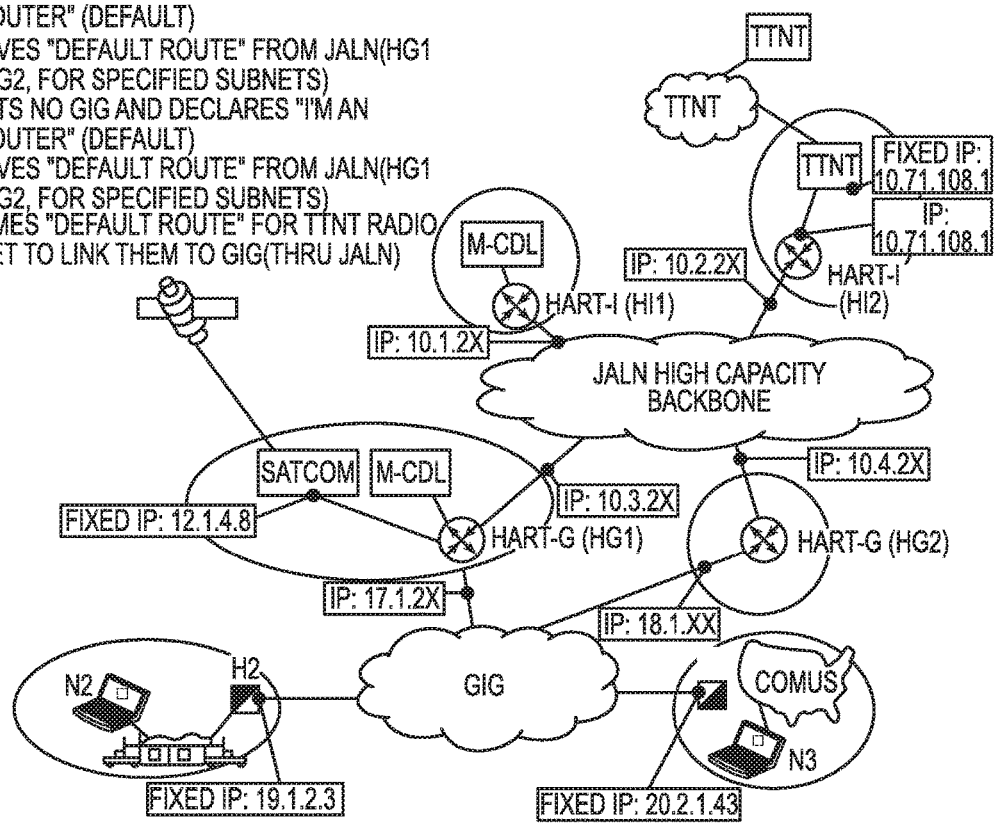
Figure 49:
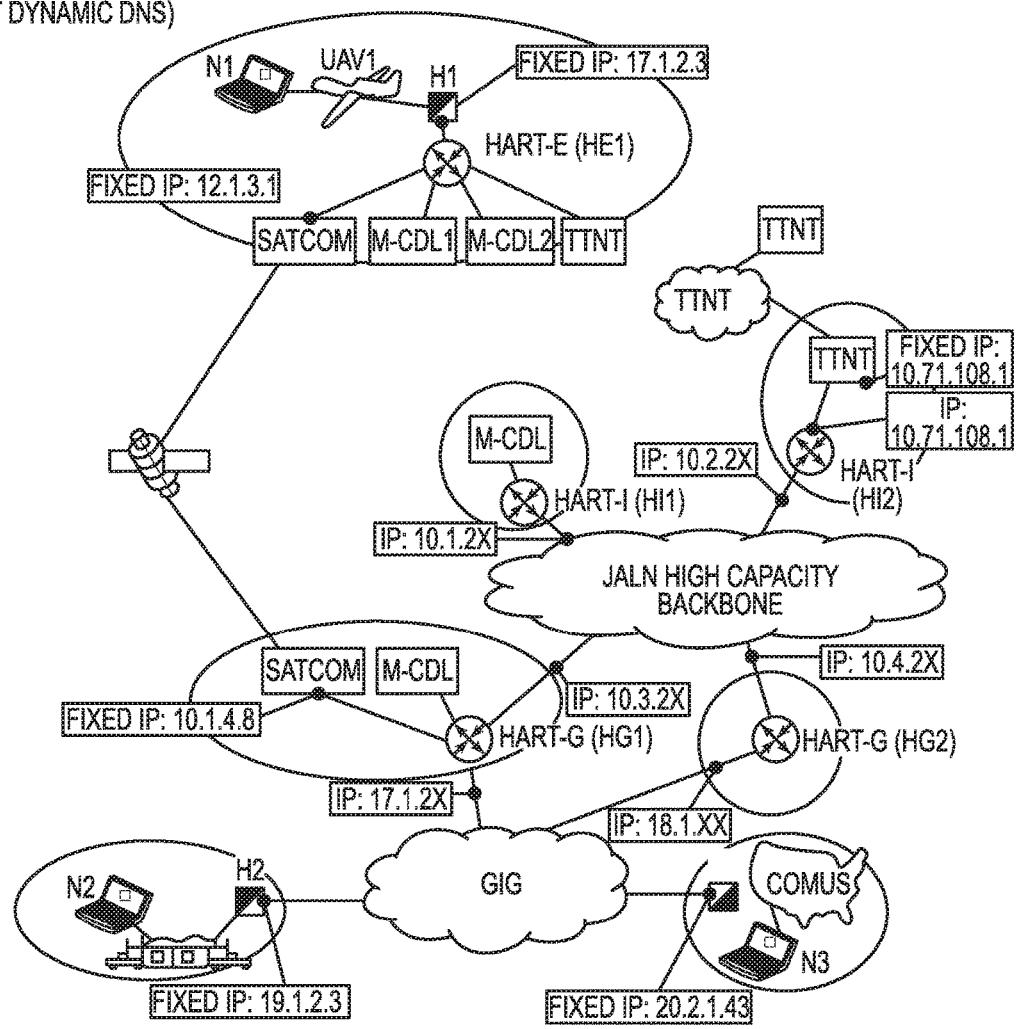
Figure 50:
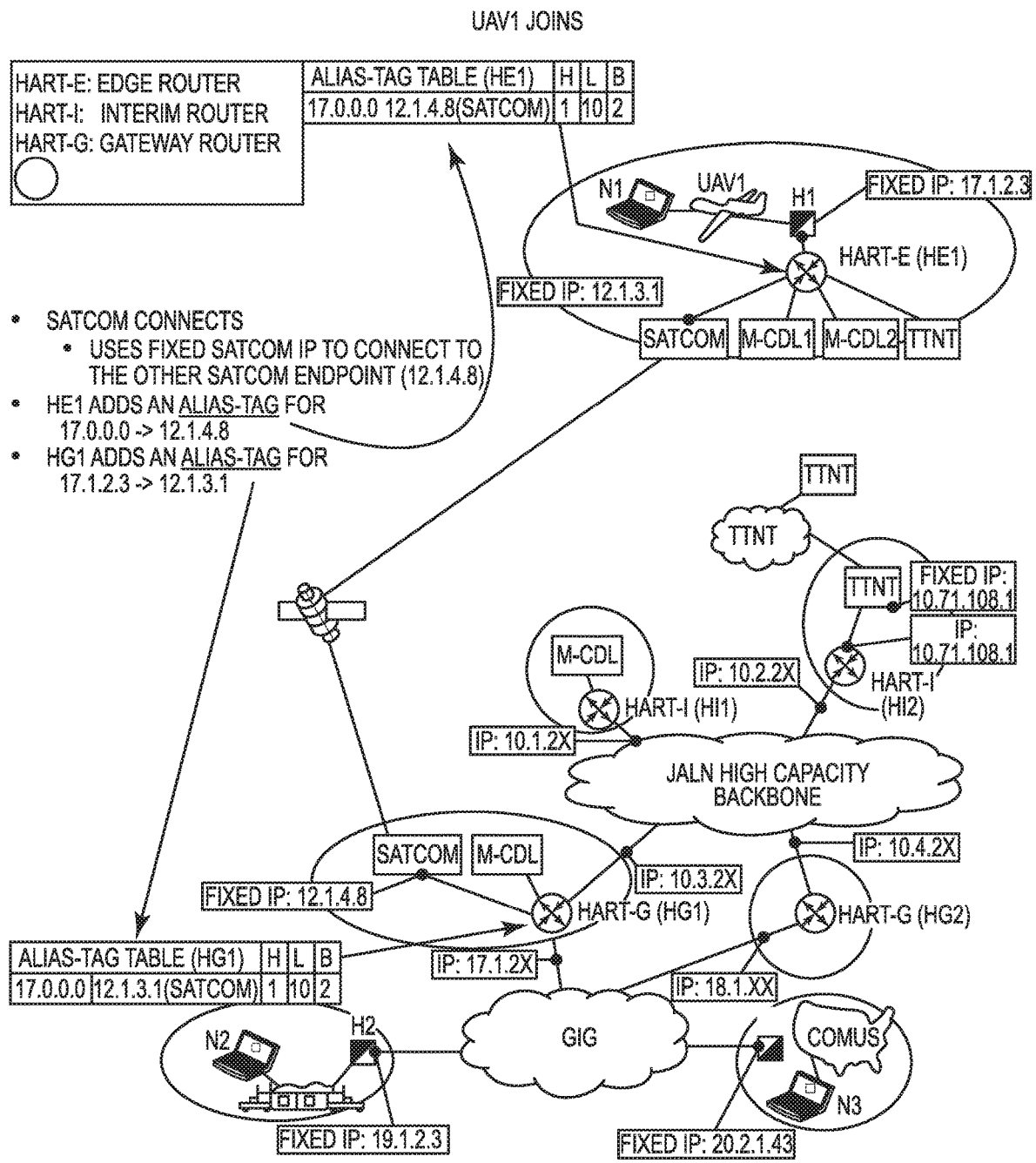
Figure 51:
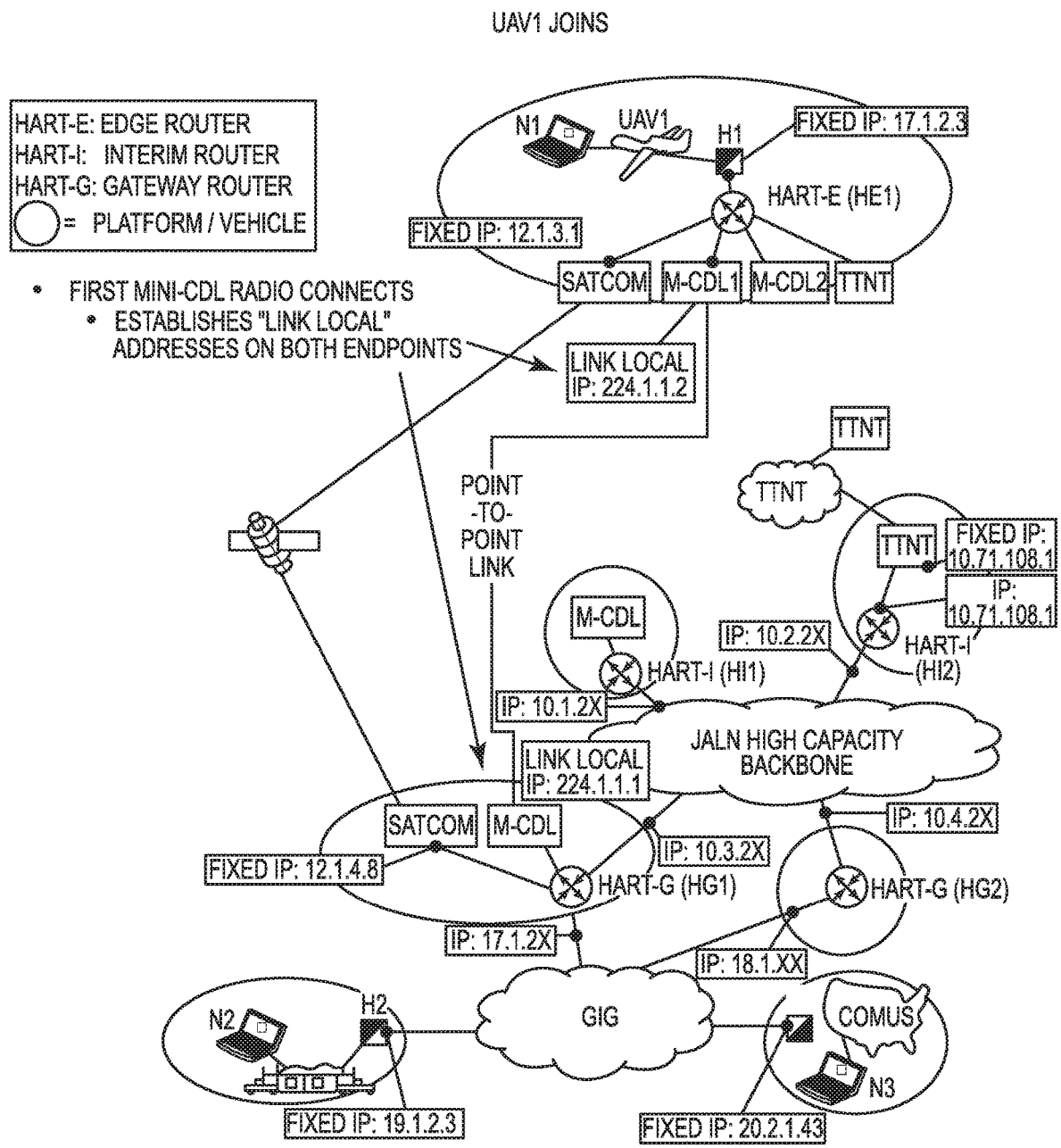
Figure 52:
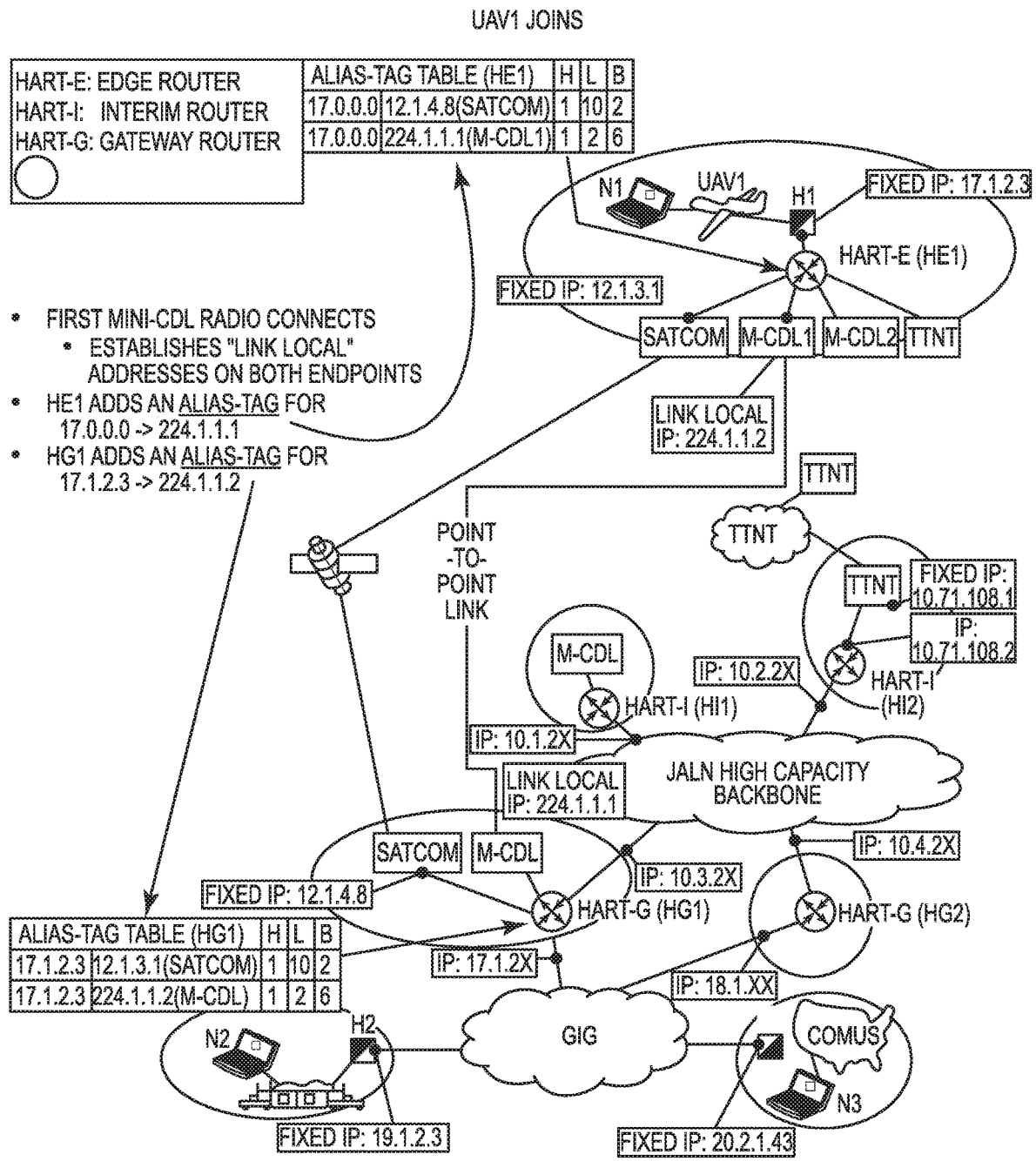
Figure 53:
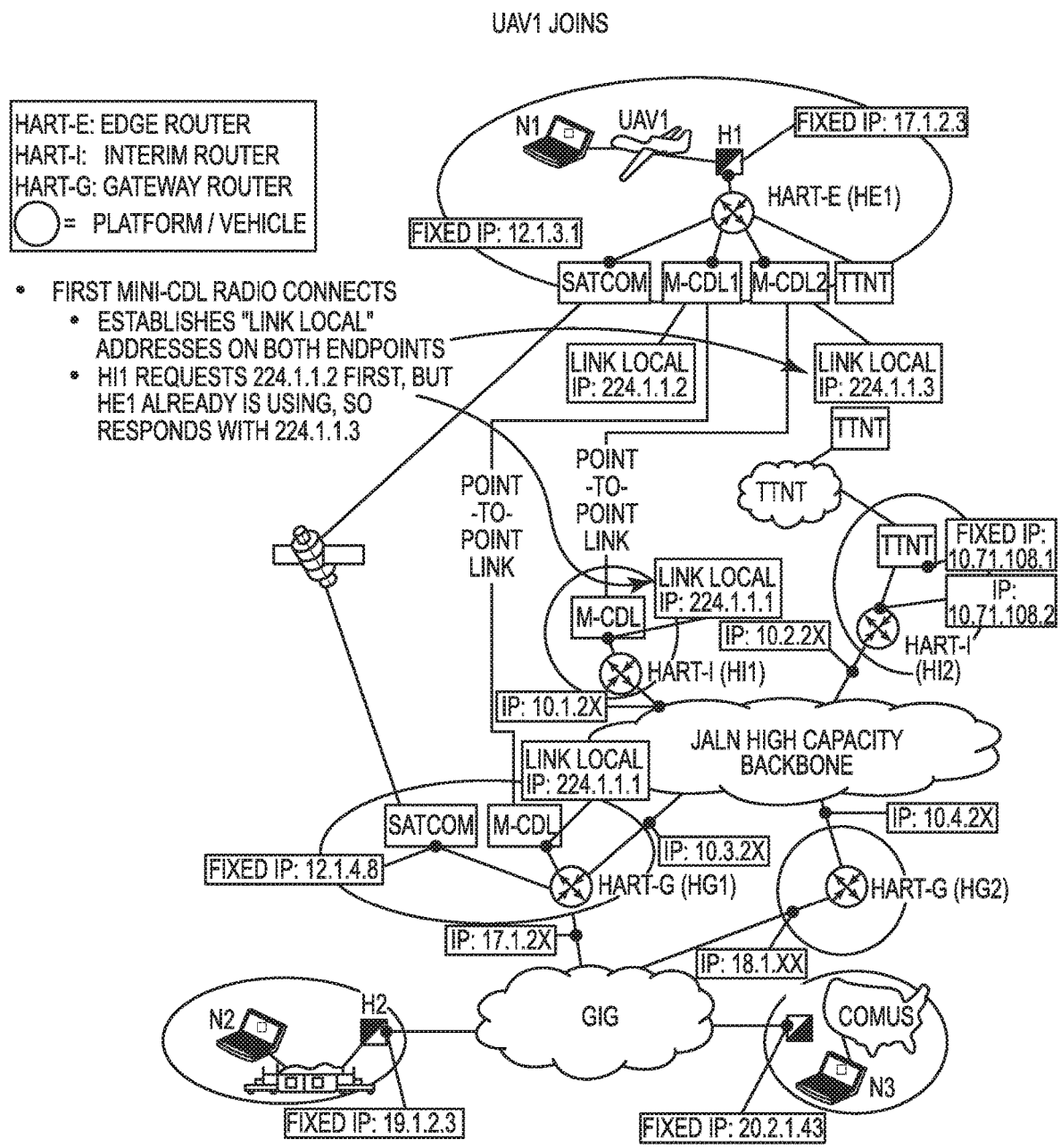
Figure 54:
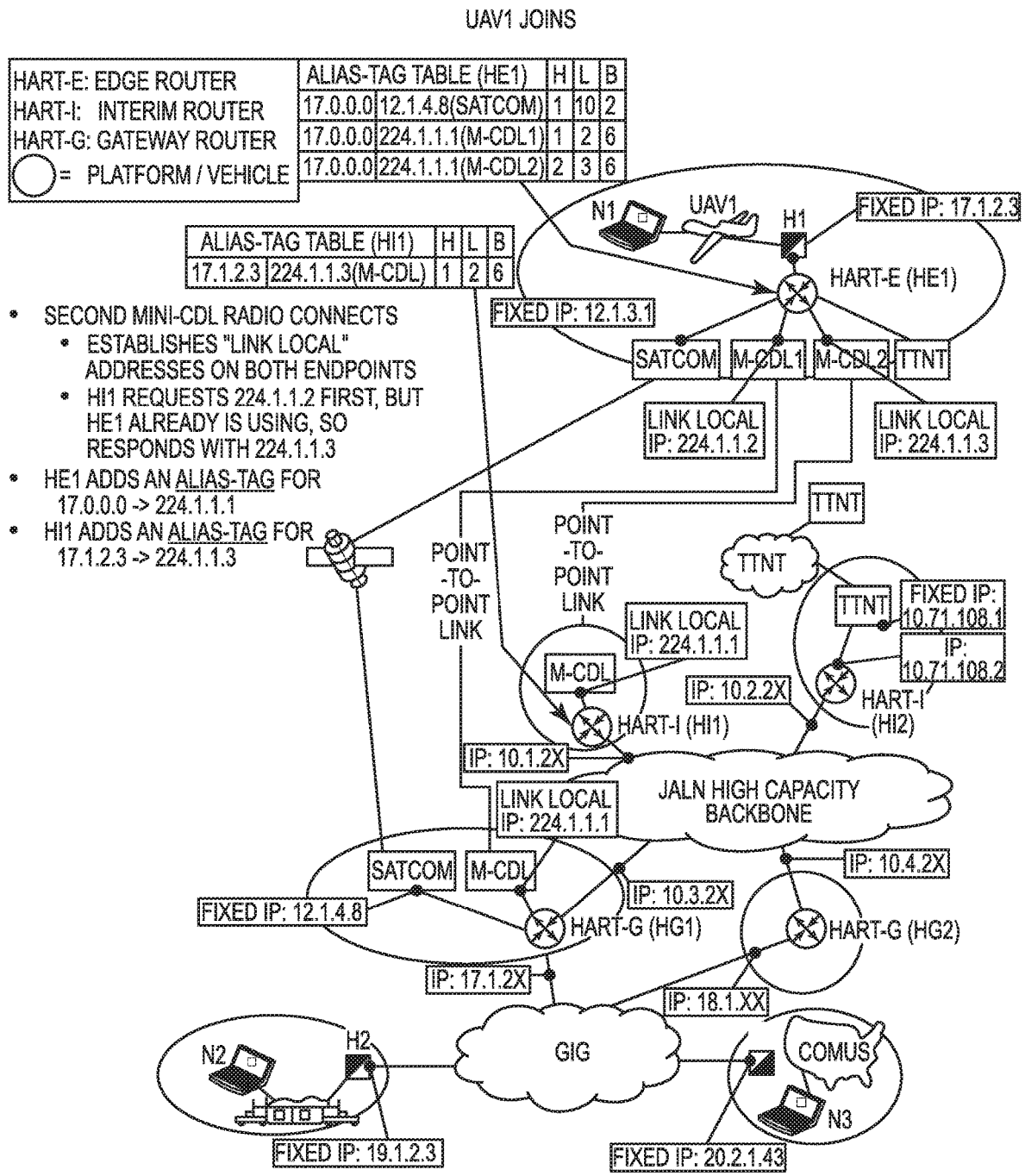
Figure 55:
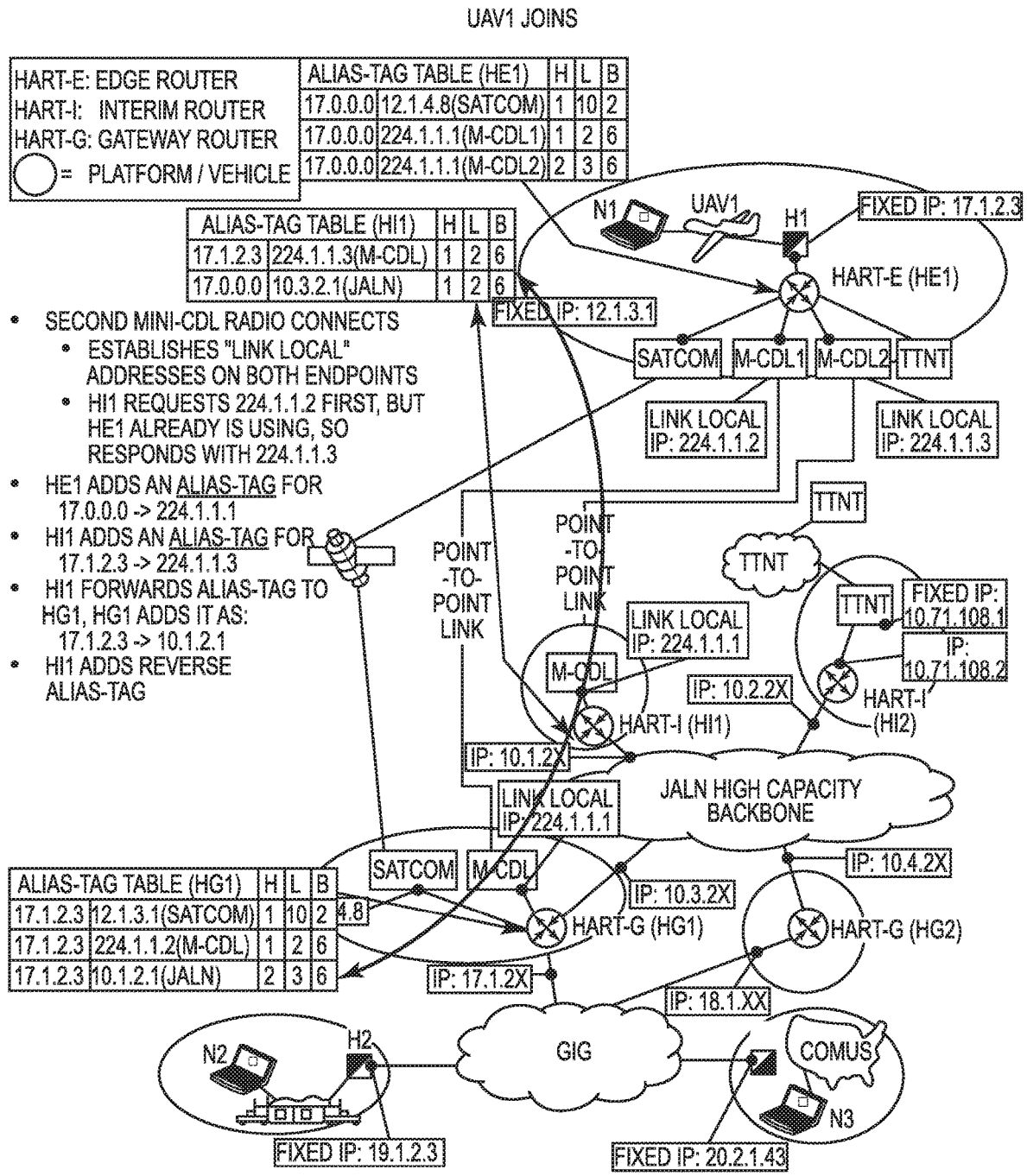
Figure 56:
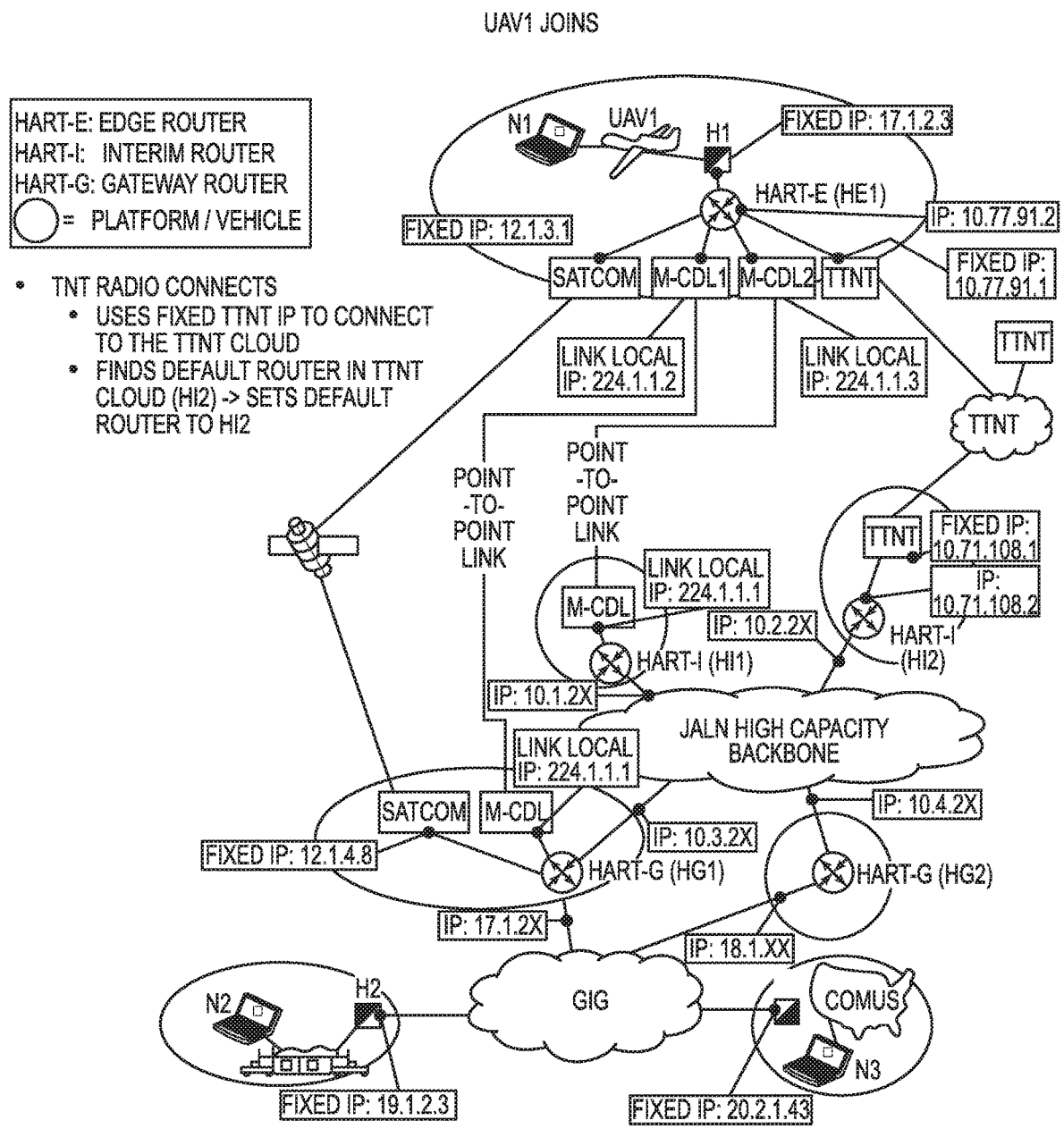
Figure 57:
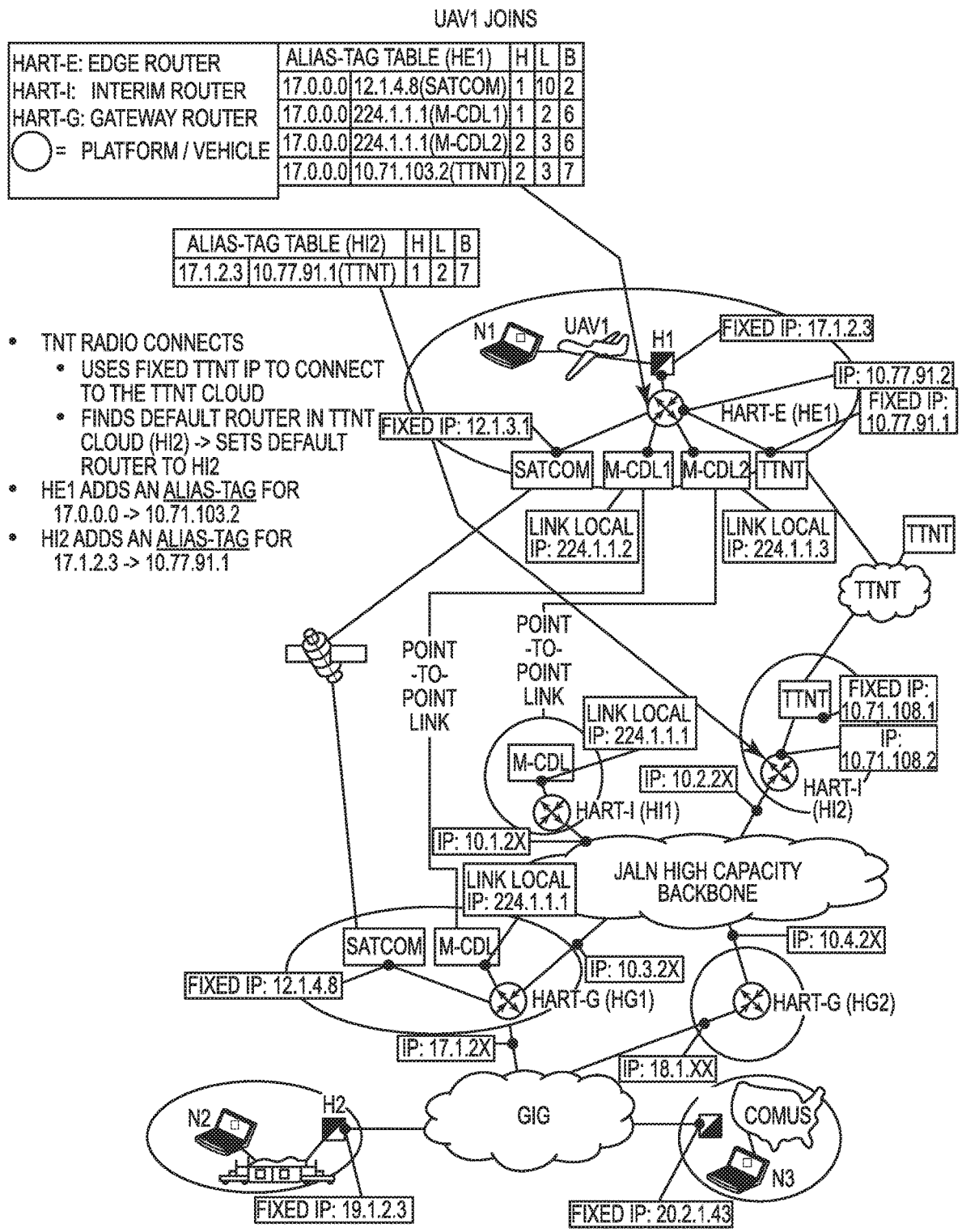
Figure 58:
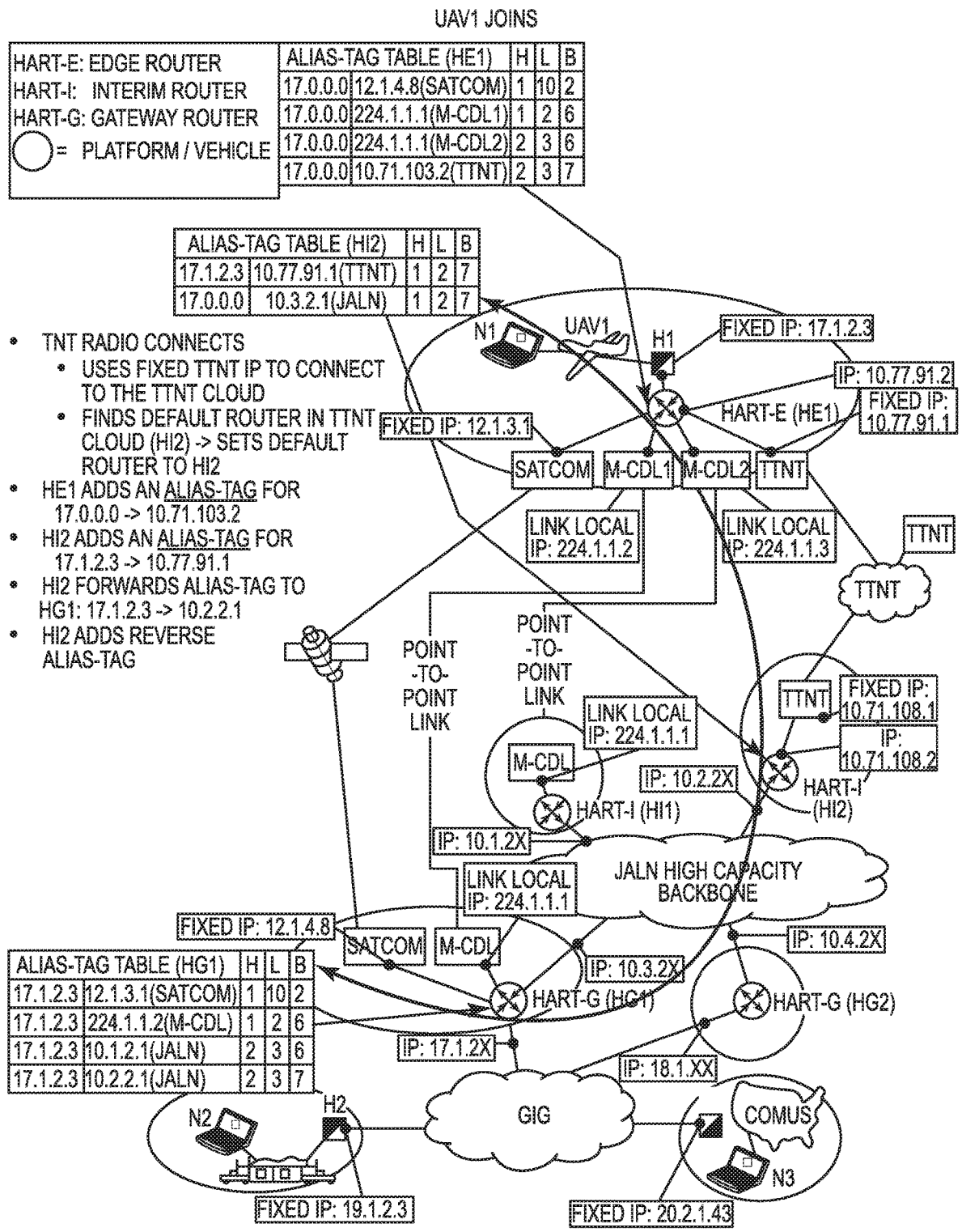
Figure 59:
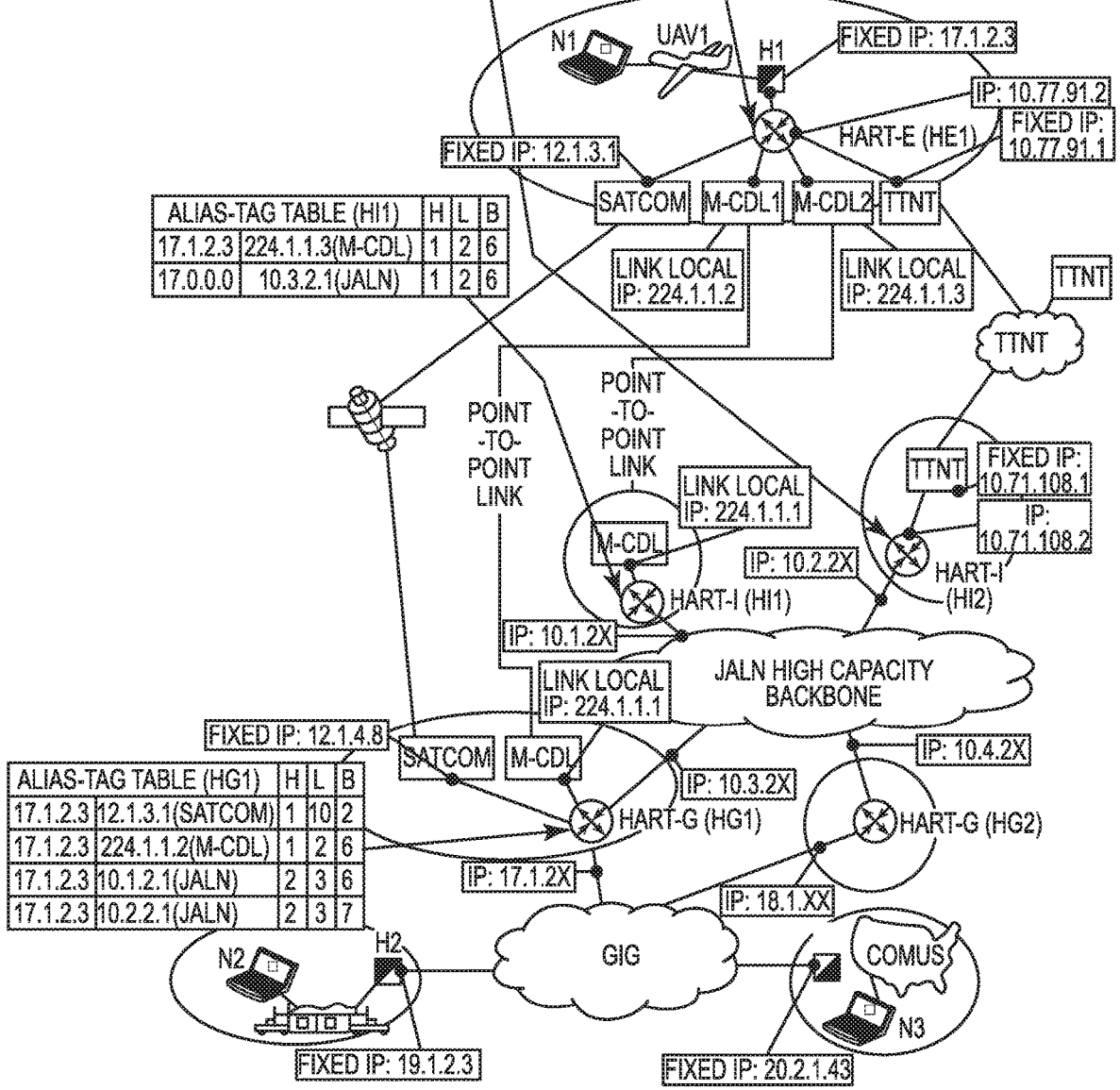
Figure 60:
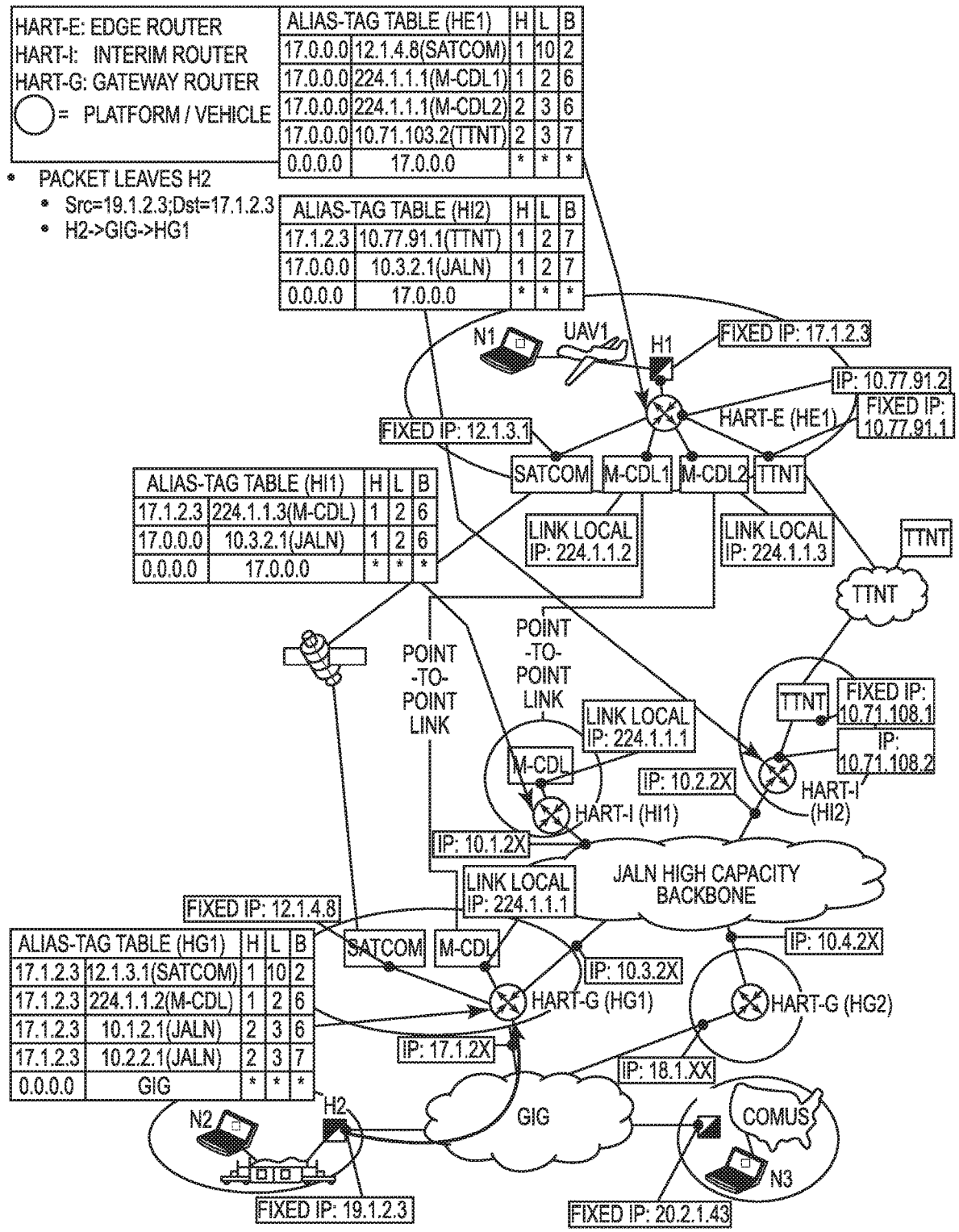
Figure 61:
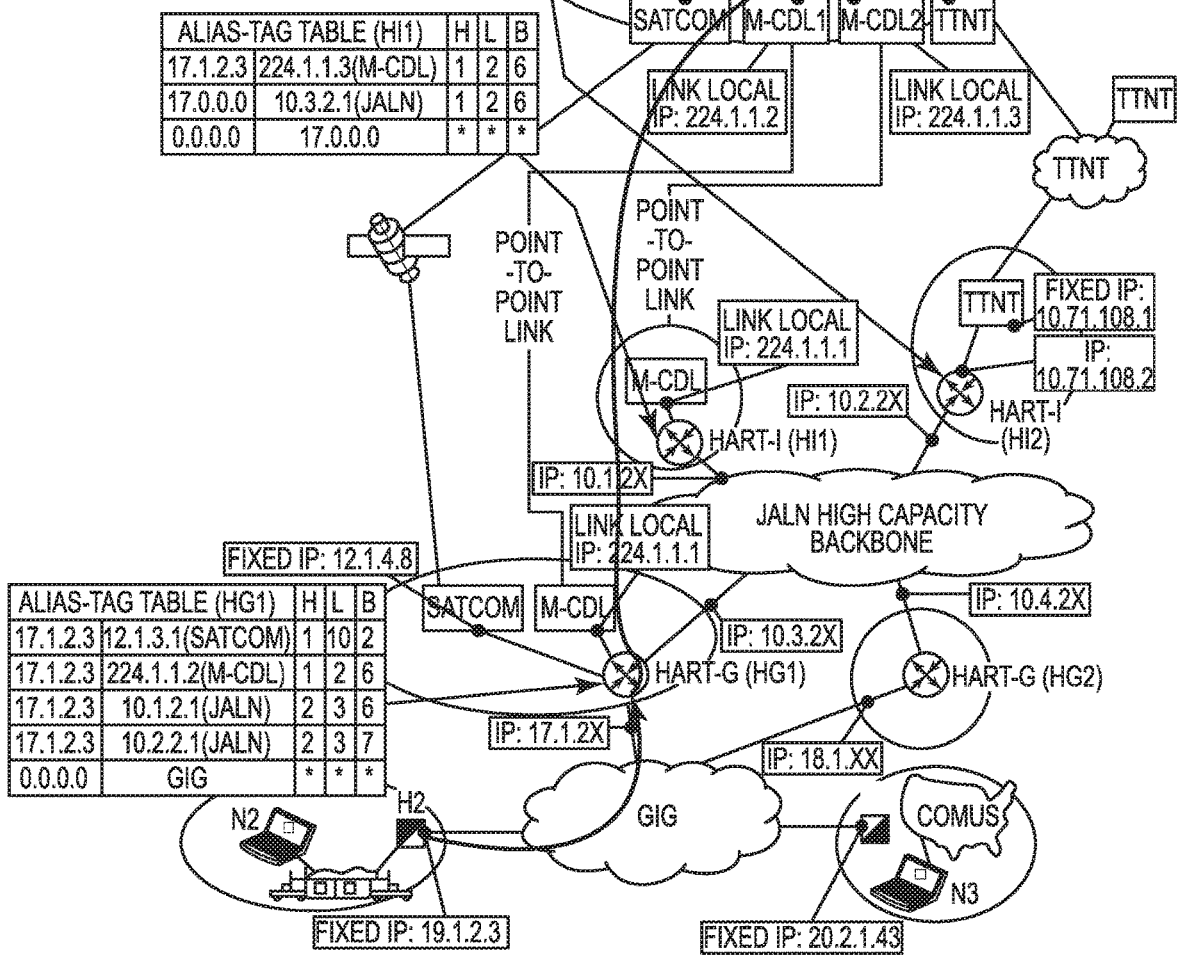
Figure 62:
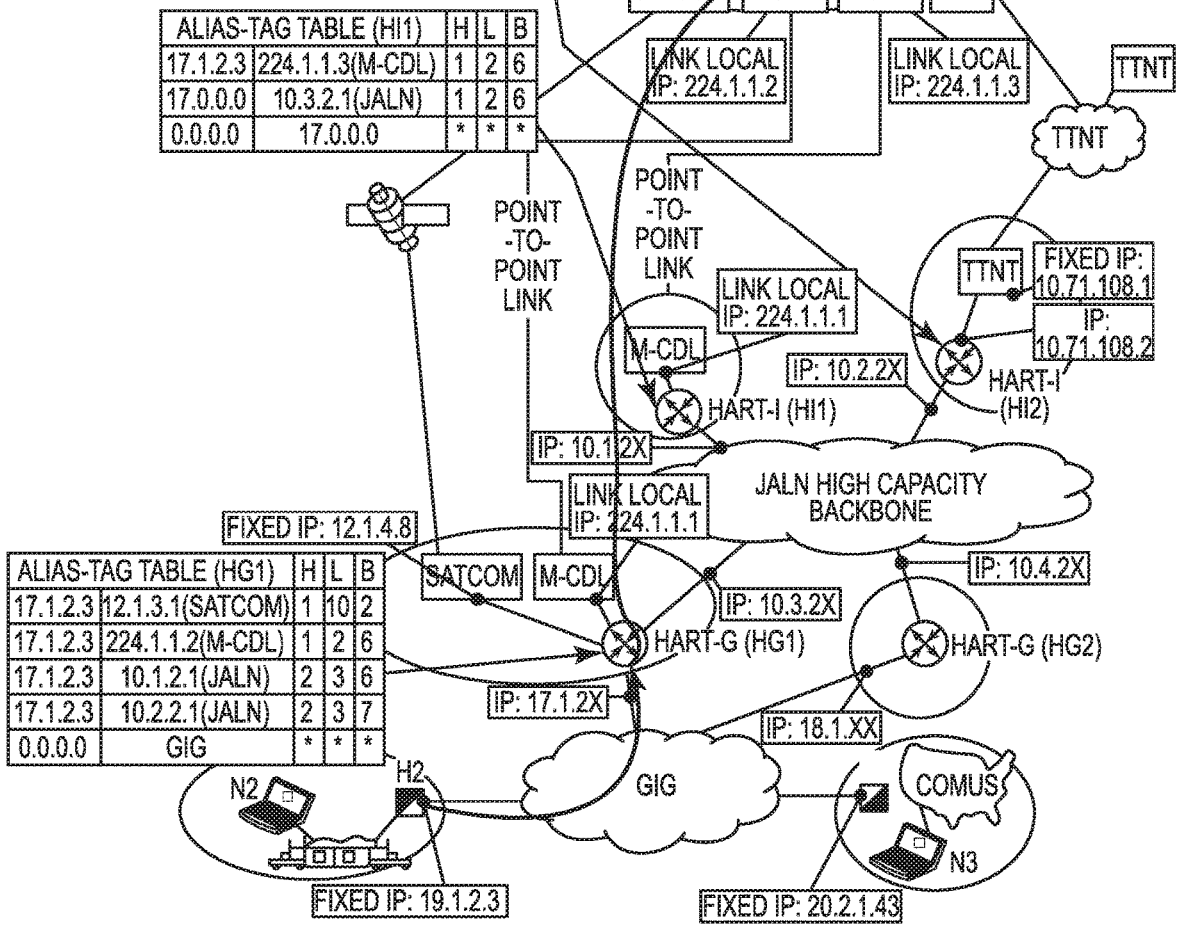
Figure 63:
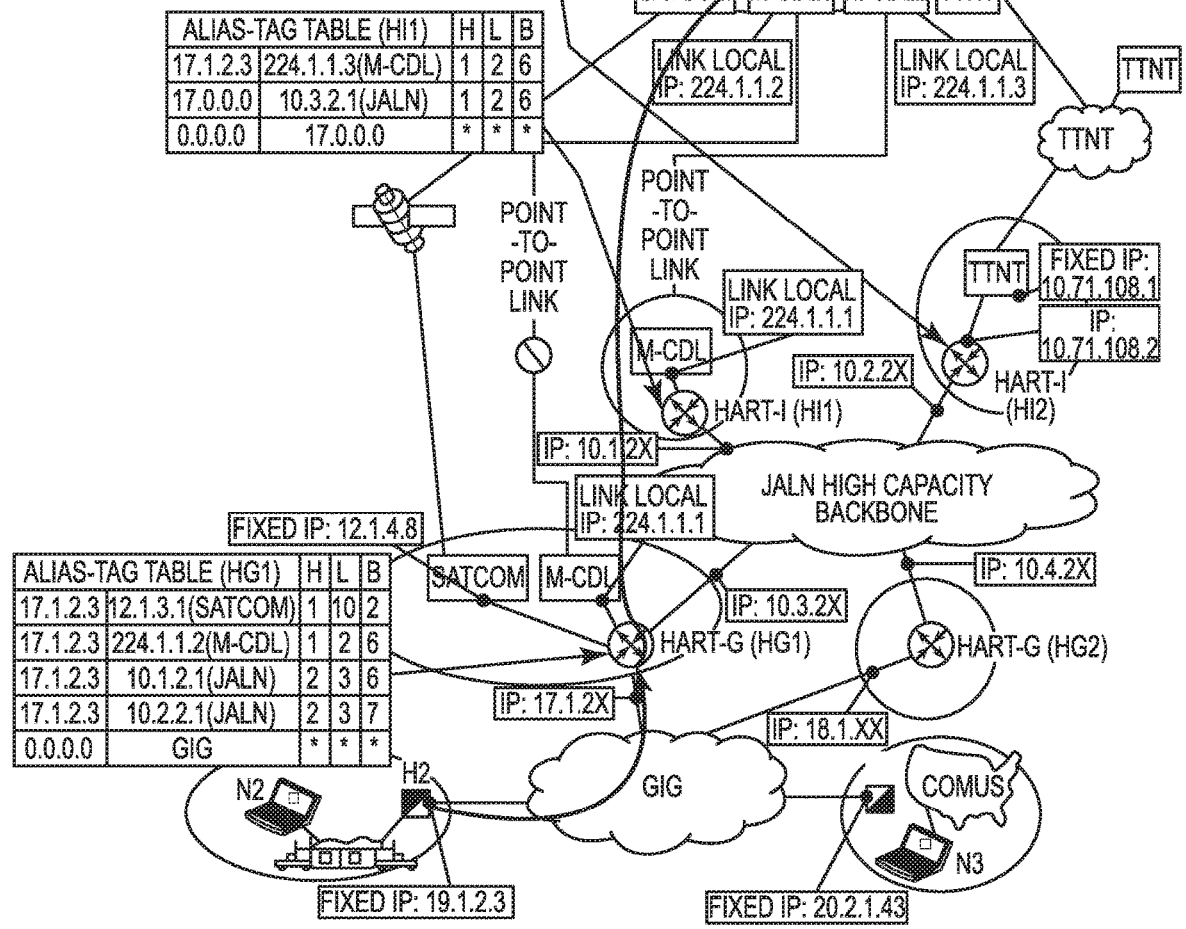
Figure 64:
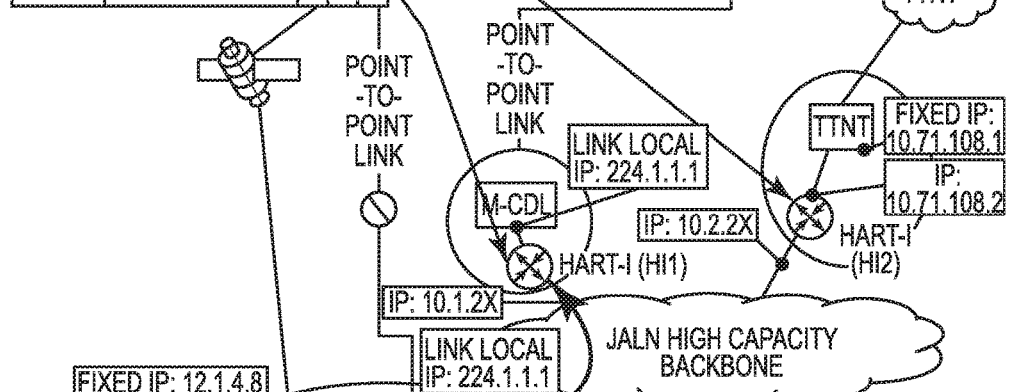
Figure 65:
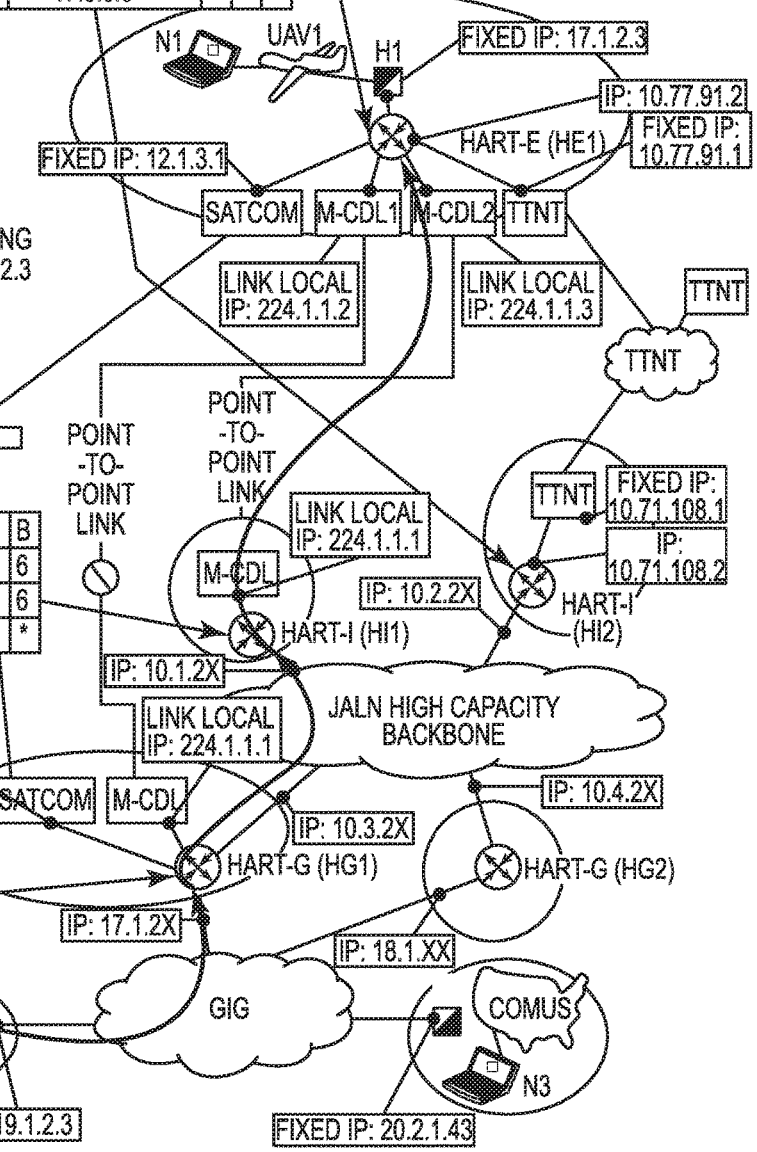
Figure 66:
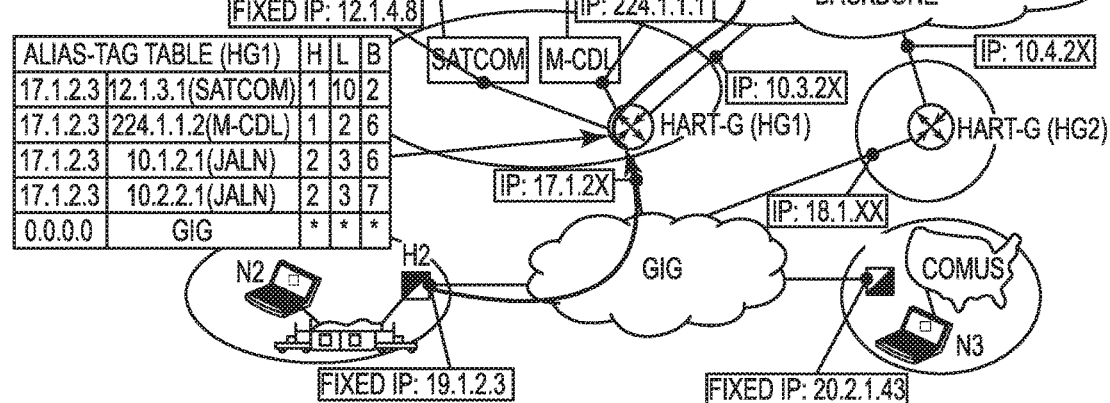
Figure 67:
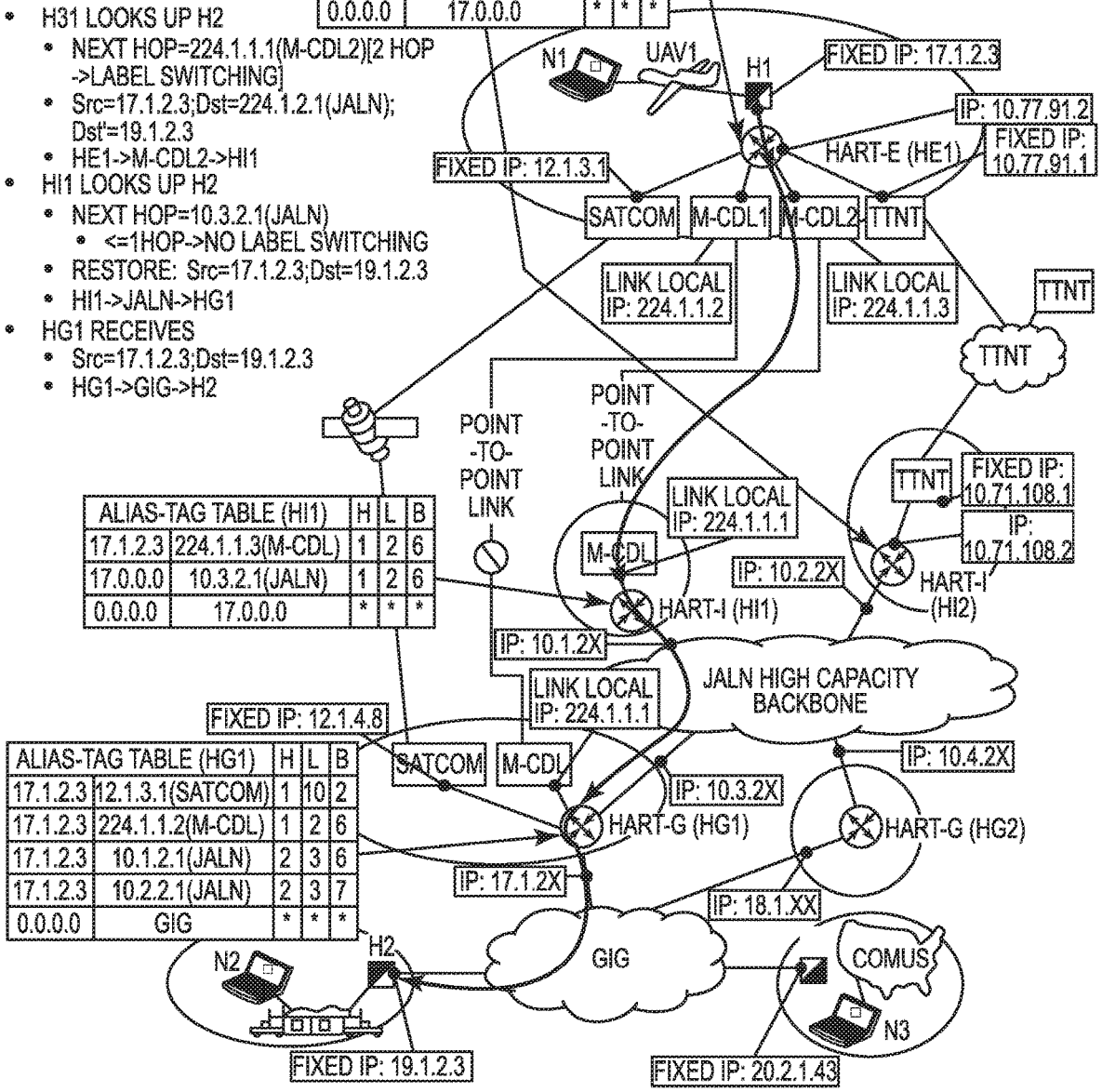
Figure 68:
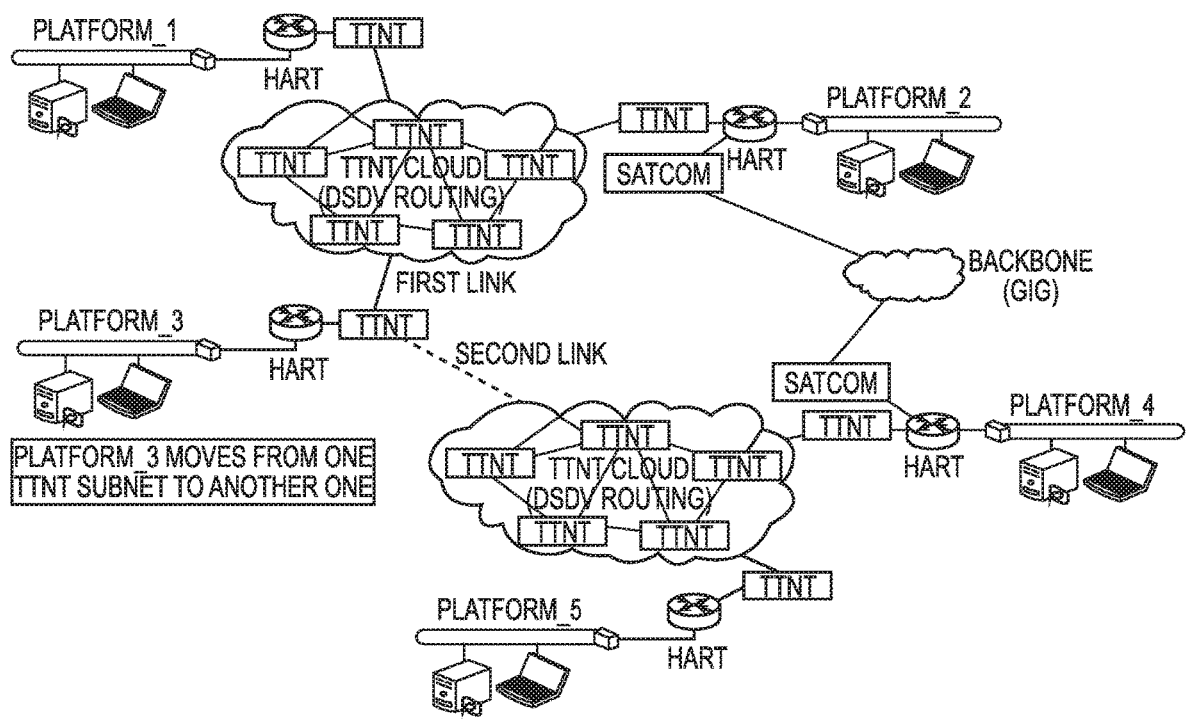
Figure 69:
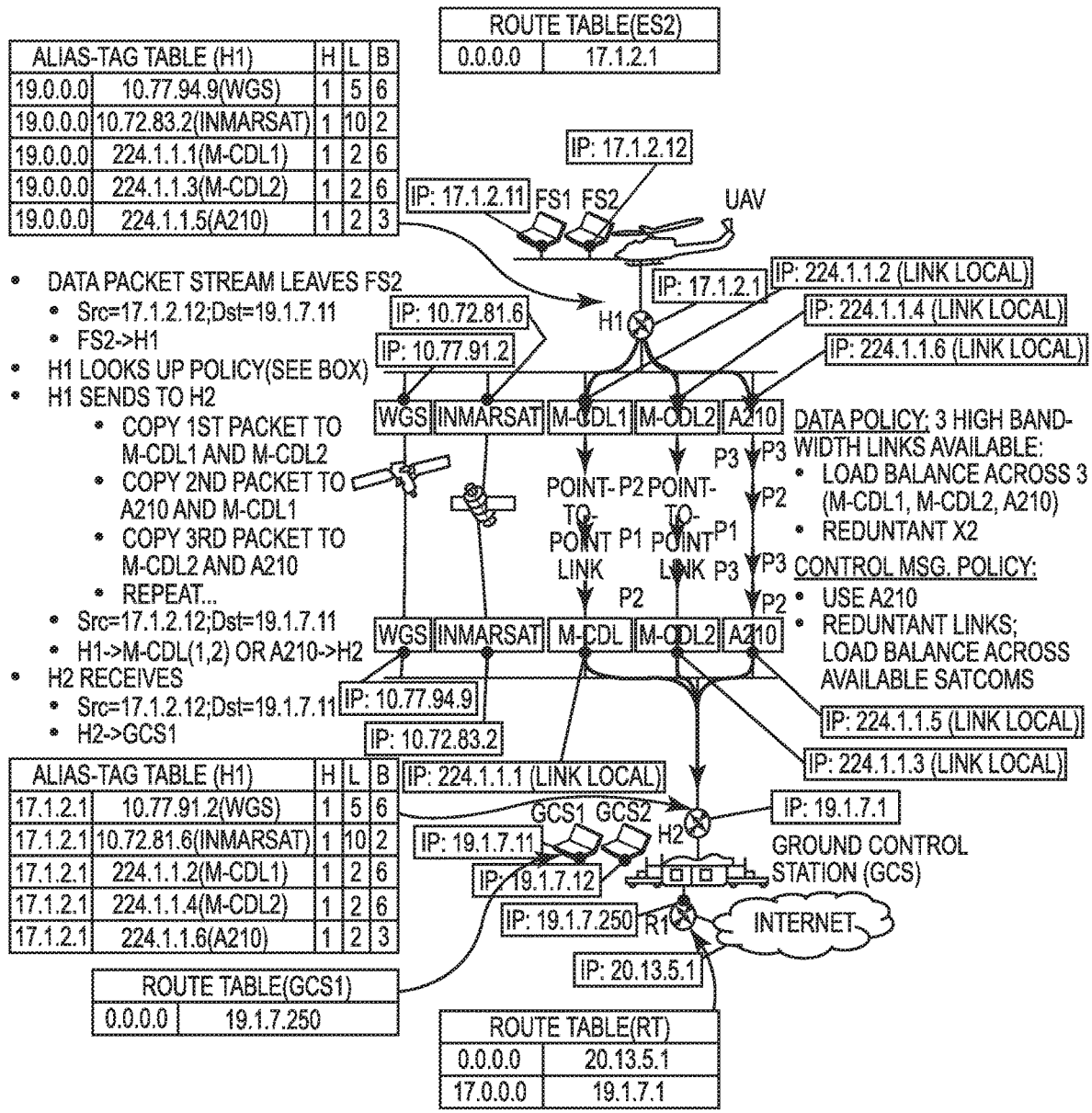
Figure 70:
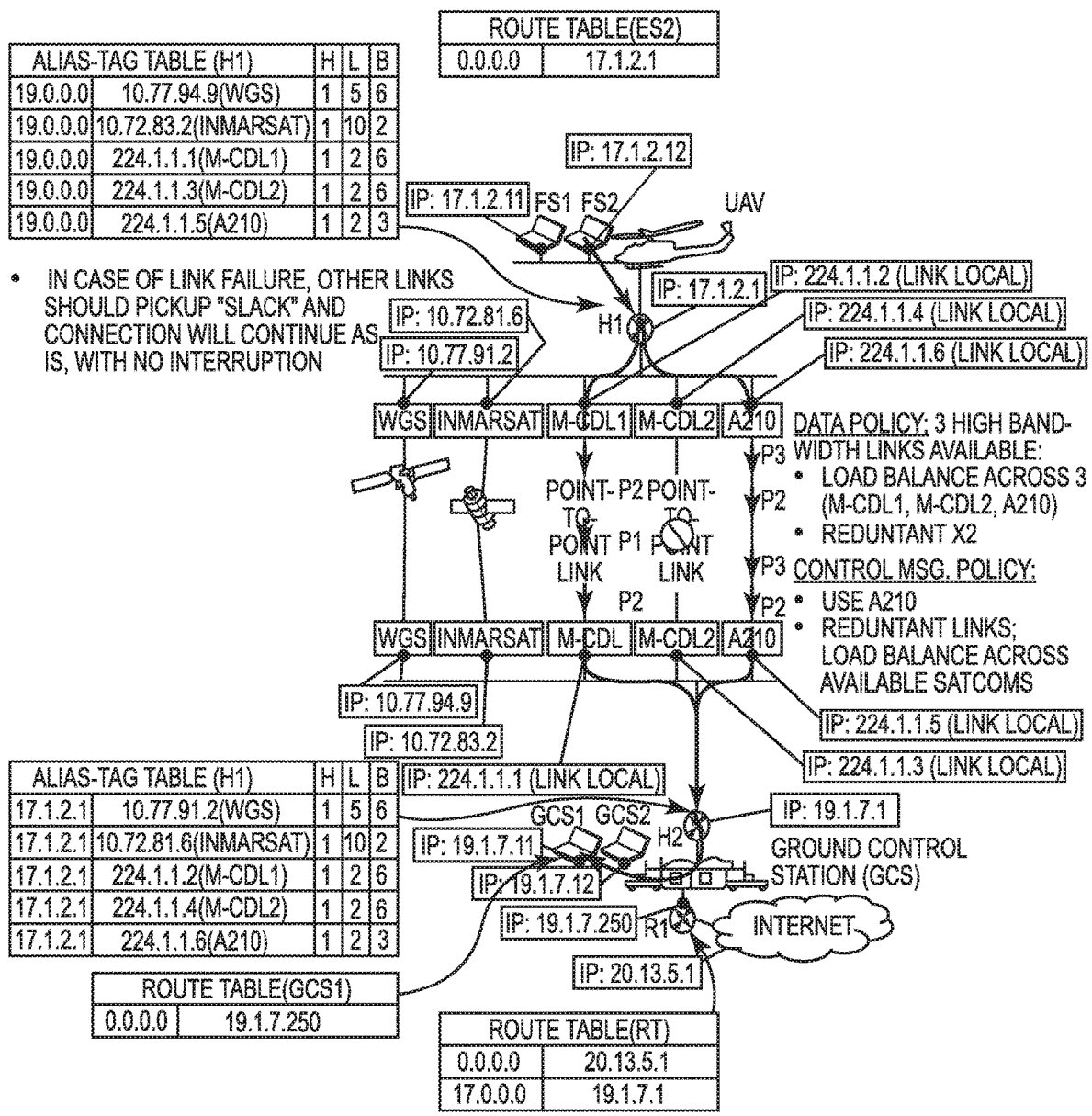
Figure 71:
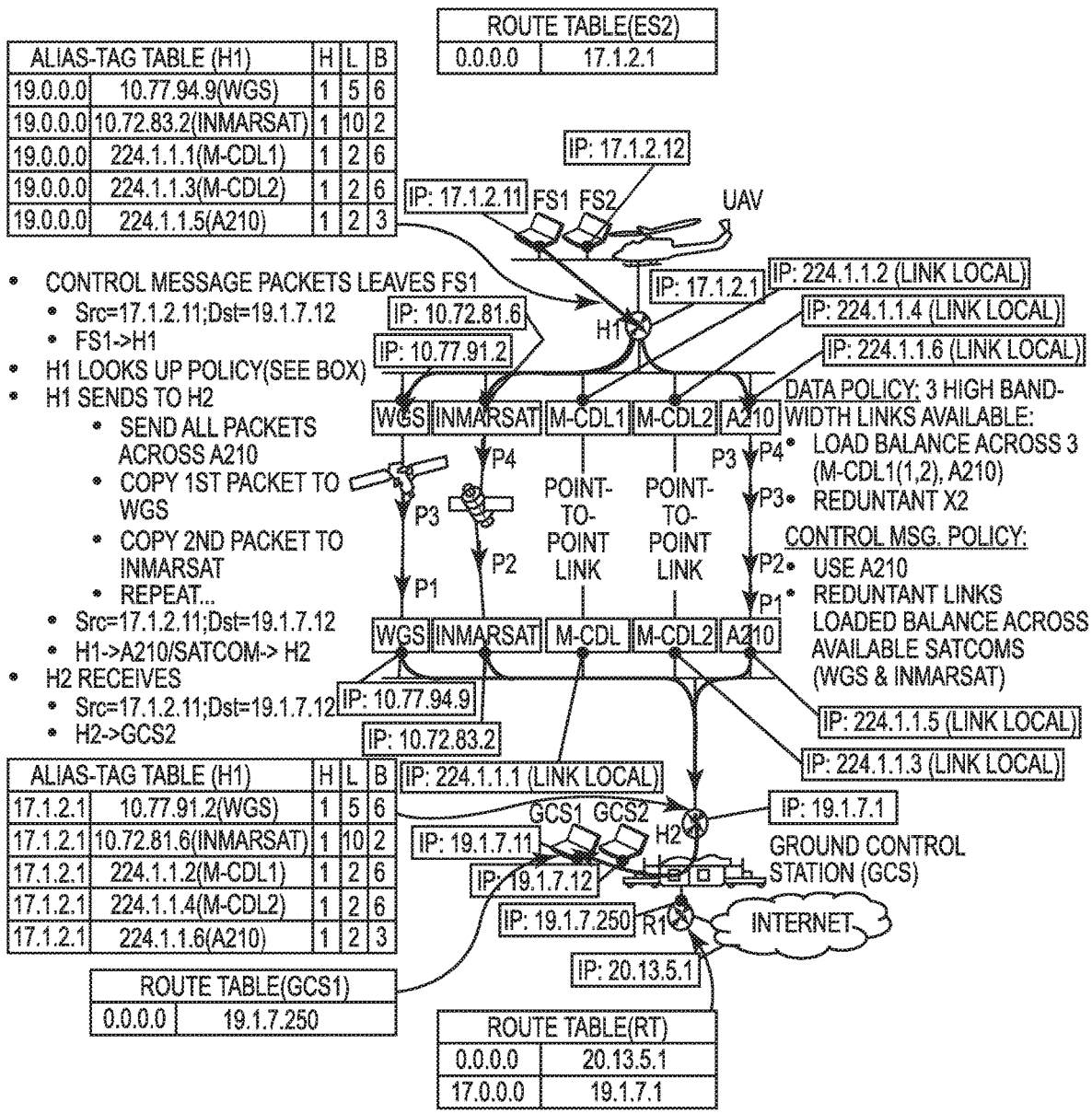
Figure 72:
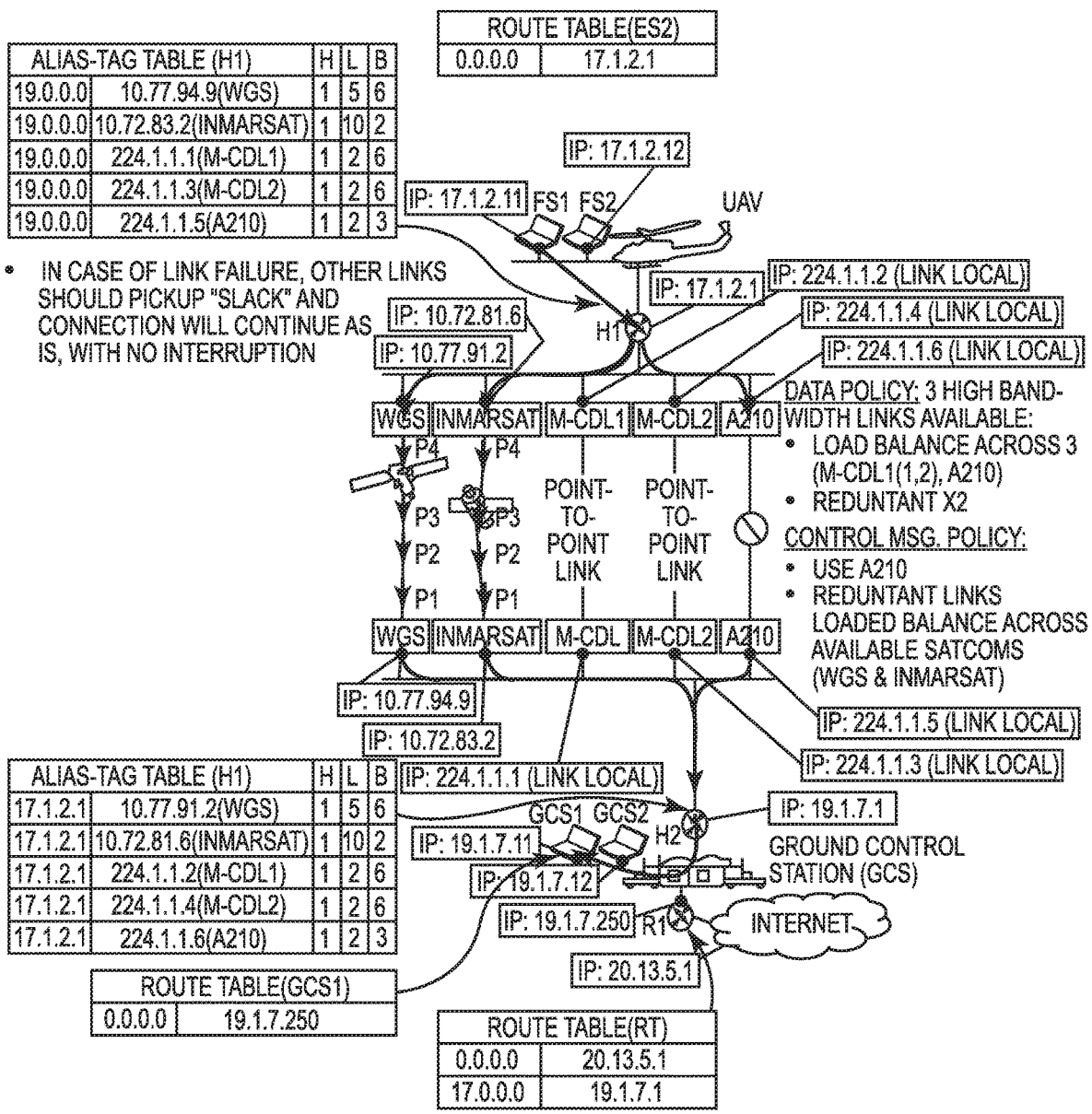

FIG. 25*a* and FIG. 25*b* illustrate routers constructed in accordance with an embodiment of the present invention installed in a test bed with mini-CDL radios;

FIG. 26*a* is a diagram illustrating how data is routed in the absence of load balancing;

FIG. 26*b* is a diagram illustrating data flow balanced across available links;

FIG. 27 is an illustration of one scenario of maximized network performance;

FIG. 28 is an illustration of a second scenario of maximized network performance;

FIG. 29, FIG. 30 and FIG. 31 are diagrams illustrating subnet convergence function with link quality monitoring;

FIG. 32 is a diagram illustrating flow control;

FIG. 33 is a diagram illustrating bandwidth and latency monitoring;

FIG. 34 is a diagram illustrating packet loss detection;

FIG. 35 and FIG. 36 are diagrams illustrating subnet convergence function utilizing flow control;

FIG. 37 and FIG. 38 are diagrams illustrating subnet convergence utilizing traffic redirection;

FIG. 39 and FIG. 40 are diagrams illustrating quality of service aware unicast routing service;

FIG. 41 and FIG. 42 are diagrams illustrating mobility management function;

FIG. 43 and FIG. 44 are diagrams illustrating load balancing function;

FIG. 45 is a diagram illustrating a test in which redundant paths between subnetworks are created and on the paths is impaired;

FIG. 46 is a diagram illustrating a test which recreates redundant links and verifies load balancing enhancing multicast efficiency;

FIG. 47 is a diagram illustrating a test platform for network aware, traffic aware; proactive failover and load balancing;

FIG. 48 is a diagram illustrating a use case of routers constructed in accordance with an embodiment of the present invention showing an initial state and setup before join;

FIG. 49 is a diagram illustrating the use case of FIG. 48 when a node joins the network (step 1);

FIG. 50 is a diagram illustrating the use case of FIG. 48 when a node joins the network (step 2);

FIG. 51 is a diagram illustrating the use case of FIG. 48 when a node joins the network (step 3);

FIG. 52 is a diagram illustrating the use case of FIG. 48 when a node joins the network (step 4);

FIG. 53 is a diagram illustrating the use case of FIG. 48 when a node joins the network (step 5);

FIG. 54 is a diagram illustrating the use case of FIG. 48 when a node joins the network (step 6);

FIG. 55 is a diagram illustrating the use case of FIG. 48 when a node joins the network (step 7);

FIG. 56 is a diagram illustrating the use case of FIG. 48 when a node joins the network (step 8);

FIG. 57 is a diagram illustrating the use case of FIG. 48 when a node joins the network (step 9);

FIG. 58 is a diagram illustrating the use case of FIG. 48 when a node joins the network (step 10);

FIG. 59 is a diagram illustrating the use case of FIG. 48 when a node joins the network showing completed table entries;

FIG. 60 is a diagram illustrating a use case of routing a packet (step 1);

FIG. 61 is a diagram illustrating the use case of FIG. 60 routing a packet (step 2);

FIG. 62 is a diagram illustrating the use case of FIG. 60 routing a packet (step 3);

FIG. 63 is a diagram illustrating a use case of routing a packet;

FIG. 64 is a diagram illustrating a use case of re-routing a packet (step 1);

FIG. 65 is a diagram illustrating the use case of FIG. 64 re-routing a packet (step 2):

FIG. 66 is a diagram illustrating the use case of FIG. 64 re-routing a packet (step 3);

FIG. 67 is a diagram illustrating a use case of routing a packet illustrating a return path:

FIG. 68 is a diagram illustrating a use case of routers constructed in accordance with an embodiment of the present invention showing a node moving from one TTNT subnet to another TTNT subnet;

FIG. 69 is a diagram illustrating a use case of routers constructed in accordance with an embodiment of the present invention showing routing using replication and balancing;

FIG. 70 is a diagram illustrating a use case of routers constructed in accordance with an embodiment of the present invention showing a link fault while routing data;

FIG. 71 is a diagram illustrating a use case of routers constructed in accordance with an embodiment of the present invention showing routing of control messages; and FIG. 72 is a diagram illustrating a use case of routers constructed in accordance with an embodiment of the present invention showing routing of control messages with link failure.

Figure 73A:
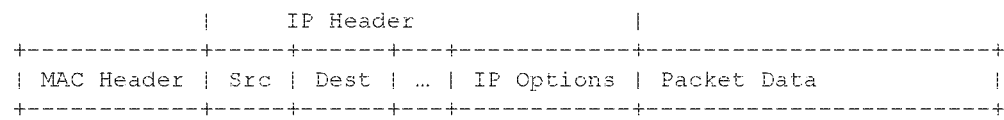

FIG. 73A is a diagram illustrating a format for an original packet.

Figure 73B:
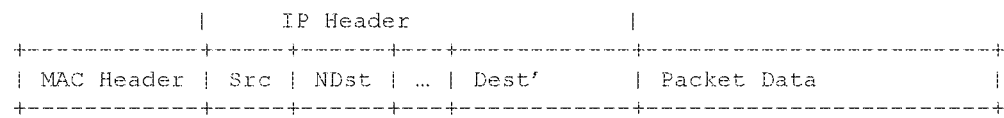

FIG. 73B is a diagram illustrating a format for a first option of a HART address switched packet.

Figure 73C:
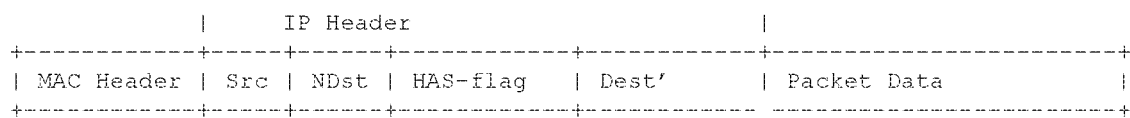

FIG. 73C is a diagram illustrating a format for a second option of a HART address switched packet.

Figure 74A:
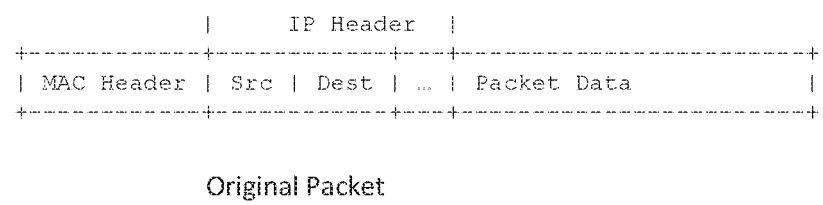

FIG. 74A is a diagram illustrating a format for an original packet.

Figure 74B:
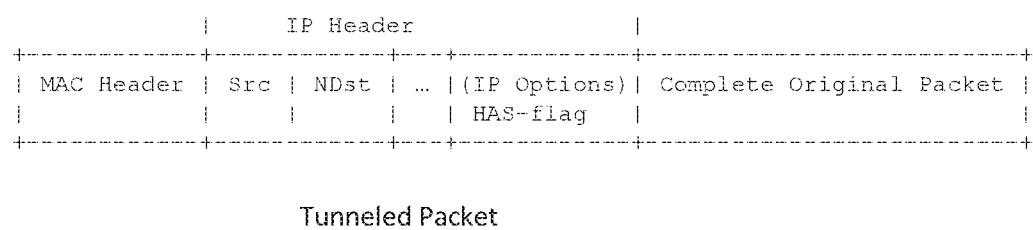

FIG. 74B is a diagram illustrating a format for a HART tunneled packet.

DESCRIPTION

A hybrid router, an autonomous IP based network integration solution that provides end-to-end sensor-to-shooter connectivity across a heterogeneous tactical network is disclosed. This network consists of IP sub-networks of various types such as TTNT (Tactical Targeting Network Technology), mini-CDL (Common Data Link), free space optics communications (FSOC), QNT (Quint Networking Technology), and JCAN (Joint Capability for Airborne Networking). These integrated networks provide improved tactical communications and situational awareness. Network integration is the convergence of many IP devices (wired, wireless, radio, optical) each forming IP subnets into a single IP network. Each of the device subnets may be IP capable on their own, but cannot integrate seamlessly and automatically with others.

The Hybrid Autonomous Router for Tactical Networks (HART) is a self-configuring integration router software module that interconnects heterogeneous subnets of differing IP devices into a single routable network implemented for integration with a mini-CDL radio.

The HART integration router is a software tool that can be added into existing commercial routers on an add-on card, integrated into software routers such as quagga or vyatta, or can be installed in a network appliance where data is sent through the appliance. These HART Integration Routers may be installed on appliances and nodes throughout the black-side of a network.

Figure 1:
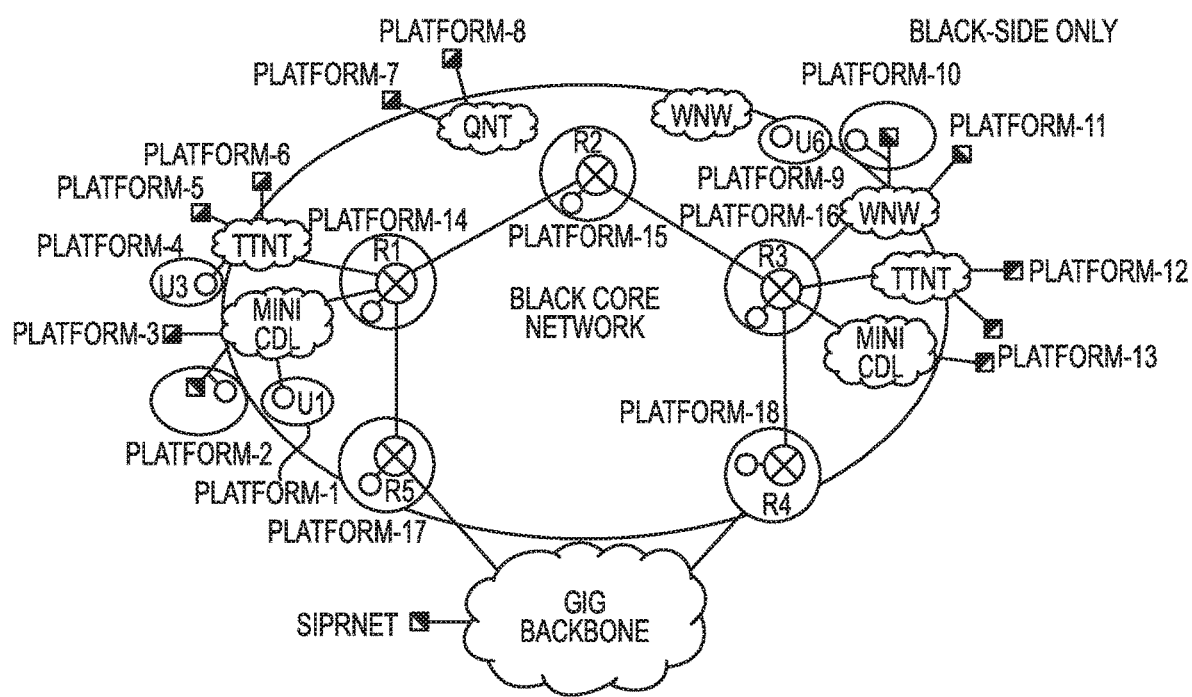
FIG. 1 illustrates an embodiment of an airborne network built from mixed IP devices.

Many different wireless networking technologies are currently used to build airborne networks today. These wireless networks operate on different frequencies, use different waveforms, and provide limited autonomous switching and routing capability. This is shown in FIG. 1.

Existing approaches for integrating these heterogeneous wireless networks suffer from four major limitations overcome by the HART approach:

(5) inability to adapt dynamically to topology changes in the network;
(6) need for excessive manual configuration;
(7) lack of scalability with network size;
(8) inability of routing protocols to factor wireless link quality into routing decisions, resulting in sub-optimal network performance.

HART addresses two major technical challenges that remain unaddressed by the state of the art to achieve the desired capability of an autonomous integration router for tactical edge networks:

1. Autonomous Mission Persistent Network Connectivity, i.e., the development of a scalable and automatic approach for establishing and maintaining end-to-end connectivity between user nodes in a dynamically changing tactical network topology with intermittent connectivity to the global information grid ("GIG").
2. Autonomous Mission Optimized Network Connectivity, i.e. the development of an enhanced tactical routing approach that is aware of the dynamic changes in the quality of wireless links within the tactical network and that factors link quality into its computation of end-to-end routes to optimize network and mission performance.

Figure 2A:
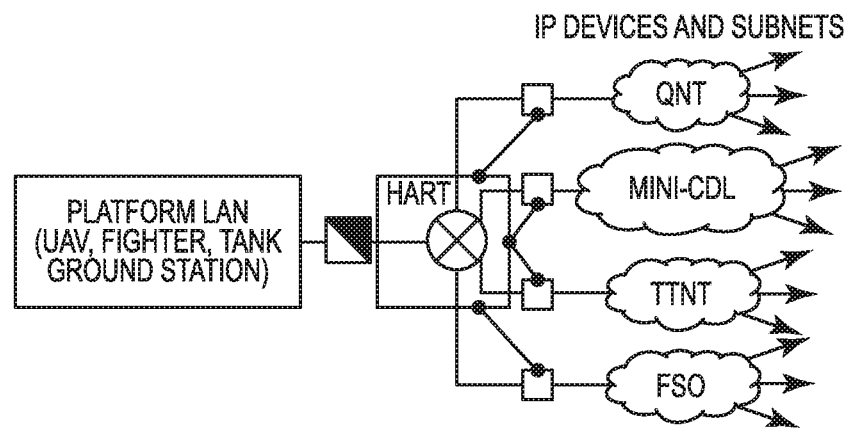
FIG. 2a is a block diagram of hardware of a router constructed in accordance with an embodiment of the present invention.
Figure 2B:
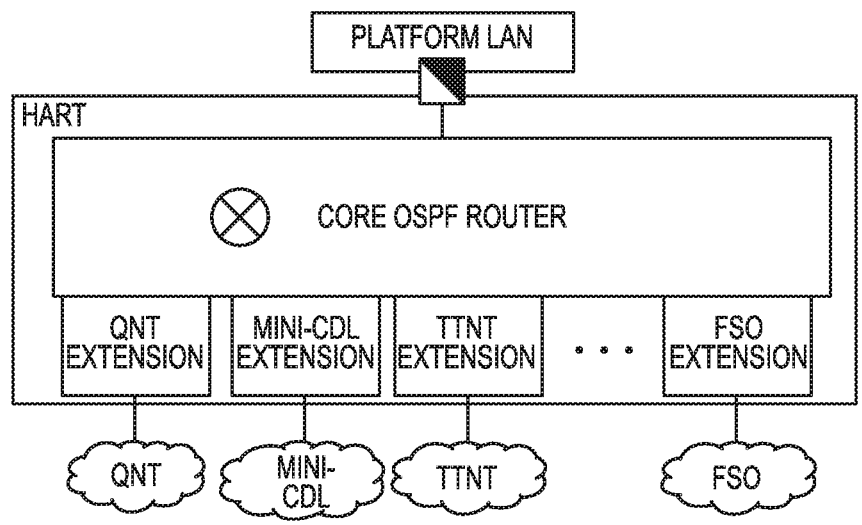
FIG. 2b is an illustration of the software architecture of a router constructed in accordance with an embodiment of the present invention.

FIG. 2*a* shows a block diagram of the hardware where the integration router (HART) contains multiple interfaces, i.e., a LAN interface connected to a HAIPE-fronted platform LAN and WAN interfaces connected to different wireless terminals, e.g., TTNT, QNT, mini-CDL, FSO). Some of these wireless terminals implement bridged IP subnets (e.g., mini-CDL, FSO) while others implement routed IP subnets using proprietary routing protocols (e.g., TTNT, QNT). The software architecture of the HART integration router, shown in FIG. 2*b*, consists of a core OSPF routing function with plug-in router extensions for each type of wireless terminal. The terminal-specific router extensions implement the HART innovations listed above to enable performance-optimized routing across the heterogeneous collections of bridged and routed IP subnets.

The HART approach has two major beneficial features:

1. It requires no modifications to the software of existing tactical IP radios and optical modems to deliver its network integration and enhanced tactical routing capabilities. This facilitates rapid deployment of the technology in the field by eliminating the need to coordinate software changes with the various vendors of wireless IP terminals.
2. It lends itself to a modular implementation architecture where the HART mechanism and techniques are implemented as plug-in software modules that can either be (1) integrated within existing software routers (e.g., quagga, XORP); or (2) executed on add-on processor modules for commercial hardware routers (e.g., within an AXP card for a Cisco router); or (3) integrated within commercially-available programmable high-speed packet processing appliances (e.g., EZappliance).

Underlying the HART approach for network integration and enhanced tactical routing is a set of innovative techniques and mechanisms that will be implemented within software module that can be installed either as an add-on to existing routers, or as a network appliance within existing networks. To address the challenges and capability gaps described above, the HART software may provide these capabilities:

Hybrid routing;
Quality-aware routing;
Integration with existing Sub-networks.

Hybrid Routing

HART employs a hybrid routing approach to establish and maintain end-to-end connectivity between nodes in a mobile tactical network environment. It employs a direct routing approach for connecting nodes within the tactical AS (Autonomous Systems) and uses a mobile IP based overlay routing approach with tactical enhancements for connecting tactical nodes to nodes in the GIG. The enhanced Mobile IP based technique eliminates the packet encapsulation overhead associated with overlay routing when packets traverse the bandwidth-constrained tactical user sub-nets. The HART Hybrid routing addresses both:

Intra-Tactical-AS Routing;
Routing between the Tactical-AS and the GIG.

Quality-Aware Routing

The proposed approach for enhanced tactical routing is based on dynamic route selection using link quality and using optical and other link types as failover links when primary links failed or degraded. This is now expanded to become more generic to allow more flexibility for Quality aware routing. HART tracks link quality using network monitors, link probes and other techniques. This quality-aware link monitoring will be used to calculate a Link Quality Metric (LQM). The LQM will be stored in HART and updated in the router on the HART machine adding quality-aware routing to existing routers (which do not have a way to monitor and probe the link quality).

Integration with existing Sub-networks

The HART module integrates with existing subnets and gateways (e.g. JCAN: Joint Capability for Airborne Networking and BACN: Battlefield Airborne Communications Node) as a separate AS (Autonomous Systems). It uses the innovative BGP-MX (BGP with Mobility Extensions) service to exchange network reachability information with these other ASes. BGP-MX overcomes static manual configuration of BGP peering arrangements by implementing mechanisms that enable transit routers in a mobile AS environment to (1) dynamically discover BGP peers from a different AS and automatically establish a peering relationship; and (2) converge rapidly to a new route in response to changes in the topology of the backbone networks.

Discussion

The HART approach can be used for network integration and enhanced tactical routing in a heterogeneous tactical networking environment. The HART approach may be used to enhance the following:

Analyze Network Integration Requirements;
Develop Design of Protocols and Services;
Evaluate Performance using Simulations;
Develop Product Implementation Architecture.

Analysis

Use cases of diverse multi-subnet environments and situations have been created such as: nodes joining or leaving a network; or nodes moving from one network (using TTNT) to another network (using Mini-CDL). Other use cases involved requested data flows from the ground to an aerial node, the reverse, and data flows from aerial node to aerial node. Some of these Use Cases are included in Appendix B below.

In various embodiments, HART solves:

No changes to existing radios and COTS routers;
Provide GIG to Airborne Network (AN) endpoint connectivity (and reverse);
Provide GIG to Airborne Network (AN) endpoint connectivity (and reverse);
Provide quality aware link and route selection.

These use cases were analyzed to determine what an integration router monitors, and what network dynamics are tracked, and what options are configured in existing hardware (routers and radios).

The HART design is refined by analyzing several real-world use cases of multi-subnet environments with different radio and routing capabilities.

After the design was refined, a subset of functionality was selected to create a prototype to demonstrate the HART approach. The features selected for prototyping were proactive failover across many links and integration with a Mini-CDL radio and interface. With the proactive failover mechanism, the HART router monitors the quality of each radio link to detect when it falls below a specified threshold. Upon detection of unacceptable link degradation, the HART router proactively routes all IP packet flows traversing the degraded link to a backup link of higher quality. If or when the original link recovers its quality, the IP packet flows are switched back to this link. Current systems provide no capability for proactive link failover; failover occurs only after a complete breakdown of a link. Application performance suffers as a consequence. In addition to proactive link selection, the HART prototype implements multi-level policy-based failover (1, 2, 3, 4, 5 or more backup links in a prioritized order), a capability that is not supported within COTS routers. For instance, with conventional routers, if the policy route for an IP flow were to fail it will be routed over the default interface. Unlike HART, secondary and tertiary policy routes cannot be specified with conventional routers.

HART Overview

Network integration is the convergence of many IP devices (wired, wireless, radio, optical) each forming IP subnets into a single IP network. Each of these device subnets may be IP capable on their own, but cannot integrate seamlessly and automatically with others. Appendix A outlines the list of IP device targets, the interface method, and device subnet integration.

HART software provides heterogeneous network integration. HART addresses these problems by integrating the following techniques into Autonomous Integration Routers:

Hybrid routing;
Dynamic subnet domain name service;
Quality-aware link monitoring and routing; and
Mobility-enhanced BGP (or BGP-MX).

Figure 3:
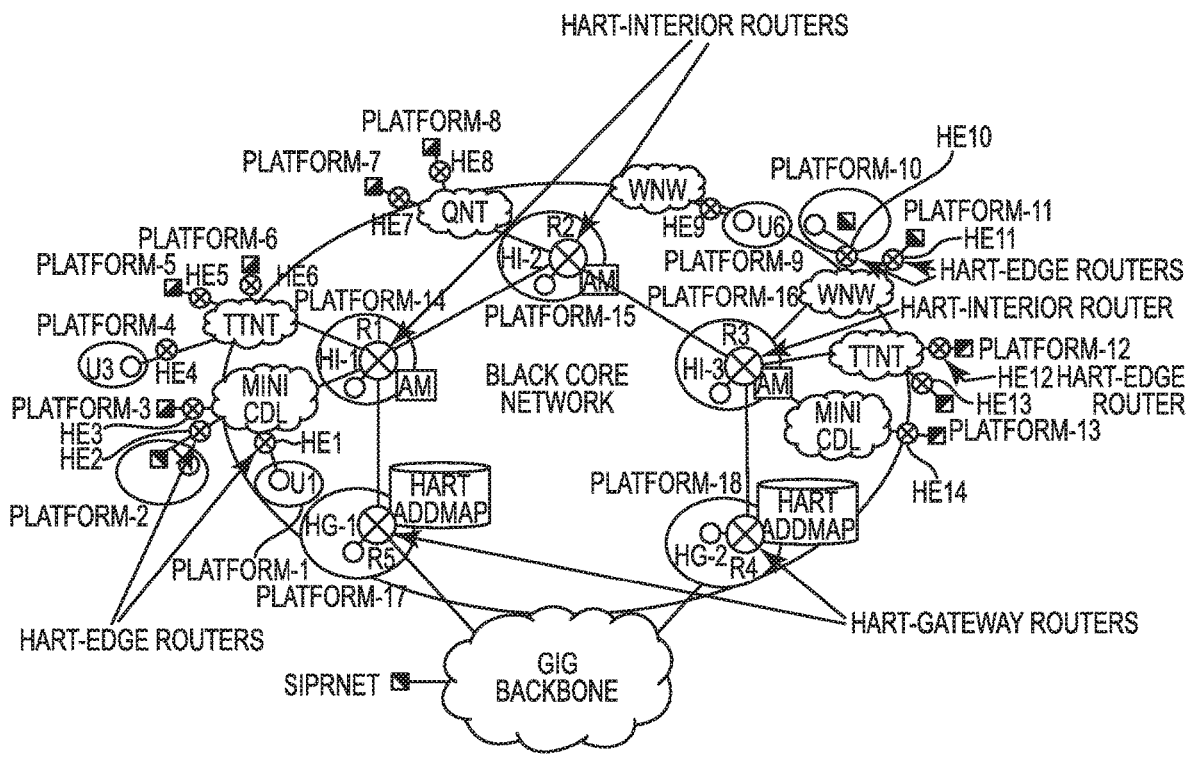
FIG. 3 is a diagram of an airborne network with routers constructed in accordance with an embodiment of the present invention.

These HART Integration Routers may be installed throughout the black-side network, as shown in FIG. 3.

The HART integration router is a software tool that can be added into existing commercial routers on an add-on card, integrated into software routers such as quagga or vyatta, or can be installed in a network appliance and where data is sent through the appliance.

Figure 4:
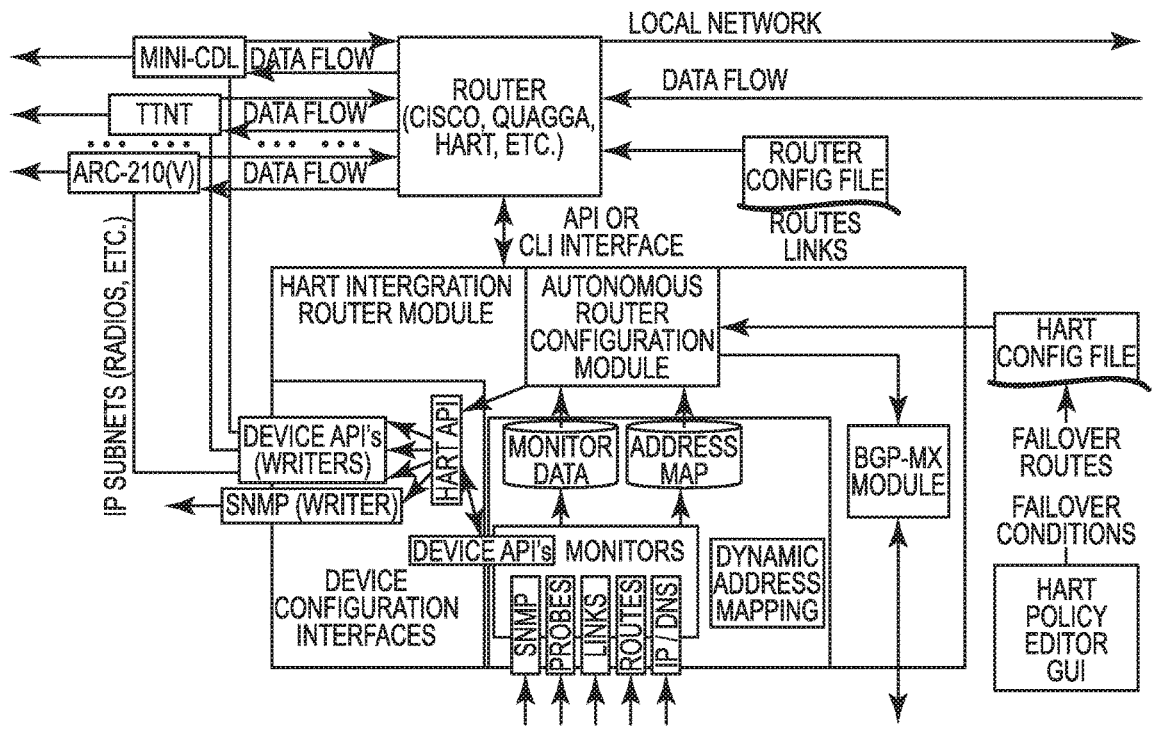
FIG. 4 is a block diagram of software architecture of the present invention.

The HART software module has six components shown in 4. FIG. 4 also shows the data flow between each of these components. The components are:

Topology and Address Tracking (TAT)—Dynamic Address Map;
Autonomous Router Configuration (ARC) Module;
Device Configuration Interfaces (DCI);
HART Policy Editor;
BGP-MX module;
Router.

Core Network Integration Requirements

This section describes what configuration options to route IP packets on tactical networks. Each end node has an IP address and default route/router and the routers track routes to other subnets.

The configurations for each node are:

IP address;
Default route/default router/gateway;
Subnet mask and settings;
DNS settings (server/proxy addresses).

The configurations for each subnet are:

Default router;
List of IPs;
DNS settings;
Address allocation.

HART Components

The overall system for HART components:
Both IPv4 and IPv6;
Compatibility, to work with:
- Existing software/servers/systems: firewalls, proxy servers, caches, switches, routers and appliances, HAIPEs, gateways, filtering tools/appliances/apps, etc.;
- Hardware vendors: security and network vendors, including: Cisco, Sun, Microsoft, Check Point, and 3com;
- Applications: ISR, C2 and targeting (sensors to shooters);
- Various data types: voice, data, video, sound and security;

Scalability: 1000's of nodes, across 10's or 100's of subnets and AS's, all mobile and moving;
Work in red/black networks.

The topology tracker and routing component integrates with the various monitors to track topology and make routing decisions.
- Integrate with monitors;
- IP address assignment, if appropriate;
    - Coordinate across the entire hybrid tactical-AS;
    - IPv4 & IPv6 address spaces;
    - Push address changes to node configuration writers;
- Routing: make dynamic route decisions;
    - Route from 1 subnet type to another (TTNT to Mini-CDL);
    - Leverage commercial router practices that provide a common switching fabric while interchanging line cards operating at different data rates (i.e. T1, DS-3, OC-192);
    - Subnet handoff (node moves from TTNT to QNT, or moves from TTNT and adds mini-CDL, and other use cases);
    - Perform multi-link, multi-channel, multi-antenna multi-path routing and communications topology configurations;
    - Perform static routing (mesh, ring, hub and spoke) between multiple subnets;
    - Perform mobile ad hoc routing between multiple subnets node join/leave, net join/leave;
- Provide a way to provision tunnels/links/flows;
    - Track a link/flow detail record (FDR).

Monitors integrate with the other components to provide network monitoring data:
- Node trackers—SNMP readers (routes, address, location, etc.);
- DNS monitor—(new IP's linked to old names, IP changes for names, red/black concerns, DNS probes, etc.);
- Link quality probes.

Node configuration writers provide the machine-to-machine interface for automatic configuration. It integrates with the other components to provide a single interface to write configuration options and settings to local and remote routers and wireless IP devices. These writer components may use SNMP and/or device specific API's;
- Provide a single option writing API to other components;
- Automatic configuration—HART without human involvement;
    - Local and remote programmatic (API) configuration options to set various IP settings [programmatic control of each radio/device/technology];
    - Use SNMP and/or other protocols/services;
    - May include radio/device specific API requirement.

Dynamic DNS proxy integrates with the other components to track DNS names, changes to DNS entries, and act as a DNS proxy to respond to DNS requests with dynamic responses;
- Integrate with DNS monitors;
- DNS name tracking;
    - HART should act as a proxy for a DNS server;
    - Track DNS name and link to 1 or all IPs for node (each subnet may have a different IP or range);
    - Link Mobile IP "permanent IP" to tactical-AS IP's and DNS name;
- Works in Red/black networks (Black side only, but may be aware of red side effects).

Quality aware proxy monitors the various links and paths connected to HART and across the network, then update the link metrics so that the routers can make smarter decisions:
- Integrate with link quality monitors;
    - Monitors link quality, bandwidth, latency, packet loss, # of retransmits, usage level, available bandwidth (total-used), etc. run these through a formula to produce a "quality metric";
    - Characterize static link and network performance, bit error rate, packet loss;
- Implement an RFC 5578 proxy;
- Initiate link-quality measuring probes;
- Make/help with routing decisions to optimize based on link quality;
    - Develop, demonstrate and analyze link fade, optical polarization rotation, pointing and tracking, antenna gain, link margins, bit error rates;
    - Update link metrics in local and remote routers and devices.

BGP-MX
HART treats other network integration system as separate ASs. This provides automatic configuration and integration with other networking systems in use
- Integrate seamlessly with BGP routers
- Dynamically discover BGP peers from other ASs and setup peering relationships
- Converge new routes rapidly in response to changes in topology
- Integrate with external ASs such as:
    - JCAN: Joint Capability for Airborne Networking subnets
    - GIG: Global Information Grid (backhaul/reachback)
    - BACN: Battlefield Airborne Communications Node
    - DISN: Defense Information System Network The HART addresses at least two major technical challenges to achieve desired capability of an autonomous integration router for tactical edge networks:
- Autonomous Mission Persistent Network Connectivity, i.e. the development of a scalable and automatic approach for establishing and maintaining end-to-end connectivity between user nodes in a dynamically changing tactical network topology with intermittent connectivity to the GIG.
- Autonomous Mission Optimized Network Connectivity, i.e. the development of an enhanced tactical routing approach that is aware of the dynamic changes in the quality of wireless links within the tactical network and that factors link quality into its computation of end-to-end routes to optimize network and mission performance.

Underlying the HART approach for addressing these challenges is a set of techniques that are listed in Table I below and described later.

TABLE 1

| Technical Challenges | HART Innovations |
|---|---|
| Autonomous Mission Persistent Connectivity | ✓ Hybrid routing with address switching |
| Autonomous Mission Optimized Connectivity | ✓ Autonomous quality aware routing |

Figure 5:
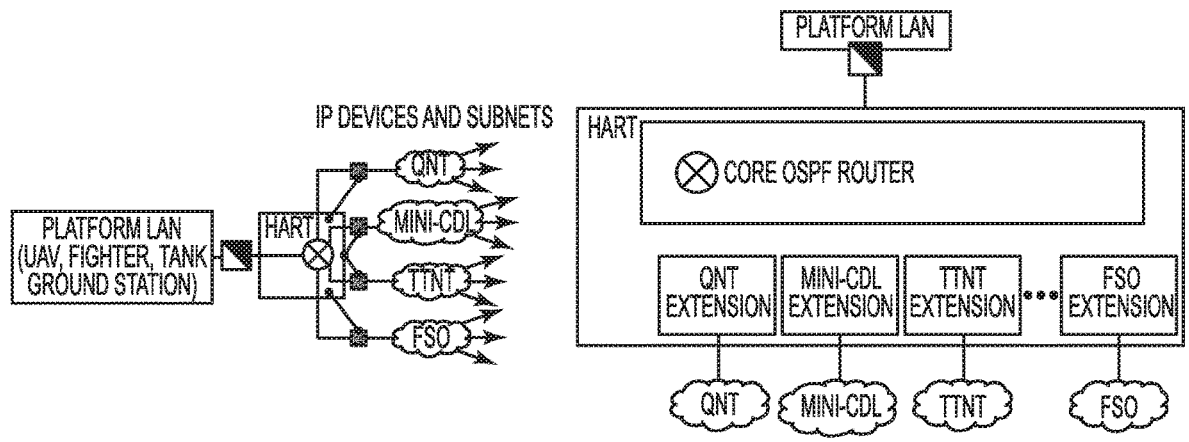
FIG. 5 is a conceptual view of a router constructed in accordance with an embodiment of the present invention containing multiple interfaces.

FIG. 5 shows a conceptual view of the HART solution where the integration router contains multiple interfaces, i.e., a LAN interface connected to a HAIPE-fronted platform LAN and WAN interfaces connected to different wireless terminals, e.g., TTNT, QNT, mini-CDL, FSO). Some of these wireless terminals implement bridged IP subnets (e.g., mini-CDL, FSO) while others implement routed IP subnets using proprietary routing protocols (e.g., TTNT, QNT). The software architecture of the HART integration router, shown in FIG. 5, consists of a core OSPF routing function with plug-in router extensions for each type of wireless terminal. The terminal-specific router extensions implement the HART innovations listed above to enable performance-optimized routing across the heterogeneous collections of bridged and routed IP subnets.

The HART approach has two major beneficial features:
It has no modifications to the software of existing tactical IP radios and optical modems to deliver its network integration and enhanced tactical routing capabilities. This facilitates rapid deployment of the technology in the field by eliminating coordination of software changes with the various vendors of wireless IP terminals.
It lends itself to a modular implementation architecture where the HART mechanism and techniques are implemented as plug-in software modules that can either be (1) integrated within existing software routers (e.g., quagga, XORP); or (2) executed on add-on processor modules for commercial hardware routers (e.g., within an AXP card for a Cisco router); or (3) integrated within commercially-available programmable high-speed packet processing appliances (e.g., EZ appliance).

In an overview, HART software will provide heterogeneous network integration. The HART approach for addressing these problems will integrate the following innovative techniques into Autonomous Integration Routers:
Hybrid routing Dynamic Topology and Address Tracking
Quality-aware link monitoring and routing
Mobility-enhanced BGP (or BGP-MX)

HART Hybrid routing enables OSPF-based dynamic route discovery and maintenance in a mobile ad hoc airborne network with a diverse set of bridge IP subnets (mini-CDL, FSOC) and routed IP subnets (TTNT, QNT). HART uses OSPF [Boe06, Ci05] between HART nodes and then export routes to (and import routes from) existing routers and radio hardware that may implement proprietary routing protocols. This is in contrast to current solutions that use tunneling of data packets across subnets such as TTNT and thereby incurring excessive network overhead. To eliminate the overhead associated with tunneling data packets across routed IP subnets, such as TTNT, HART will use a novel packet forwarding technique called "address switching" for TTNT, QNT and other tactical routed IP subnets.

To support address switching, HART tracks the names and addresses of node as they join and leave the various subnets. This data is used to track aliases (names or labels) of the nodes in the network as they move. This data forms a topology of the network that HART uses to augment the routing within the network. The topology information is similar to a routing table and is stored as "alias-tag" entries which form the Topology and Address Tracking (TAT) Database. HART uses this alias-tag table along with HART policies to determine routes to use and configuration changes to make on the routers. The policies define link augmentations like replicate data across two or more links to provide for redundancy, or failover priority if links fail or degrade.

In addition to topology data, HART tracks link quality using network monitors, link probes and other techniques. This quality-aware link monitoring is used to calculate a Link Quality Metric (LQM). The LQM is stored in HART and updated in the router on the HART machine adding quality-aware routing to existing routers (which do not have a way to monitor and probe the link quality).

In tactical and airborne networks other domains (groups of subnets) form ASes (Autonomous Systems). ASes use a protocol called BGP to route between ASes. BGP does not support mobility and dynamic configuration. BGP-MX is a mobility extension for BGP to provide support for mobility and automatic discovery.

Figure 6:
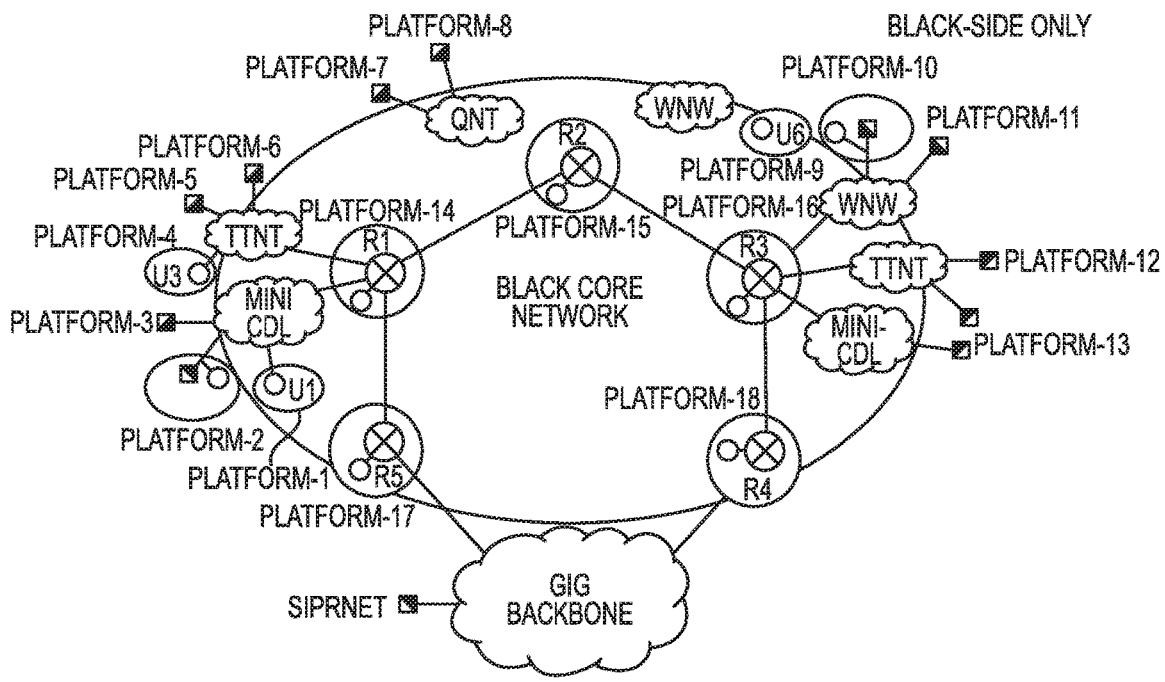
FIG. 6 illustrates the black side of a notional multi-subnet airborne network.
Figure 7:
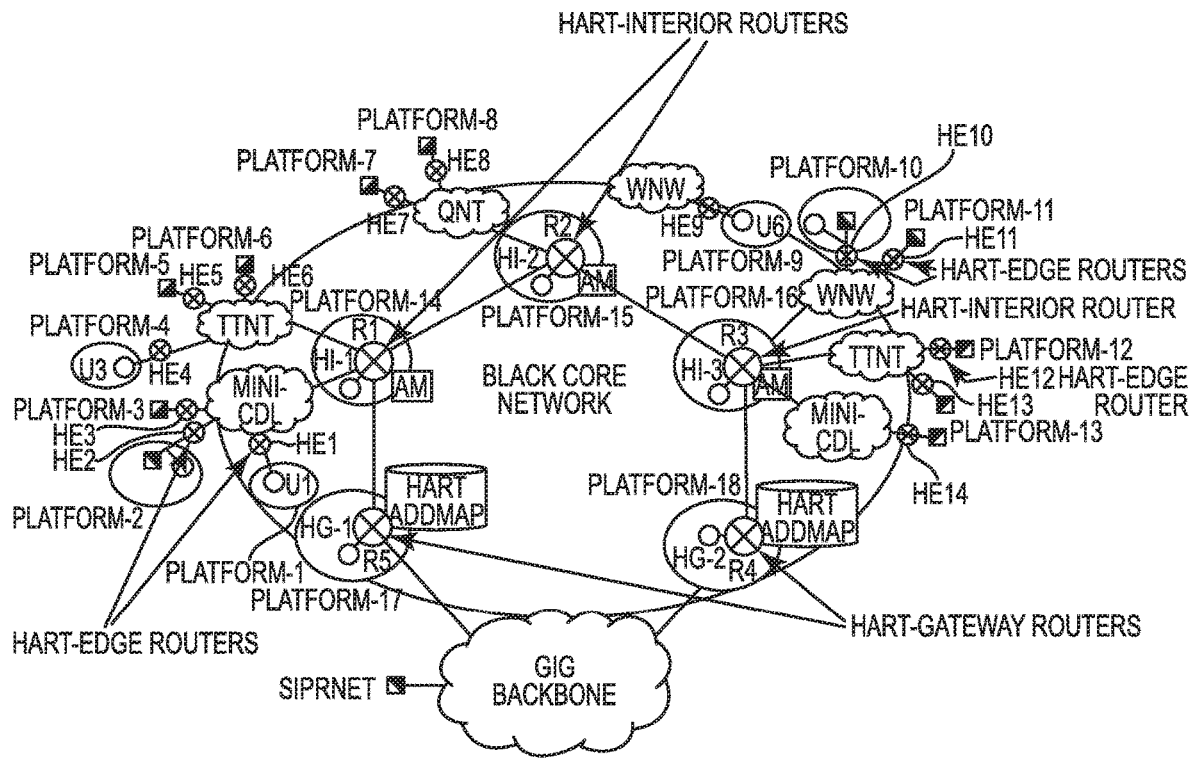
FIG. 7 is an illustration of routers constructed in accordance with an embodiment of the present invention placed in a multi-subnet airborne network.

The HART Integration Routers are installed on appliances and nodes throughout the black-side (CT side) of a network. FIG. 6 shows the black-side of a notional, multi-subnet airborne network. FIG. 7 shows where HART routers may be installed in the network of FIG. 6.

HART Routers come in three flavors (shown in FIG. 7):
HART-Edge (HART-E): These HART Appliances are installed on each edge node in the network and will route data to and from an endpoint, but not as an intermediate hop in a multi-hop path. These appliances track the local nodes on the platform, and routes and default routers to other networks.
HART-Interior (HART-I): These HART Appliances are installed on backbone nodes and provide routing to and from nodes. These nodes will use more storage for extensive tables to track nodes. HART-I nodes will forward data about reachability of edge nodes, addresses and status to the HART-Gateway nodes.
HART-Gateway (HART-G): Same functions as HART-Interior, and also provides links and routes back to the GIG, Internet or other networks. The gateway appliances track the nodes around the network and keep the dynamic address links updated and current.

Figure 8:
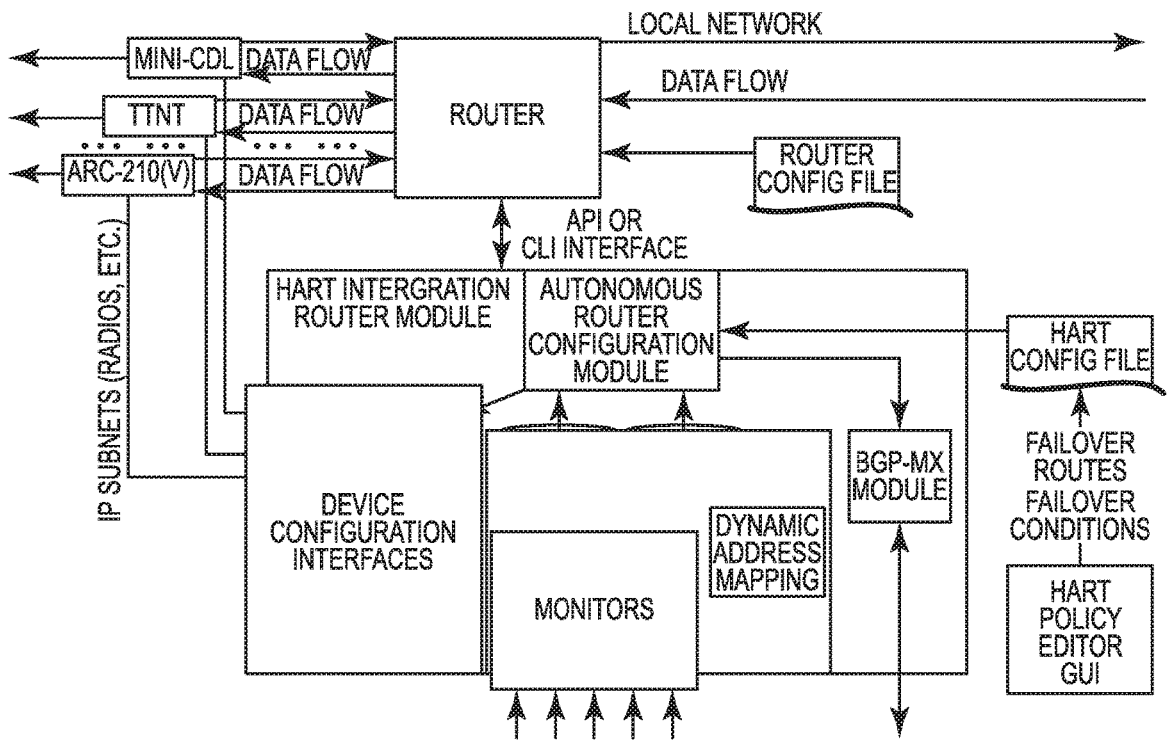
FIG. 8 is a more detailed block diagram of the software architecture of a router constructed in accordance with an embodiment of the present invention.

The HART suite of components is shown in the list below and in FIG. 8. The figure shows the data flow between each of these components. The components are:
Topology and Address Tracking (TAT)—Dynamic Address Map
Autonomous Router Configuration (ARC) Module
Device Configuration Interfaces (DCI)
HART Policy Editor
BGP-MX module
Router
Use Case: How HART Routes Packets To route data through a network of mixed subnets, HART monitors may track the nodes and build tables of the addresses and how to get from subnet to subnet (Topology and Address Tracking). These tables are called alias-tag tables. The alias-tag table is similar to a routing table, and will be used by HART for routing and address switching. The entries in the alias-tag table contain a destination address (or subnet address), a next hop address (the next hop from the local network to get packets to the final destination address), number of hops, the Link Quality Metric (LQM), and the capacity.

When a network is first set up, HART initializes itself. Then as nodes join or leave, HART updates the alias-tag tables throughout the network. Below is a use case of how this is done.

Figure 9:
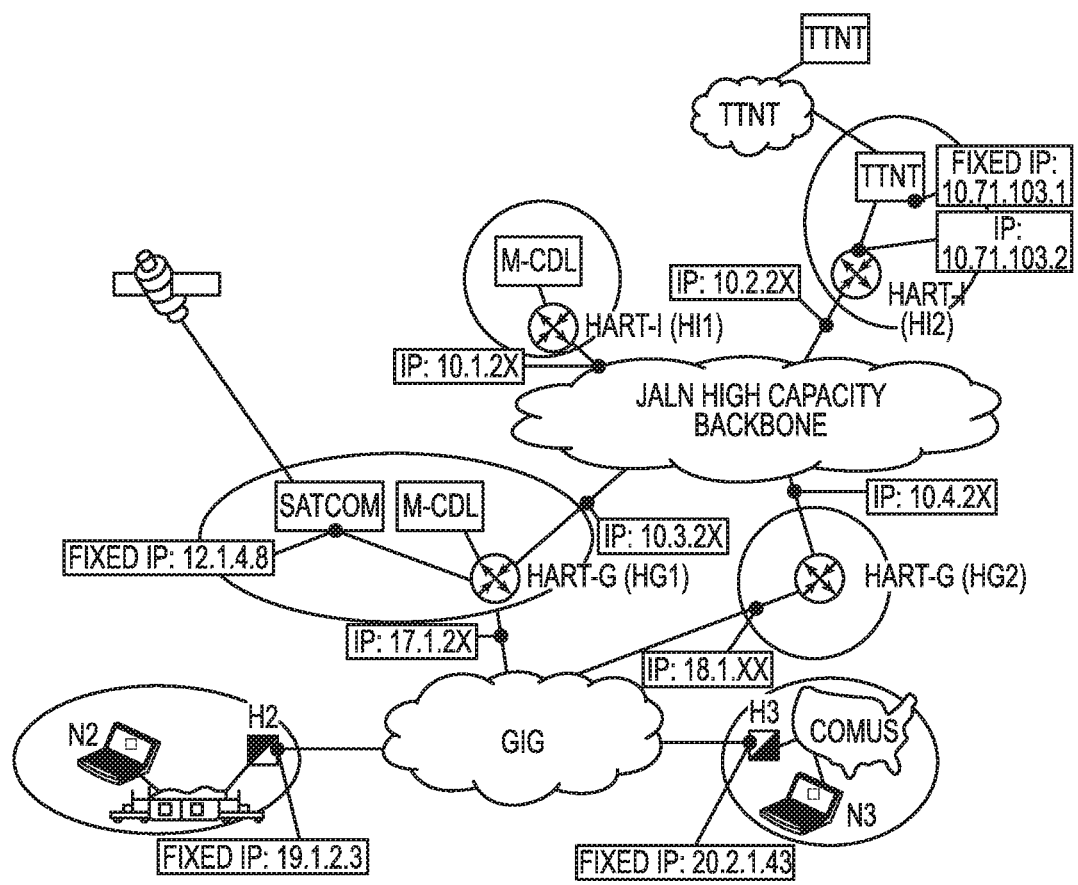
FIG. 9 is an illustration of an initial state of an embodiment of multi-subnet network.

Initial setup process (FIG. 9):
  HG1 detects GIG and declares "I'm a gateway router"
    Broadcasts itself as "default route" to GIG.
  HG2 detects GIG and declares "I'm a gateway router"
    Broadcasts itself as "default route" to GIG.
  HI1 detects no GIG and declares "I'm an Interior router" (default)
    Receives "default route" from JALN backbone (HG1 and HG2, for specified subnets)
  HI2 detects no GIG and declares "I'm an Interior router" (default)
    Receives "default route" from JALN backbone (HG1 and HG2, for specified subnets)
    Becomes "default router" for TTNT radio subnet to link them to GIG (thru JALN backbone)

Figure 10:
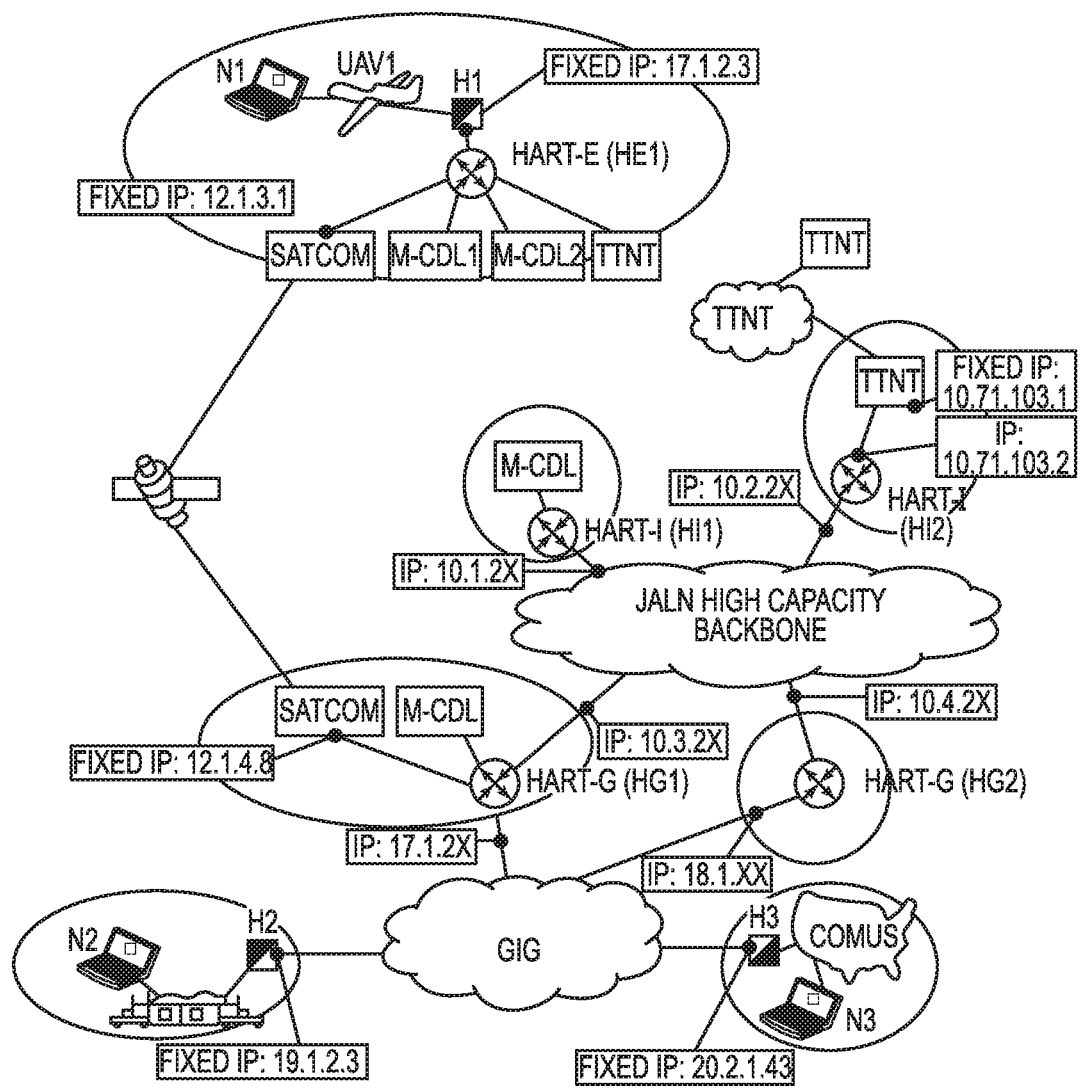
FIG. 10 is an illustration of the multi-subnet network of FIG. 9 as a UAV joins the network.
Figure 11:
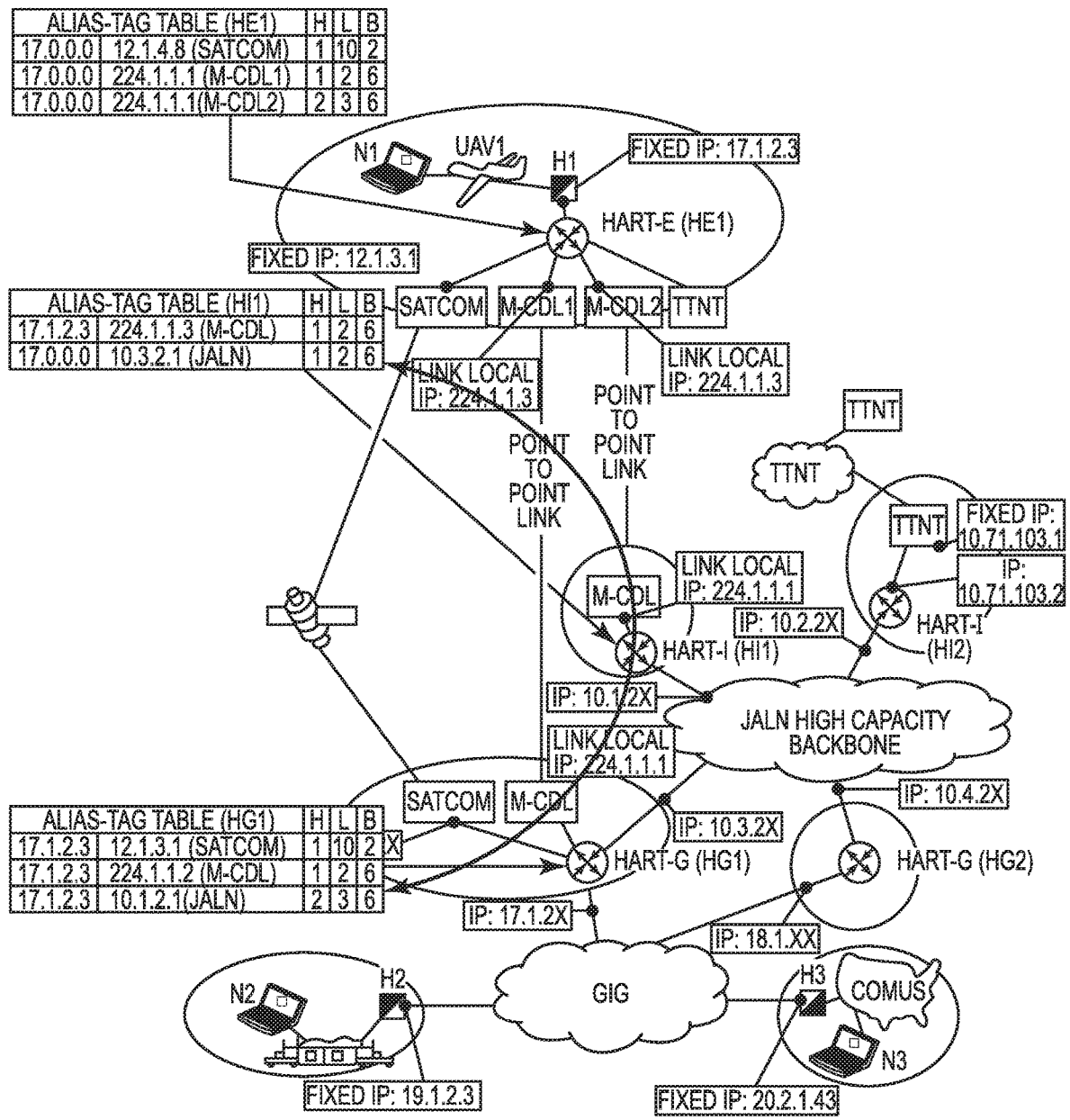
FIG. 11 is an illustration of the multi-subnet network of FIG. 10 after step 4 of the UAV joining the network.

When a Node Joins the network (FIG. 10), HART routers monitor and probe the network to test links and configure the alias-tag tables (FIG. 11) that will be used for address switching later. The process is described below.

Step 1:
  Establish each link from that node to the existing network
  Add alias-tags at various endpoints in the network to enable address switching (faster than routing) (enabled by HART dynamic address and label tracking)

Step 2:
  SatCom connects: Uses fixed SatCom IP to connect to the other SatCom endpoint (12.1.4.8)
  HE1 adds an alias-tag for 17.0.0.0→12.1.4.8
  HG1 adds an alias-tag for 17.1.2.3→12.1.3.1

Step 3:
  First Mini-CDL Radio connects
    Establishes "link local" addresses on both endpoints
  HE1 adds an alias-tag for 17.0.0.0→224.1.1.1
  HG1 adds an alias-tag for 17.1.2.3→224.1.1.2

Figure 12:
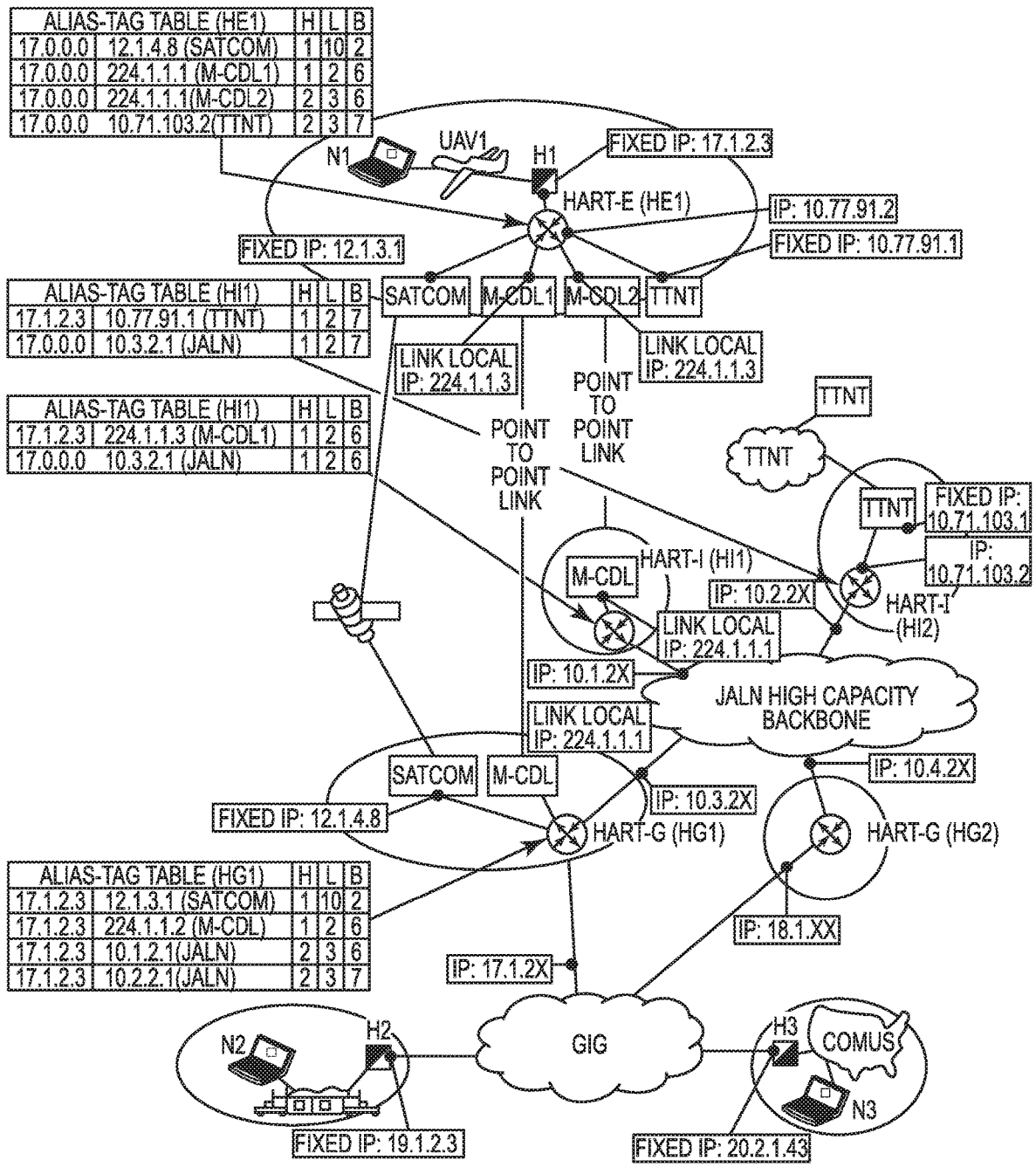
FIG. 12 is an illustration of the multi-subnet network of FIG. 11 with completed alias-tag tables.

Step 4 (FIG. 11):
  Second Mini-CDL Radio connects
    Establishes "link local" addresses on both endpoints
    HI1 requests 224.1.1.2 first, but HE1 already is using, so responds with 224.1.1.3
  HE1 adds an alias-tag for 17.0.0.0→224.1.1.1
  HI1 adds an alias-tag for 17.1.2.3→224.1.1.3
  HI1 forwards alias-tag to HG1, HG1 adds it as: 17.1.2.3→10.1.2.1 (green arrow in FIG. 11)
  HI1 adds reverse alias-tag Step 5:
  TTNT Radio connects
    Uses fixed TTNT IP to connect to the TTNT cloud
    Finds default router in TTNT cloud (HI2)→sets default router to HI2
  HE1 adds an alias-tag for 17.0.0.0→10.71.103.2
  HI2 adds an alias-tag for 17.1.2.3→10.77.91.1
  HI2 forwards alias-tag to HG1: 17.1.2.3→10.2.2.1
  HI2 addsreversealias-tag The completed alias-tag tables are shown in FIG. 12.

Figure 13:
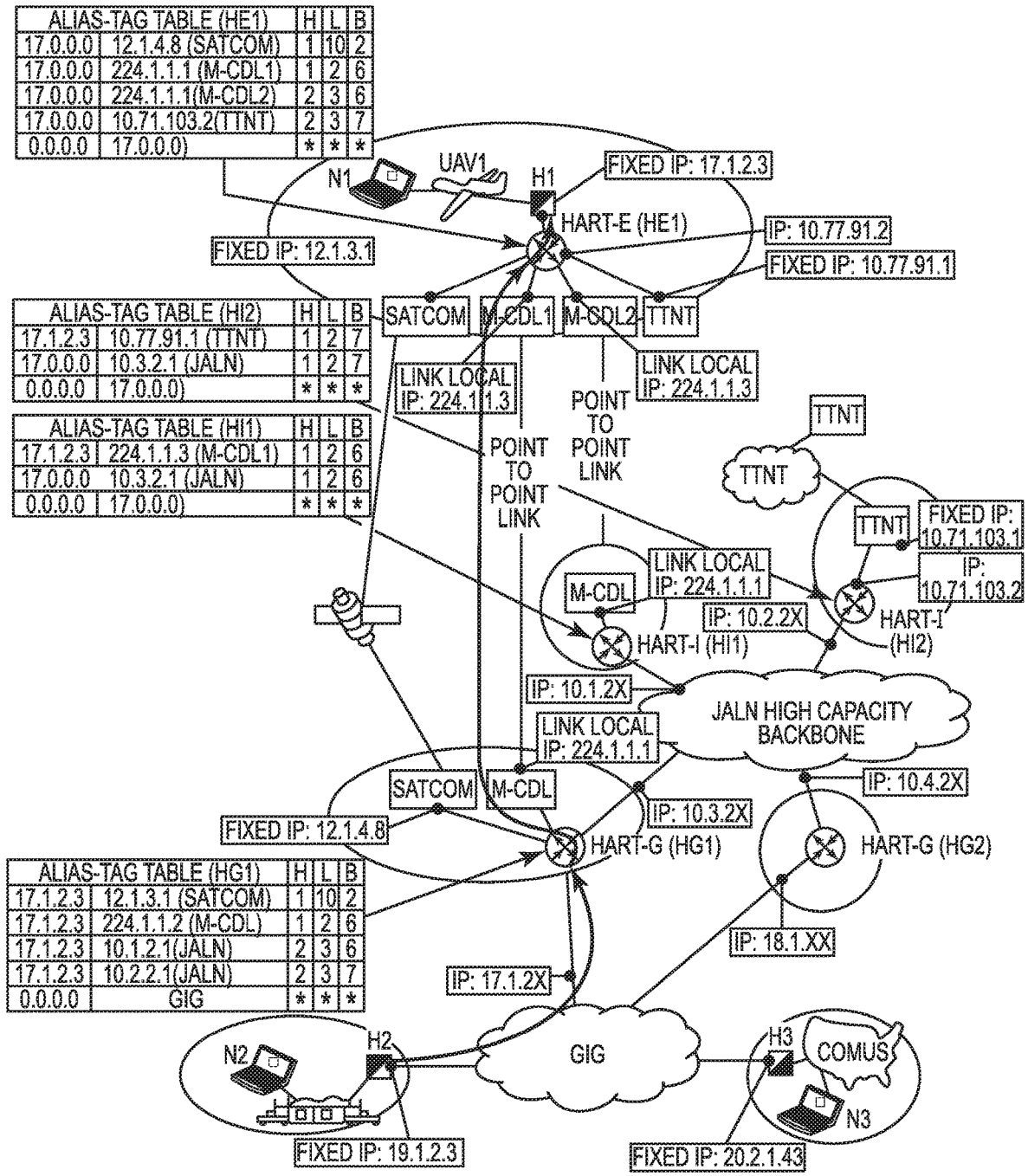
FIG. 13 is an illustration of the multi-subnet network showing an example of a data path route.

Packet Routing and Rerouting
To route data from H2 (Gnd) to H1 (Air):
  Packet leaves H2
    Packet: Src=19.1.2.3; Dst=17.1.2.3; Data
    H2→GIG→HG1
  HG1 looks up H1
    Next hop=224.1.1.2(M-CDL): <=1 hop→no address switching
    Packet: Src=19.1.2.3; Dst=17.1.2.3; Data
    HG1→M-CDL→HE1
  HE1 receives
    Packet: Src=19.1.2.3; Dst=17.1.2.3; Data
    HE1→H1
    See FIG. 13

Figure 14:
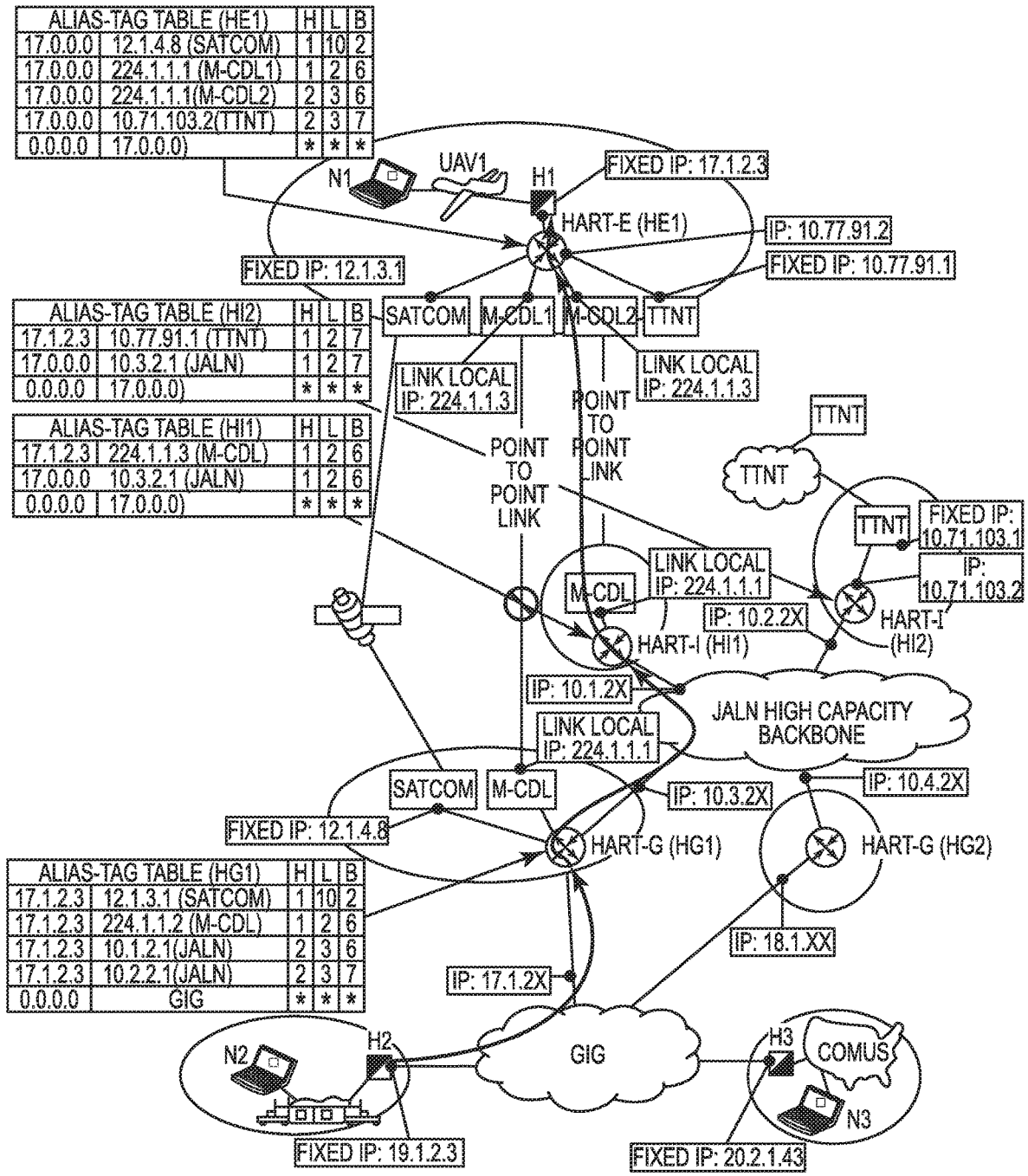
FIG. 14 is an illustration of the multi-subnet network showing dynamic failover and rerouting along a different path.

But then an error causes the M-CDL1 link to fail. The flow (H2 (Gnd) to H1 (Air)) is rerouted:
  HG1 looks up next path to H1
    Next hop=10.1.2.1(JALN): 2 hop→address switching
    Packet: Src=19.1.2.3; Dst=10.1.2.1 (JALN); Dst'=17.1.2.3; Data
    HG1→JALN→HI1
  HI1 looks up H1
    Next hop=224.1.1.3(M-CDL): <=1 hop→no address switching
    Restore packet: Src=19.1.2.3; Dst=17.1.2.3; Data
    HG1→M-CDL→HE1
  HE1 receives
    Packet: Src=19.1.2.3; Dst=17.1.2.3; Data
    HE1→H1
    See FIG. 14

HART Router Features
The above use case illustrates the HART functionality to provide dynamic network convergence. To do this HART uses three flavors of the Integration router:
  HART-Edge Routers
  HART-Interior Routers
  HART-Gateway Routers The HART-Edge Routers have these features:
  Reads and acts on HART Policies.
  Local topology and link quality monitors (SNMP, and other APIs).
  Autonomous device, router and radio configuration (SNMP, and other APIs).
  Forwards data to HART-Interior nodes using (address switching, IP routing, bridging, and repeating).

The HART-Interior Routers, same as HART-E, plus these features:
  Same as HART-Edge Routers.
  Autonomous data switching and routing (address switching, IP routing, bridging, and repeating).
    Advanced routing/switching to other subnets and hosts.
    Ability to setup/configure tunnels.
  Regional/Domain monitoring of node availability, topology (next hop, path), names, connection status, and quality (SNMP, and other).
    Stores this data in an internal table to use for routing/switching data.
    Shares this data with neighbor HART routers.
  Capable of using OSPF and other generic or "default" routing algorithms (enhanced with link quality metrics).

The HART-Gateway Routers, same as HART-I, plus these features:
  Same as HART-Interior Routers.
  Collects and Tracks IP addresses and next-hop information for nodes on the hybrid network. This data is used to update the dynamic address links so nodes outside the dynamic hybrid network can reach the nodes as they move and shift addresses within the hybrid network.

BGP and BGP-MX mobility extensions to interconnect (link, route, switch) to external networks (GIG, other Autonomous Systems [ASes]).

HART Architecture Overview

Figure 15:
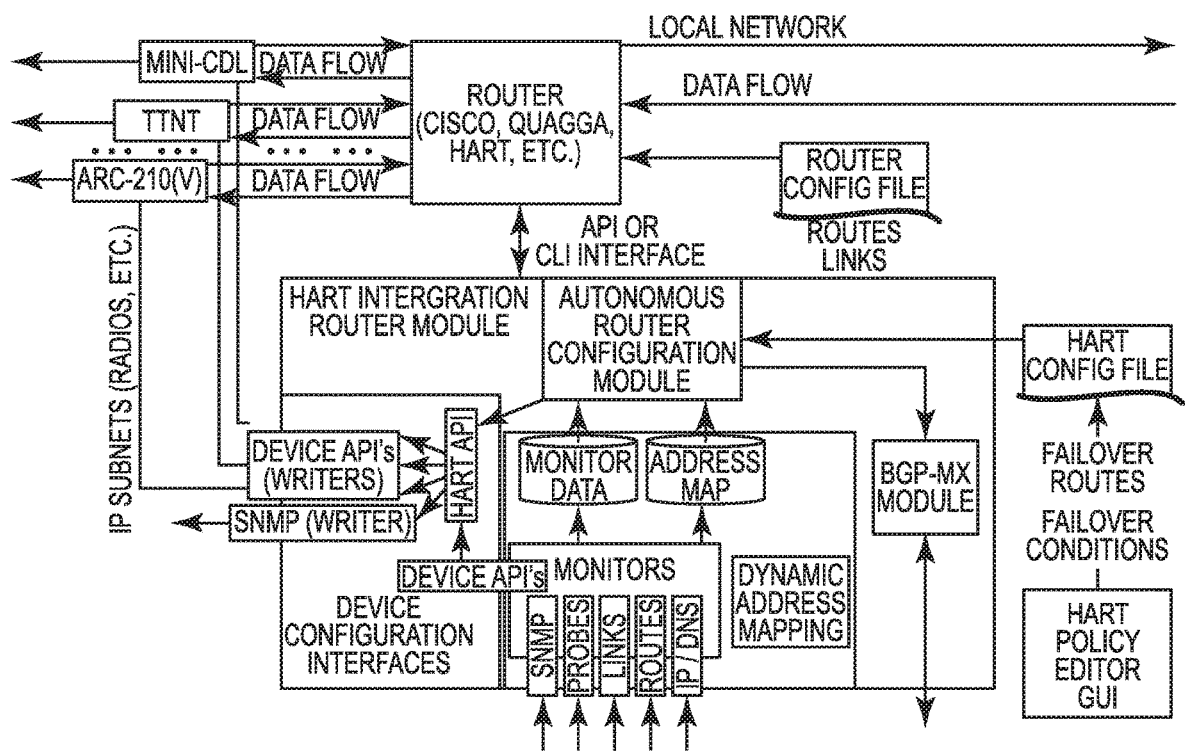
FIG. 15 is a detailed architecture overview of a router constructed in accordance with an embodiment of the present invention.

Each of the three flavors of routers is built from the same core components. These components are shown in FIG. 15. and described in further detail below.

HART Monitors

This is the HART Topology and Address Tracking system. The HART monitors are a collection of monitoring and capture tools that gather data about the network, nodes, links, topology, quality, etc. These tools use various methods to collect and gather this data from many sources: SNMP, Radio APIs, network probes, etc. As this data is collected it is stored in two databases. The first stores the majority of monitored data (topology, link quality metrics, etc.) the second is the address map database that stores the alias-tag tables that are used for routing. The address map is constantly maintained and kept small to enable fast routing lookups.

Node trackers—SNMP readers (routes, address, location, etc.)

Address and label monitor—(new IP's linked to old/existing names, IP changes for names, red/black concerns, DNS probes, etc.)

Link quality probes

Monitor link quality, bandwidth, latency, packet loss, # of retransmits, usage level, available bandwidth (total-used), etc. These are combined through a formula to determine a Link Quality Metric (LQM)

Characterize static link and network performance, bit error rate, packet loss.

As nodes are discovered they will be added to the tracking data by using "Node Join" commands.

Dynamic address mapping and topology tracking module integrates with the monitor and database components to follow dynamic mobile nodes and update the mappings of links to the fixed addresses of edge platforms. This allows GIG connected nodes to find and route traffic to dynamic mobile end points with minimal overhead. This service is also used to track and link DNS names of mobile nodes with alternative IP addresses (maintained by HART) to reach those nodes.

Integrate with HART monitors

Store most current data about network status, IP addresses of nodes, link status and link quality Track link/flow detail records Topology and Address Tracking—Dynamic Address Mapping and name tracking Track a platforms "permanent IP" and DNS names (through different radio subnets)

Link "permanent IP" to 1 or all dynamic IPs within the tactical-AS for the node (each radio subnet may have a different IP or range)

HART should act as a proxy for a DNS server requests

Level and amount of Topology and Address Tracking data stored by HART on a node depends on if the node is a HART-Edge (next hops, default routes), HART-Interior (region or AS based data), or HART-Gateway (GIG scale, multi-AS, very large scale)

Works in Red/black networks (Black side only, but be aware of red side effects)

Alias Tag Table

Each HART node maintains a table of "alias tags" (address labels or "next hops") to reach specific end points or subnets. Alias tags are the name of the labels used for the address switching done by HART. These tags are also used as routes to nodes and subnets.

Each minimal entry in the table has a:

Destination

Local radio or subnet to use

Link Quality Metric (LQM)

Link/route Capacity (or bandwidth)

An alias-tag entry is shown in FIG. 16.

The LQM is calculated based on some combination of number of hops to get to the destination through that radio subnet (H); and expected latency to get to the destination through that radio subnet (L) calculated over some time period. The H, L and capacity values are the minimal values for link quality selection. Other values that may be used include:

Name (Node name, DNS, etc.)

Location (lat., long.)

Other link quality metrics, such as: (ave. packet loss, ave. # of retransmits, bit error rate)

HART-E routers maintain only a limited table of how to connect to the larger network and default routers (or the closest HART-I or HART-G router), the format of this data is shown below in FIG. 17. HART-I and HART-G routers maintain entries that allow cross routing and switching between radio subnets without requiring to route through a GIG node.

(Note: H, L, B will be replaced with LQM and Capacity)

The HART autonomous router configuration (ARC) module uses OSPF and the information from the TAT Database to make routing decisions and to auto configure various aspects of the network and resources. This module is able to send data by routing, address switching, bridging or repeating. It is able to replicate and load balance data across multiple links as well. This module also integrates with existing routers through OSPF, RIP or other standards.

Integrate with (use) Topology and Address Tracking tables (alias-tags).

Act autonomously using policies as framework.

IP address assignment if appropriate

Coordinate across the entire hybrid tactical-AS

IPv4 & IPv6 address spaces

Push address changes to node configuration writers

Able to send data by address switching, routing, tunneling, bridging or repeating Make dynamic data forwarding decisions Implement OSPF between HART nodes Route from 1 subnet type to another (TTNT to Mini-CDL)

Leverage commercial router practices (OSPF, RIP or other standards) that provide a common switching fabric while interchanging line cards operating at different data rates (i.e. T1, DS-3, OC-192)

Develop and demonstrate static routing (mesh, ring, etc.) between subnets

Develop and demonstrate mobile ad hoc routing between multiple subnets node join/leave, net join/leave Subnet handoff (node moves from TTNT to QNT, or moves from TTNT and adds mini-CDL, and other use cases)

Replicate (increase reliability) and load balance data (increase throughput) across multiple links.

Develop, demonstrate and analyze multi-link, multi-channel, multi-antenna multi-path routing and communications topology configurations Autonomously provision tunnels/links/flows Use quality aware extensions Use monitored link quality data to update the link metrics of routing protocols (OSPF, etc.) so routers (non-HART also) can optimize based on link quality Develop, demonstrate and analyze link fade, optical polarization rotation, pointing and tracking, antenna gain, link margins, and bit error rates.

Update link metrics in local and remote routers and devices.

Integrate with existing routers through OSPF, RIP or other standards.

HART Routing Priority and Format

Is next hop<2 hops?
  Y: Send direct to next hop.
  N: Does "next hop" support HART address switching?
    Y: address switch to next hop.
    N: Tunnel to next hop.

FIGS. 73A-73C illustrate a format for an original packet and two options for the format of a HART address switched packet. FIG. 73A is a format of an original packet. FIG. 73B is a format of a first option of an address switched packet. FIG. 73C is a format of a second option of an address switched packet. The term NDst refers to the next hop destination. The term Dest' refers to the original destination. The term HAS-flag refers to some special HART set of IP options to indicate a HART address switched packet OR a specific DSCP value OR an IP Protocol code (or combination of these indicators). The first option for an address switched packet shown in FIG. 73B adds >=5 bytes of overhead for turning on options, then adding the Dest' address (4 bytes) (more in IPv6). The second option for an address switched packet shown in FIG. 73C adds 4 bytes of overhead for the length of the Dest' address (more in IPv6). NOTE: Where possible HART will learn and save next hops (paths and routes) to be used for a conversation. This will remove the need to include the Dest' field in every packet, removing the overhead from later packets in the conversation.

FIGS. 74A and 74B illustrate a format for an original packet and a format for a HART tunneled packet. FIG. 74A is a format of an original packet. FIG. 74B is a format of a tunneled packet. The term NDst refers to the address of "next hop" HART router. The term HAS-flag refers to some special HART set of IP options to indicate a HART address switched packet OR a specific DSCP value OR an IP Protocol code (or combination of these indicators). The tunneled packet adds at least 40 bytes of overhead because the full original IP packet is wrapped inside a new IP packet (more in IPv6).

Inter-HART Communication Commands

Inter-HART communication commands define any HART to HART messages to share data.

Leave/Join Update Message

When a node leaves one subnet or joins a new subnet, the HART routers send an update. This update will be sent on the old subnet after a timeout period. Another update will be sent on the new subnet after a join is completed. These updates will serve the purpose of informing the HART-I and HART-G routers of where edge and interior nodes can be found (after moving), and any new or updated paths to get to those nodes or quality metrics along the paths.

Node Join
  Destination node
  HART-E router for node
  Route (Next hop) (or NULL for endpoint) (this gets filled after the first hop)
  # Hops (increment for each hop)
  Latency
  Bandwidth
  TBD—Other Quality Metrics Node Leave
  Route/path Drop flag
  Destination node
  HART-E router for node HART Device Configuration Interfaces HART device configuration interfaces provide the machine-to-machine interface for automatic configuration. It integrates with the other components to provide a single interface to write configuration options and settings to local and remote routers and wireless IP devices. These writer components may use SNMP and/or device specific APIs.

Provide a single configuration API to other components
  Automatic configuration—HART without human involvement
    Local and remote programmatic (API) configuration options to set various IP settings [programmatic control of each radio/device/technology]
    Use SNMP and/or other protocols/services
    May include radio/device specific API requirement Device Configuration Commands Basic IP configuration of devices use (in an embodiment, minimally) the commands described below. HART defines a single, unified API to connect and set these commands for each radio device supported by HART (Mini-CDL radios, SNMP devices, TTNT, etc.).

Set/Get IP Address
  Get/set flag
  Interface to get/set address
  Address
  Subnet Mask
  Default Router Set/Get Route
  Get/set flag
  # of Route to set (Entry # in a table, 0=default route)
  Destination (address or subnet)
  Route (Next hop)

Set/Get DNS Settings (Server/Proxy Addresses)
  Get/set flag
  Primary DNS Server (or HART DNS Proxy)
  Secondary DNS Server (or HART DNS Proxy)

Set/Get IP Address Allocation Settings (DHCP)
  Get/set flag
  IP range Start address
  IP range Stop address
  Subnet Mask of Range
  Default Router of Range
  Primary DNS Server (or HART DNS Proxy) of Range
  Secondary DNS Server (or HART DNS Proxy) of Range HART Policy Editor The HART Policy Configuration GUI allows the user to setup and maintain the policies used by the HART routers. This tool allows the user to define the default link for traffic and the order of backup or failover links to use. Once the default is setup, the user can specify different traffic types based on matching DSCP (differentiated services code point) and/or protocol ID fields. For each traffic type a primary link can be selected and then the other links can be ordered as to which link(s) will be used to failover that traffic type.

A policy option in the HART prototype is multi-link forwarding. For a specified traffic type (specific DSCP and/or protocol ID) multiple links can be specified to replicate packets on. This option sends the same packet or data frame across multiple links to provide improved reliability. If the primary link fails the data will not be lost or interrupted, the flows will continue across the other specified links without affecting the data flow at all.

Policy Types:

Default Policy: primary and backup links for all non-specified traffic.

Automatic Failover Policy: primary and backup links for all specific traffic. Specific traffic defined by DSCP and protocol ID fields.

Multi-Link Forwarding Policy: specify primary link and replication links to replicate specific traffic on. Specific traffic defined by DSCP and protocol ID fields.

Load Balancing Policy: specify group of links to spread specific data across (not replicate). Each link will be used in a rotating fashion. Different data packets will be sent simultaneously across several links arriving at the same time. This has the effect of increasing throughput. Specific traffic defined by DSCP and protocol ID fields.

Example

If DSCP==18 (AF21) then PrimaryLink=Mini-CDL1 and FailoverLinkOrder=AN/ARC-210(V); Mini-CDL2; WGS; Inmarsat Provide a GUI tool to edit policies Write policy files.

Read existing policy files

Policy Table Entry

Each Policy will have these values:

DSCP value (or NULL)

And/or flag (0-AND, 1-OR)

IP Protocol Code (or NULL, especially if DSCP is NULL)

Policy Type (0—Default Policy; 1—Automatic Failover Policy; 2—Multi—Link Forwarding Policy; 3—Load Balancing Policy)

Primary Link Identifier

Secondary Link Identifier Priority List

BGP-MX Module

HART treats other network integration systems as separate ASes. This provides automatic configuration and integration with other networking systems in use. An extension to BGP is used to add mobility awareness and dynamics.

BGP-MX:

Integrates seamlessly with BGP routers

Dynamically discover BGP peers from other ASs and setup peering relationships

Converge new routes rapidly in response to changes in topology

Integrate with external AS's such as:

JCAN: Joint Capability for Airborne Networking subnets

GIG: Global Information Grid (backhaul/reachback)

BACN: Battlefield Airborne Communications Node

DISN: Defense Information System Network

HART Design Details

HART is designed for several real-world use cases of multi-subnet environments with different radio and routing capabilities.

A subset of functionality was selected to create a prototype to demonstrate the HART approach. The features selected for prototyping were proactive failover across many links and integration with a Mini-CDL radio and interface. With the proactive failover mechanism, the HART router monitors the quality of each radio link to detect when it falls below a specified threshold. Upon detection of unacceptable link degradation, the HART router proactively routes all IP packet flows traversing the degraded link to a backup link of higher quality. If or when the original link recovers its quality, the IP packet flows are switched back to this link. Current systems provide no capability for proactive link failover; failover occurs only after a complete breakdown of a link. Application performance suffers as a consequence.

Figure 19:
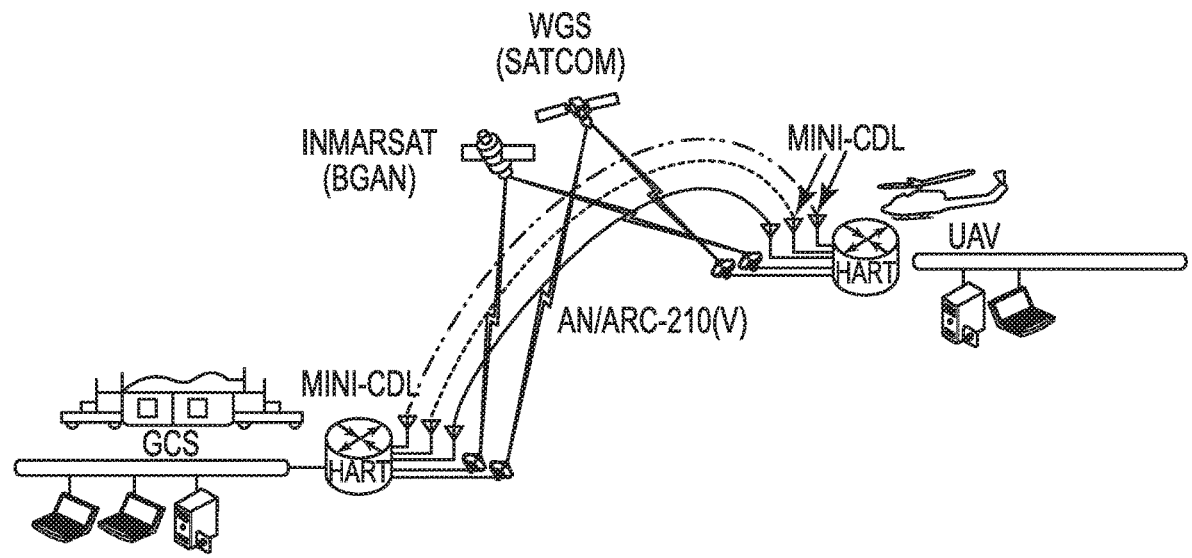
FIG. 19 is an illustration of the multi-subnet network with a UAV scenario.

As shown in FIG. 19, the UAV platform has two Mini-CDL radios, an AN/ARC-210(V) radio, an Inmarsat (BGAN) SatCom and a WGS SatCom. The GCS (Ground Control Station) in this case will have the same five endpoint radios. HART in this case exploits the redundant data paths to provide increased reliability of the IP-based connection between the GCS and the UAV. This system does not use HAIPEs to create a red/black network.

In an embodiment, HART consists of two kinds of appliances: the HART-Edge appliance resident on the UAV and the HART-Gateway appliance resident at the GCS.

Figure 20:
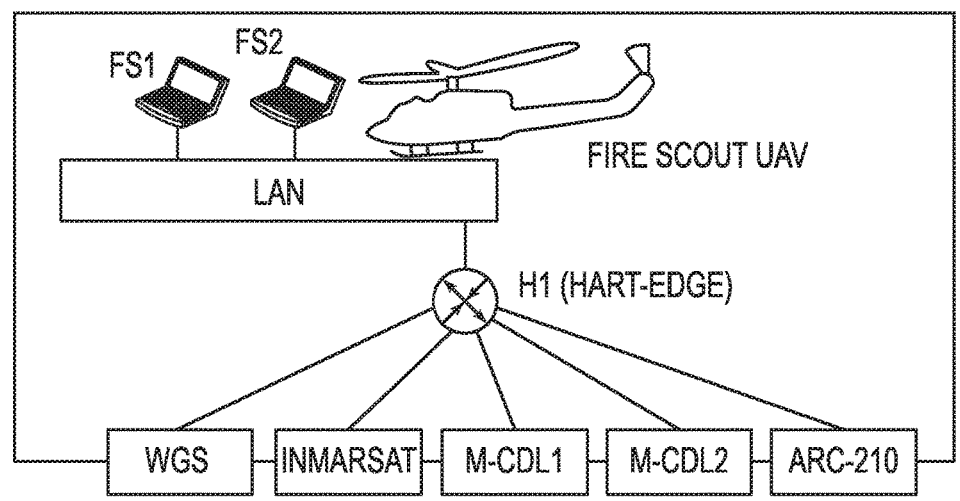
FIG. 20 is a block diagram of an AV network configuration illustrating ports available on a router constructed in accordance with an embodiment of the present invention.

The HART-Edge Appliance has eight Ethernet ports. Five of these ports are used to connect to the five RF links as shown in FIG. 20. The other three ports are available for use by on-board hosts and sensors on the UAV to connect to the tactical network via the HART-Edge appliance. In this case, each on-board IP device (sensor or CPU) will use the HART router as its "default router".

Ground Control Station (GCS) Network

Figure 21:
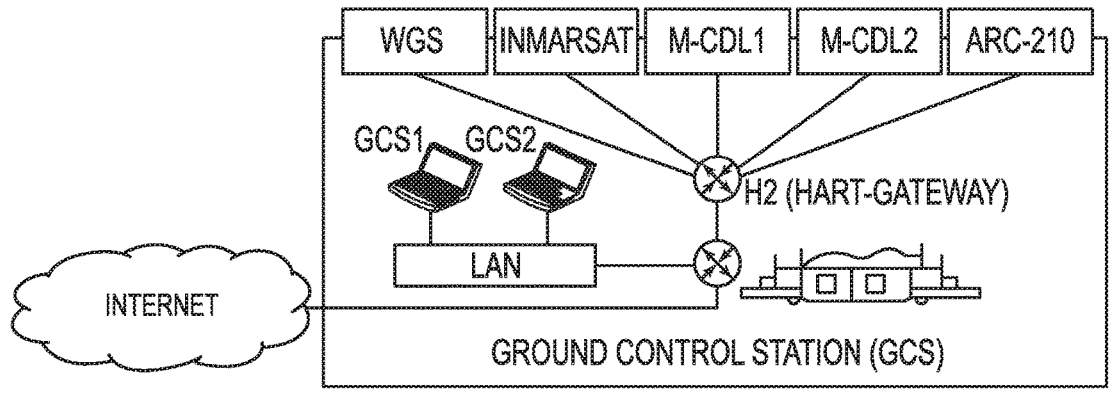
FIG. 21 is a block diagram of a router constructed in accordance with an embodiment of the present invention utilized as a ground control station coupled to the internet.

There is an Ethernet network (LAN) at the GCS to connect various hosts and servers. This ground network uses a hub or switch to connect all the devices (FIG. 21). The GCS has ground-based transceivers for the various RF/wireless communications devices. Each of these devices has an IP/Ethernet interface.

The HART-Gateway Appliance has eight Ethernet interfaces, one connected to the ground network router and another connected directly to each of the RF/wireless devices (FIG. 21). Optionally, HART could connect to another LAN on the RF side that has the RF/wireless devices connected to a hub or switch.

The GCS may have external networks (i.e. internets) connected to the ground LAN. With proper routing configuration this does not affect HART, and in fact HART will route data to and from the UAV to the external networks as well.

Each RF/wireless radio device used in this scenario is listed above with specifications that are used by HART to make informed policy based routing decisions.

HART Features

FreeBSD PC (version 7.3)

Quad NIC (network interface cards)—at least 5 Ethernet connections

FreeBSD router software

Maintain IP data flows between the GCS and one or more UAVs connected to the GCS Policy based dynamic link selection Provides automatic link multi-level failover and recovery Policy based multi-link forwarding (Stretch Goal)

Replication provides high reliability communications

Policy configuration GUI (Stretch Goal)

Integration with Cubic Mini-CDL radio hardware

Figure 22:
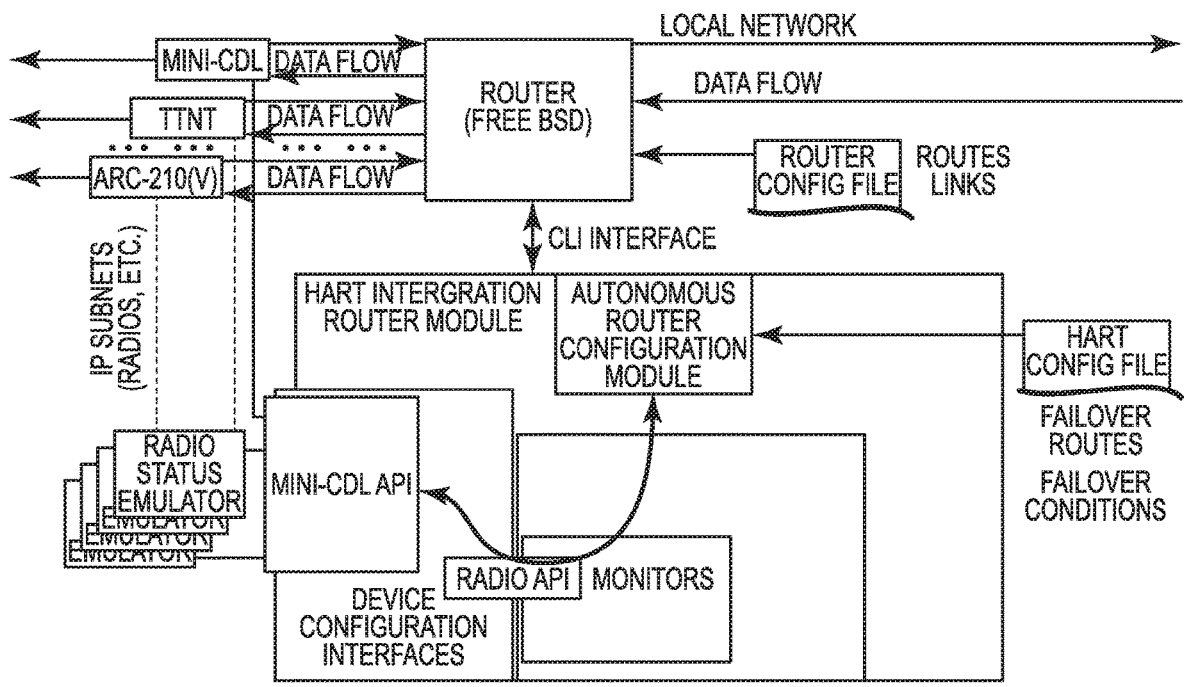
FIG. 22 is a block diagram of an embodiment of the software architecture of a router constructed in accordance with an embodiment of the present invention.

An embodiment of the software architecture of HART is shown in FIG. 22.

HART Policy Configuration

HART uses a Policy Configuration file to define the settings used by HART for link failover. This allows the user to define the default link for traffic and the order of backup or failover links to use. Once the default is setup, the user can specify different traffic types based on matching DSCP (differentiated services code point) and/or protocol ID fields. For each traffic type a primary link can be selected and then the other links can be ordered as to which order each will be used to failover that traffic type.

The last policy option in the HART prototype is the multi-link forwarding. For a specified traffic type (specific DSCP and/or protocol ID) multiple links can be specified to replicate packets on. This option will send the same packet or data frame across multiple links to provide improved reliability. If the primary link fails the data will not be lost or interrupted, the flows will continue across the other specified links without affecting the data flow at all.

Three policy types:
Default Policy: primary and backup links for all non-specified traffic.
Automatic Failover Policy: primary and backup links for all specific traffic. Specific traffic defined by DSCP and protocol ID fields.
Multi-Link Forwarding Policy: specify primary link and replication links to replicate specific traffic on. Specific traffic defined by DSCP and protocol ID fields.

Example

Figure 23:
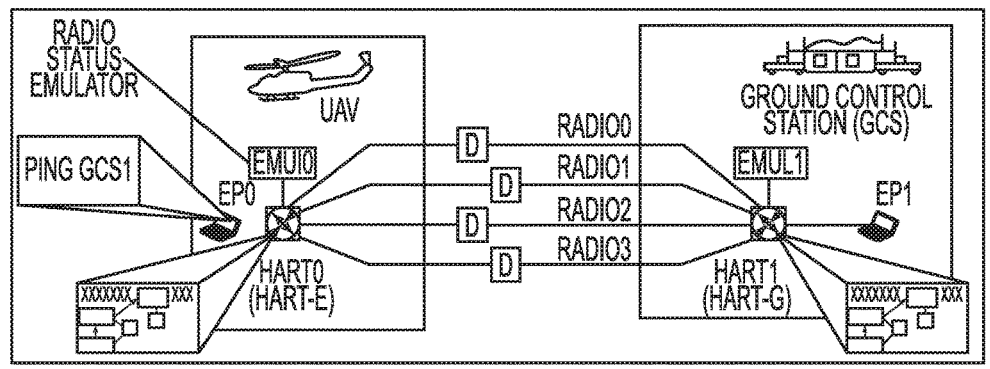
FIG. 23 is an illustration of test bed utilizing routers constructed in accordance with an embodiment of the present invention.

If DSCP==18 (AF21) then PrimaryLink=Mini-CDL1 and FailoverLinkOrder=AN/ARC-210(V); Mini-CDL2; WGS; Inmarsat HART Emulation Testbed
Emulab was used to create a HART testbed (FIG. 23), consisting of:
Two HART routers running on either end of 5 links (hart0&hart1)
Two user nodes running various applications on the endpoints (ep1 & ep1)
Four links emulated by Emulab Delay nodes (D) and Radio Emulators (emul0 & emul1)
Radio Emulator are adjusted during the experiment to report lesser quality to HART, causing HART to make route adjustments (e.g. failover)
Radio Link Specifications Details
In a live scenario, the wireless radio devices and specifications used are:
Mini-CDL Radio
Bandwidth: 8 Mbps (5.4 Mbps-10.7 Mbps)
Latency: 400 ms RTT
Interface: Ethernet
Data routing: Ethernet Bridge: data comes in over Ethernet, then is transferred directly to the paired endpoint
Range: LOS: surface-to-surface (sts): ave: 4.4 nm // surface-to-air (sta): ave: 14.8 nm)
WGS (Wideband Global SATCOM) SatCom
Bandwidth: >2 Mbps
Latency: 710 ms RTT
Interface: Ethernet
Data routing: IP routed through SatHub
Range: BLOS
Inmarsat (BGAN)
Bandwidth: 329 kbps (10 kbps-2 Mbps)
Latency: 710 ms RTT
Interface: Ethernet
Data routing: IP routed through SatHub
Range: BLOS
AN/ARC-210(V) (ARC-210 gen5)
Bandwidth: 80 kbps (48.8 Kbps-97.7 Kbps)
Latency: 400 ms RTT
Interface: Ethernet
Data routing: Ethernet Bridge: data comes in over Ethernet, then is transferred directly to the paired endpoint
Range: LOS: surface-to-surface: ~55 nm (31-92 nm); surface-to-air: ~176 nm (119-264 nm)

In the emulation environment to make the configuration and setup simpler, ATC used these link specifications:

| Link   | Throughput | Latency |
|--------|------------|---------|
| Radio0 | 5 Mb       | 20 ms   |
| Radio1 | 1 Mb       | 200 ms  |
| Radio2 | 1 Mb       | 300 ms  |
| Radio3 | 1 Mb       | 400 ms  |

In addition to proactive link selection, HART implements multi-level policy-based failover (1, 2, 3, 4, 5 or more backup links in a prioritized order), a capability that is not supported within COTS routers such as Cisco. For instance, with Cisco routers, if the policy route for an IP flow were to fail it will be routed over the default interface. Unlike HART, secondary and tertiary policy routes cannot be specified with Cisco routers.

Figure 24:
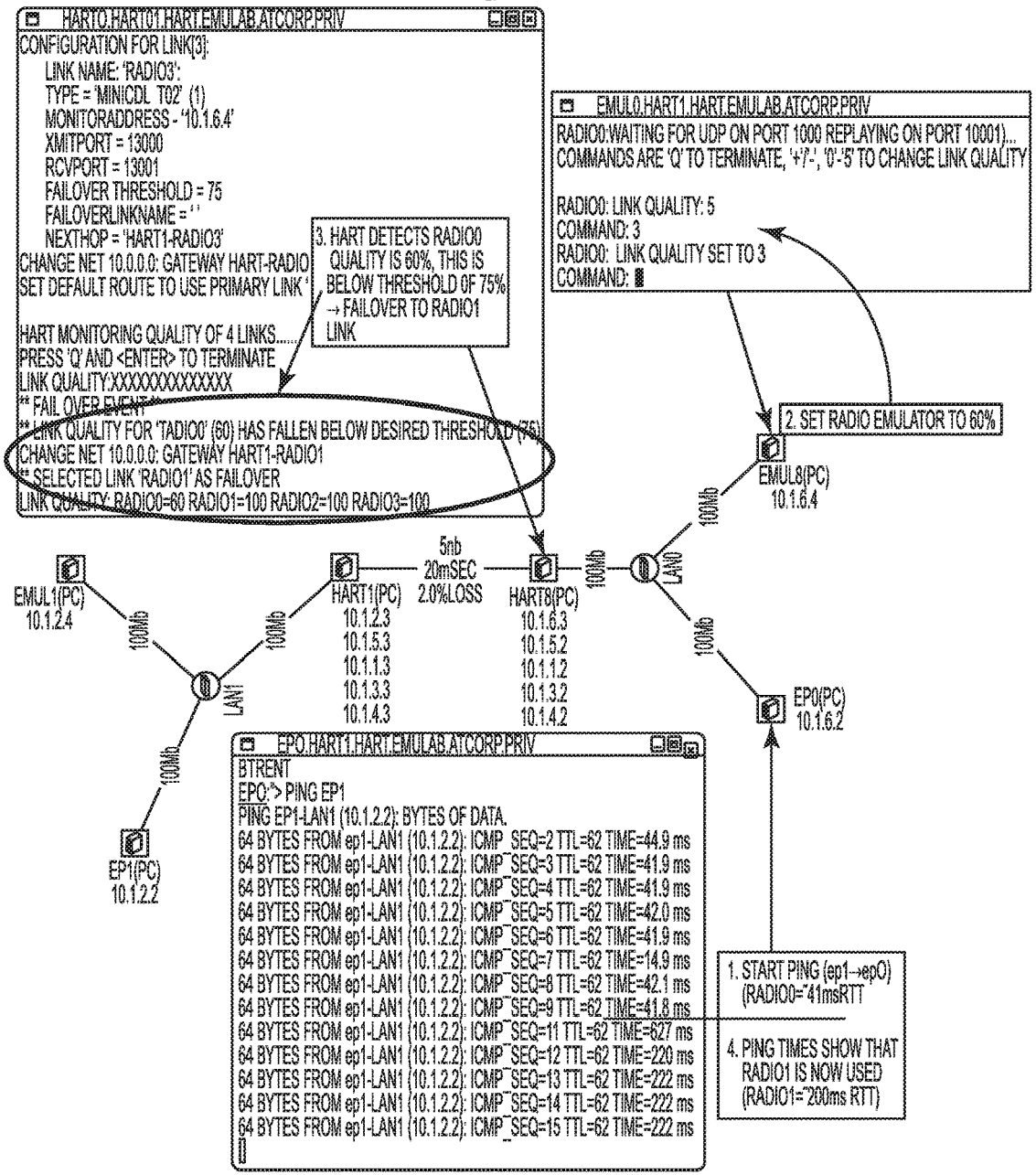
FIG. 24 is a diagram illustrating steps utilizing link quality monitoring and proactive link failover.

FIG. 24 (steps 1-4) shows HART link quality monitoring and proactive link failover. FIG. 24 shows the Emulab experiment: 2 LANs connected by 4 links through HART routers. Each LAN has 3 nodes: an endpoint (ep), a radio emulator node (emul) and a HART router (hart). The radio emulator node runs an application that ATC built to emulate the Mini-CDL radios' link quality API, and allow for manual quality adjustment. Step 1 shows a ping from ep0 to ep1. Step 2 shows the Mini-CDL radio emulator (for RadioLink0) being set from 100% to 60%.

In step 3, HART detects the new quality metric for RadioLink0 is below threshold of 75%, and then triggers the failover to RadioLink1. Step 4 shows the ping times have increased which shows that RadioLink1 may be used instead of RadioLink0. HART may successfully detect link quality degradation by interfacing with the radio and then change the router on "hart0" to use the failover path of RadioLink1.

HART Radio Integration testbed
HART may be used with two real Mini-CDL radios (FIG. 25a and FIG. 25b). HART is integrated with the radios and then successfully shows to monitor the status of the live radios (through the Mini-CDL API), making correct autonomous failover configuration updates to the routers (HART0 and HART1 in FIG. 25b). The demonstration shows a video stream being sent over the radio link. As the link degrades below a preset threshold, routing fails over to a series of backup links.

HART neighbor discovery service automatically discovers IP one-hop neighbor HART edge and transit routers on a radio subnet. HART transmits periodic subnet multicast of Hello messages by each HART router to enable dynamic neighbor discovery. A neighbor table is maintained by each HART router with subnet-specific address and alias addresses of each neighbor.

Subnet Convergence Function
The subnet convergence function provides a common IP subnet layer interface for the routing function. It enables automatic formation of virtual point-to-point link with each neighboring HART router. It performs monitoring of quality metrics for each virtual link. It implements network level flow control.

Virtual Link Formation & Maintenance
Virtual link formation and maintenance provides cut-through routing for implementing a virtual link. It maintains per-flow state for each IP data flow using a virtual link. It performs IP packet header restoration for data packets received over a virtual link.

Link-Quality Monitoring

Link-Quality monitoring functions implement a passive technique for sensing packet loss rate on virtual link. It implements an active, passive, or hybrid technique for virtual link capacity sensing. It implements an active, passive, or hybrid technique for sensing virtual link latency. It provides a link quality query interface and asynchronous notification mechanism.

Network-Level Flow Control

Network-level flow control provides network-level control of the rate at which packets are sent to an attached radio. It implements adaptive per-virtual-link rate control based on dynamic sensing of virtual link. It may augment radio-supported flow control (e.g., RFC 5578).

Traffic Redirection

Traffic redirection implements a mechanism to provide redirection of an IP packet flow to a different next-hop than the current one for load balancing or for traffic-aware routing. Flow redirection is based on source and destination addresses of IP packets.

QoS-Aware Unicast Routing Service

The QoS-aware unicast routing service provides an OSPF-based core routing protocol for unicast routing over inter-router virtual links. It interconnects radio IP subnets into one HART network. It maintains multiple routing metrics per virtual link. It implements multiple routing tables, one per routing metric. It performs link-aware route selection. It performs traffic-aware route selection.

Load Balancing Function

Load balancing function performs distribution of traffic exiting an IP subnet across multiple egress links, if applicable. It performs distribution of traffic entering an IP subnet across multiple ingress links, if applicable.

Dynamic Link Metrics

When a HART router has multiple connections to the HART internetwork, the HART design allows that HART router to dynamically configure the link metrics based on radio link monitoring.

Dynamic Route Selection

When multiple paths are available to route IP traffic through the HART inter-network, the HART design allows the dynamic selection of the path that an IP packet flow will take based on routing metrics.

Radio-Aware Flow Control

The HART design allows for flow control between the HART router and its connected radios.

Mission-Aware Traffic Management

The HART design allows the HART internetwork to be configured with a set of mission-specific parameters that influence dynamic link selection and dynamic route selection for specified traffic classes.

Load Balancing

The HART design allows utilization of multiple communication links when such links exist between elements of the HART internetwork. For example, when multiple links exist between two nodes, as shown in FIG. 26a and FIG. 26b, the HART design allows both links (e.g., link a and link b) to be used in parallel to balance traffic flows transiting between the nodes (e.g., $R_1$ and $R_2$). FIG. 26a shows how the data is routed in the absence of load balancing, while FIG. 26b demonstrates how the data flow is balanced across the available links. By load balancing, more data can ultimately be transferred between the two nodes.

An embodiment in which HART Maximizes Network Performance (Scenario 1) is illustrated in FIG. 27 in which C sends a data file to X, a CSTAR router senses two links from UAV1 to TOC. HART automatically load balances across both links to gain more bandwidth.

Another embodiment in which HART Maximizes Network Performance (Scenario 2) is illustrated in FIG. 28 in which:
  L sends a data file to X
  H sends a data file to X
  HART senses both traffic flows and chooses 2 independent non-interfering routes from L→X and H→X
  This improves network throughput and performance
A subnet convergence function is illustrated in FIG. 29 in which HART:
  Provides a common IP subnet layer interface for routing function
  Automatically forms virtual point-to-point links with each neighboring HART router
  Monitors quality metrics for each virtual link
  Provides network-level flow control
A subnet convergence function: virtual link formation & maintenance is illustrated in FIG. 30 and FIG. 31 in which HART:
  Provides a virtual IP 1-hop channel between neighboring HART routers
  Cuts-through routing for implementing virtual link
  Provides maintenance of per-flow state for each IP data flow using virtual link
  Facilitates IP packet header restoration for data packets received over a virtual link
A subnet convergence function: link-quality monitoring is illustrated in FIG. 32 in which HART:
  Measures link quality to support link-aware routing
  Uses a passive technique for sensing packet loss rate on virtual link
  Uses an Active/Passive technique for virtual link capacity sensing
  Uses an Active/Passive technique for sensing virtual link latency
  Provides link quality query interface and asynchronous notification mechanism
Bandwidth/latency monitoring is illustrated in FIG. 33 in which HART:
  Uses existing network data as a probe packet
  Sends probe packets of varying size
  Response time (RTT) is a function of probe size
  Uses existing network data as probe packet
  Packet-Loss Sensing
  Packet loss is passively sensed using IP header identification and fragment offset fields that are currently unused
  Each packet is tagged
    IP identification field contains two octets of the HART routers IP address
    IP fragment-offset field contains a sequence number
  The receiving HART node decodes the tag
    Missing sequence numbers are indicative of packet loss
    A sliding window is utilized to account for out-of-order packets
Packet loss detection is illustrated in FIG. 34 in which:
  Packet loss is computed passively
  Each packet is tagged by HART
    Sequence number (S) is injected into packet header
    H+S is the same size as H
  The receiving HART node decodes the tag
    Packet loss occurs when sequence numbers are missing
  Subnet convergence function: flow control is illustrated in FIG. 35 in which:

To prevent head-of-line blocking of packets within the radio
Network-level control of the rate at which packets are sent to attached radios
Adaptive per-virtual-link rate control based on dynamic sensing of virtual link
May augment radio-supported flow control (e.g., RFC 5578)
Subnet convergence function: flow control is further illustrated in FIG. 36 in which HART:
  Prevents radio buffer overrun and packet loss due to head-of-line blocking
  Sends at rate matched to receiver capability
    Token-bucket scheme
    Window-based control
Subnet convergence function: traffic redirection is illustrated in FIG. 37 in which:
  HART provides redirection of an IP packet flow to a different next-hop than the current one for load balancing or for traffic-aware routing
  Flow redirection based source and destination addresses of IP packets
Subnet convergence function: traffic redirection is further illustrated in FIG. 38 in which:
  Transit Router Decision
    Route Through Default
    Route Through Alternate
    Redirect To Alternate
Quality of service (QoS) aware unicast routing service is illustrated in FIG. 39 in which:
  Interconnection of radio IP subnets into one HART network
  OSPF-based core routing protocol for unicast routing over inter-router virtual links
  Maintenance of multiple metrics per virtual link
  Multiple routing tables, one per routing metric
  Link-aware route selection
  Traffic-aware route selection
And in FIG. 40 in which:
  Linux kernel router
  OSPF overlay network of HART routers
  Quagga router control daemons
  Kernel routing tables for each traffic class
    Latency-sensitive
    Latency-tolerant
  Use OSPF TOS-specific Link State Advertisements (LSAs)
  Tag traffic with DSCP/TOS fields of IP frame
Mobility-management function is illustrated in FIG. 41 in which:
  a. Enable subnet-hopping of HART endpoints
  b. Automatic detection of current radio subnet
  c. Automatic selection of subnet-specific address for the endpoint
  d. Mobility registry providing mapping between portable address of endpoint and its current subnet-specific address
  e. AODV-based mechanism to enable routing to portable addresses in case the mobility registry is unreachable
And FIG. 42 in which:
  HART "portable" IP address
  Reachable on any subnet for which it has been configured
  HART routers maintain reachability information about "portable" address to subnet-specific address mapping
  Mobility registry maintains mapping between portable and subnet-specific addresses
  Mobility registry "beacons" its presence using network-wide multicast
  Transit router periodically registers the portable and subnet-specific addresses of nodes resident on any of its subnets
  Transit router consults mobility registry if it does not have a mapping between the portable address and subnet-specific address for a packet it is forwarding
  If the mobility registry is not reachable, the transit router invokes AODV to resolve the portable address of a packet
Load-balancing function is illustrated in FIG. 43 in which:
  Network-optimized data transport
  Distribution of traffic exiting an IP subnet across multiple egress links, if applicable
And in FIG. 44 in which:
  Linux 'tc' traffic shaper
  Quagga 'equal-cost multi-path routing' feature
Quality of Service (QoS) Overview
  Goal to deliver predictable data services
  Important for providing reliable services that are sensitive to bandwidth, latency and error rate
    Voice
    Video
  Defined by a set of parameters that describe service level
    Bandwidth
    Buffer usage
    Delay
    etc
Quality of Service (QoS) Overview
  HART Black side QoS
    DiffServ with DSCP translation between domains
  KG-250X can provide Red side QoS
    Red side service level maps to Black side DSCP
    End-to-end QoS with HART
  SRS complete, design in progress
  Red Side QoS Design
  Integrated Services: Flow-based service level guarantees via RSVP
    Red flow source and destination hosts initiate RSVP exchange
    All Red side routers, including KG-250X, participates in the RSVP exchange
    Establishes guaranteed level of service for the flow, or fails
  Source host can try again for a lower level of service
  Test AE (illustrated in FIG. 45) creates redundant paths between subnetworks within the network. One of the paths is impaired to exercise the router's ability to switch to the "better" redundant link.
    Creates redundant paths between subnetworks within the HART network
    One of the paths is impaired to exercise routers' ability to switch to the "better" redundant link
  Test AF, illustrated in FIG. 46, simplifies test description by eliminating IP addressing specifics, recreates redundant links and verifies load balancing enabling multicast efficiency.
    Simplifies test description by eliminating IP addressing specifics
    Recreates redundant links
    Verifies load balancing, multicast efficiency
  Test AG, illustrated in FIG. 47, is network aware and traffic aware.

Network Aware:
a. Automatically configured network communication, without manual configuration, between/among networks having differing IP protocols
   i. Hybrid routing with address switching
   ii. Multi-cast video feed
Traffic Aware
a. Choose network route, over a network having a paths with a plurality of intermediate nodes, based, at least in part, on the type of traffic/message
   i. E.g., file transfer: choose route having a relatively high bandwidth
   ii. E.g., talk: choose route having relatively low latency
b. Multiple routing tables based on different metrics
   i. E.g., Table I: based on bandwidth
   ii. E.g., Table II: based on latency
c. IP header marked with type of traffic
   i. Uses the routing table based on the type of traffic
Pro-Active Failover
a. Autonomous quality aware routing
b. Switch from existing route to a new route prior to network communication failure
   i. i.e., before communication is lost
   ii. built-in fault tolerance
c. If link (route) quality factor degrades below a [predetermined] threshold, then switch route before communication is lost
   i. E.g., miss two packets but one packet gets through
d. Monitor quality of each individual link
e. Detect and remember packet loss
Load Balancing
a. Apportions traffic over different routes based on [overall] network load, not just on an individual message
   i. Helps reduce network clogging
   ii. May result in a longer route for an individual message or some messages but [overall] network performance improves for all or more users

APPENDIX A: TARGET IP RADIOS, DEVICES AND TECHNOLOGIES TO INTEGRATE

Primary Integration Technologies:
TTNT: Tactical Targeting Network Technology
IP Support: yes, radios provide IP support externally, and internally route at the lower network and mac layers
Config API (read): SNMP
Config API (write): SNMP
Used for: Waveform developed for JTRS (Joint Tactical Radio System) for airborne networking. Similar to ANW (Airborne Networking Waveform). Used for MIDS (Multi-functional Information Distribution System) data traffic as well as other TCP/IP network traffic
Mini-CDL: Miniature CDL Radio
IP Support: yes, provides point-to-point links, used to create IP bridges
Config API (read): custom API
Config API (write): custom API
Used for: Video and data links from mini and micro UAVs and UASes.
NOTE: CDL waveform is not currently compatible with JTRS radios and cannot be used on them
Background: Subset of CDL (Common Data Link) radio family, smaller form factor. CDL Family:
TP-CDL: Team Portable CDL
TCDL—Tactical Common Data Link. Used for: N-CDL, USQ-123, ATARS, BGPHES, CHBDL, SHARP, TIGDL I/II
N-CDL: Networked CDL
TIGDL-II: Tactical Interoperable Ground Data Link II(2)
MR-TCDL: Multi-Role Tactical CDL [ABE: Auxiliary Bandwidth Efficient; and Discovery]
WiMax: Worldwide Interoperability for Microwave Access
Config API (read): SNMP
Config API (write): SNMP
Used for: as a generic test radio (Similar properties to TTNT)
FSO: Free Space Optical
Config API (read): assumed SNMP
Config API (write): assumed SNMP
Used for: high bandwidth point-to-point links
JCAN: Joint Capability for Airborne Networking subnets
Config API (read): BGP (BGP-MX) & SNMP
Config API (write): BGP (BGP-MX) & SNMP
Used for: Integrating legacy data links via an airborne gateway node
ORCA: Optical RF Communications Adjunct
Config API (read): assumed SNMP
Config API (write): assumed SNMP
Used for: Hybrid Optical and RF link (DARPA)
BACN: Battlefield Airborne Communications Node
Config API (read): BGP (BGP-MX) & SNMP
Config API (write): BGP (BGP-MX) & SNMP
Used for: Integrating legacy data links via an airborne gateway
Other Integration Technologies
QNT: Quint Networking Technology
Config API (read): assumed SNMP
Config API (write): assumed SNMP
Used for: UASs, munitions
ANW: Airborne Networking Waveform
Config API (read): assumed SNMP
Config API (write): assumed SNMP
Background: Waveform developed for JTRS (Joint Tactical Radio System) for airborne networking. Similar to TTNT (Tactical Targeting Network Technology). Used for MIDS (Multi-functional Information Distribution System) data traffic as well as other TCP/IP network traffic
aADNS: Airborne Automated Digital Network System
Config API (read): assumed SNMP
Config API (write): assumed SNMP
ASSDL: Airborne Single Slot Data Link
Config API (read): assumed SNMP
Config API (write): assumed SNMP
GBS/TGRS: Global Broadcast Service
Config API (read): assumed SNMP
Config API (write): assumed SNMP
Uses: TGRS: Transportable ground receive suite for GBS
MUOS: Mobile User Objective System
Config API (read): assumed SNMP
Config API (write): assumed SNMP
Used for: JTRS waveform for SatCom (BLOS)
SRW: Soldier Radio Waveform
Config API (read): assumed SNMP
Config API (write): assumed SNMP
Used for: JTRS waveform
WNW: Wideband Networking Waveform
Config API (read): assumed SNMP
Config API (write): assumed SNMP
Used for: JTRS waveform
Uses: OFDM, BEAM, AJ, LPI/D
CMDL: Compact Multi-band Data Link
Config API (read): assumed SNMP Config API (write): assumed SNMP
SNR: Subnet Relay
Config API (read): assumed SNMP
Config API (write): assumed SNMP
Used for: ad hoc for maritime RF
Uses: HFIP (IP over HF [High Frequency—3 to 30 MHz])
TSAT: Transformational Satellite Communications System
  Config API (read): assumed SNMP
  Config API (write): assumed SNMP
  Used for: Used for: HC3 (2)
HNW: Highband Network Waveform
  Config API (read): assumed SNMP
  Config API (write): assumed SNMP
  Used for: HNR: Highband Network Radio, and WIN-T Waveform. WIN-T (Warfighter Information Network-Tactical)
NCW: Network-Centric Waveform
  Config API (read): assumed SNMP
  Config API (write): assumed SNMP
  Used for: WIN-T Waveform. WIN-T (Warfighter Information Network-Tactical)
DISN: Defense Information System Network
  Config API (read): BGP (BGP-MX) & SNMP
  Config API (write): BGP (BGP-MX) & SNMP
  Used for: NIPRnet (Non-Classified IP Router Network), SIPRnet (Secret IP Router Network)

APPENDIX B: USE CASES OF HART BEHAVIOR

Use Case 1: Mixed HART Routers (TTNT, SatCom, and Mini-CDL)
  Initial Setup
  Definitions of some terms in the figures:
  HART-Edge Router: No Routing, endpoint node only (little/no storage)
  HART-Interim Router: Routing, maintains tables for routing (to and from), may include storage
  HART-Gateway Router: Routing, Provides links to external and/or non-tactical networks (GIG, Internet, etc.)
  Alias-tag Tables:
    H: number of hops
    L: Latency
    B: Bandwidth
  Initial setup process (FIG. 48):
  HG1 detects GIG and declares "I'm a gateway router"
    Broadcasts itself as "default route" to GIG.
  HG2 detects GIG and declares "I'm a gateway router"
    Broadcasts itself as "default route" to GIG.
  HI1 detects no GIG and declares "I'm an Interim router" (default)
    Receives "default route" from JALN (HG1 and HG2, for specified subnets)
  HI2 detects no GIG and declares "I'm an Interim router" (default)
    Receives "default route" from JALN (HG1 and HG2, for specified subnets)
    Becomes "default router" for TTNT radio subnet to link them to GIG (thru JALN)
  Node Joins a Mixed HART network
  When a Node Joins (FIG. 49)—Step 1:
  Establish each link from that node to the existing network
  Add alias-tags at various endpoints in the network to enable label switching (faster than routing) (This is the HART Dynamic DNS)
  Step 2, FIG. 50:
  SatCom connects: Uses fixed SatCom IP to connect to the other SatCom endpoint (12.1.4.8)
  HE1 adds an alias-tag for 17.0.0.0→12.1.4.8
  HG1 adds an alias-tag for 17.1.2.3→12.1.3.1
  Step 3, FIG. 51:
  First Mini-CDL Radio connects
  Establishes "link local" addresses on both endpoints
  Step 4, FIG. 52:
  HE1 adds an alias-ta2 for 17.0.0.0→224.1.1.1
  HG1 adds an alias-tag for 17.1.2.3→224.1.1.2
  Step 5, FIG. 53:
  Second Mini-CDL Radio connects
    Establishes "link local" addresses on both endpoints
    HI1 requests 224.1.1.2 first, but HE1 already is using, so responds with 224.1.1.3
  Step 6, FIG. 54:
  HE1 adds an alias-tag for 17.0.0.0→224.1.1.1
  HI1 adds an alias-tag for 17.1.2.3→224.1.1.3
  Step 7, FIG. 55:
  HI1 forwards alias-tag to HG1, HG1 adds it as: 17.1.2.3→10.1.2.1
  HI1 adds reverse alias-tag
  Step 8, FIG. 56:
  TTNT Radio connects
    Uses fixed TTNT IP to connect to the TTNT cloud
    Finds default router in TTNT cloud (HI2)→sets default router to HI2
  Step 9, FIG. 57:
  HE1 adds an alias-tag for 17.0.0.0→10.71.103.2
  HI2 adds an alias-tag for 17.1.2.3→10.77.91.1
  Step 10, FIG. 58:
  HI2 forwards alias-tag to HG1: 17.1.2.3→10.2.2.1
  HI2 adds reverse alias-tag
  Completed Table Entries are illustrated in FIG. 59:
  Packet Routing, Rerouting and Return
  Routing Step 1 (FIG. 60):
  Packet leaves H2
    Packet: Src=19.1.2.3; Dst=17.1.2.3; Data
    H2→GIG→HG1
  Routing Step 2 (FIG. 61):
  HG1 looks up H1
    Next hop=224.1.1.2(M-CDL): <=1 hop→no label switching
    Packet: Src=19.1.2.3; Dst=17.1.2.3; Data
    HG1→M-CDL→HE1
  Routing Step 3 (FIG. 62):
  HE1 receives
    Packet: Src=19.1.2.3; Dst=17.1.2.3; Data
    HE1→H1
  Error occurs in M-CDL1 link (FIG. 63):
  Re-Routing Step 1 (FIG. 64):
  HG1 looks up H1
    Next hop=10.1.2.1(JALN): 2 hop→label switching
    Packet: Src=19.1.2.3; Dst=10.1.2.1 (JALN); Dst'=17.1.2.3; Data
    HG1→JALN→HI1
  Re-Routing Step 2 (FIG. 65):
  HI1 looks up HI
    Next hop=224.1.1.3(M-CDL): <=1 hop→no label switching
    Restore packet: Src=19.1.2.3; Dst=17.1.2.3; Data
    HG1→M-CDL→HE1
  Re-Routing Step 3 (FIG. 66):
  HE1 receives
    Packet: Src=19.1.2.3; Dst=17.1.2.3; Data
    HE1→H1

Return Path (FIG. 67):
Packet leaves H1
    Packet: Src=17.1.2.3; Dst=19.1.2.3; Data
    H1→HE1
HE1 looks up H2
    Next hop=224.1.1.1(M-CDL2)
    2 hop→label switching
    Packet: Src=17.1.2.3; Dst=224.1.2.1 (JALN); Dst=19.1.2.3; Data
    HE1→M-CDL2→HI1
HI1 looks up H2
    Next hop=10.3.2.1(JALN)
    <=1 hop→no label switching
    Restore Packet: Src=17.1.2.3; Dst=19.1.2.3; Data
    HI1→JALN→HG1
HG1 receives
    Packet: Src=17.1.2.3; Dst=19.1.2.3; Data
    HG1→GIG→H2
Use Case 2: Node Moves from One TTNT Subnet to Another TTNT Subnet
    Initial Setup (FIG. 68):
    All nodes start at "I'm an Interim router" (default)
    Platforms 1, 3 &5 all detect no GIG, so keep: "I'm an Interim router"
        TTNT addresses are fixed, use in name exchanges
        Start exchanging name with other HART routers to build alias tables
            Platform 1 alias table:
                To get to "Platform 3" send out local-TTNT to "TTNT-P3"
                To get to "Platform 2" send out local-TTNT to "TTNT-P2"
            Platforms 3 and 5 follow similar table entries
    Platforms 2 & 4 detect GIG and change from "interim" to: "I'm a gateway router"
        GIG found through SatCom
            Platform 2 becomes TTNT gateway for top TTNT cloud (1, 2, 3, others) (Figure B-21)
            Platform 4 becomes TTNT gateway for bottom TTNT cloud (4, 5, others) (FIG. 68)
        Set Default route entry to:
            To get to "GIG/Default" send out local-SatCom to "remote-SatCom-Hub"
        TTNT addresses are fixed, use in name exchanges (include "I'm default router")
        Start exchanging name with other HART routers to build alias tables
            Platform 1 alias table becomes:
                To get to "Platform 3" send out local-TTNT to "TTNT-P3"
                To get to "Platform 2" send out local-TTNT to "TTNT-P2"
                To get to "GIG/Default" send out local-TTNT to "TTNT-P2"
            Platforms 3 and 5 follow similar table entries
            Platform 2 alias table:
                To get to "Platform 3" send out local-TTNT to "TTNT-P3"
                To get to "Platform 1" send out local-TTNT to "TTNT-P1"
                To get to "GIG/Default" send out local-SatCom to "remote-SatCom-Hub"
            Platforms 4 follows similar table entries
        HART gateways exchange alias tables
            Platform 2 alias table adds:
                To get to "Platform 4" send out local-SatCom to "Satcom-P4"
                To get to "Platform 5" send out local-SatCom to "Satcom-P 4"
            Platform 4 alias table adds:
                To get to "Platform 1" send out local-SatCom to "Satcom-P 2"
                To get to "Platform 2" send out local-SatCom to "Satcom-P 2"
                To get to "Platform 3" send out local-SatCom to "Satcom-P 2"
Route a Packet from Platform 1 to Platform 3 (FIG. 68):
1. Packet leaves P1: Src=P1; Dst=P3; Data
    Send to P1-HART
2. @P1-HART
    Table lookup, P3 goes thru TTNT to address TTNT-P3
    Change packet: Src=P1; Dst=TTNT-P3; DstSv=P3; Data—swaps Dst to DstSv and sets next hop to TTNT-P3
    Goes out TTNT to TTNT-P3
3. TTNT-P3 forwards up to local Router (P3-HART)
4. @P3-HART: Src=P1; Dst=P3; Data—swaps DstSv back to Dst, forwards to P3
5. @P3: Src=P1; Dst=P3; Data
Route a Packet from Platform 1 to Platform 5 (FIG. 68):
1. Packet leaves P1: Src=P1; Dst=P3; Data
    Send to P1-HART
2. @P1-HART
    Table lookup, P5—not found, send to default
    Default goes thru TTNT to address TTNT-P2
    Change packet: Src=P1; Dst=TTNT-P2; DstSv=P5; Data—swaps Dst to DstSv and sets next hop to TTNT-P2
    Goes out TTNT to TTNT-P2
3. TTNT-P2 forwards up to local Router (P2-HART)
4. @P2-HART
    Table lookup, P5—found, send out SatCom to P4
    Change packet: Src=P1; Dst=Satcom-P4; DstSv=P5; Data—sets Dst to next hop to P4
    Goes out SatCom to Satcom-P4
5. Satcom-P4 forwards up to local Router (P4-HART)
6. @P4-HART
    Table lookup, P5 goes thru TTNT to address TTNT-P5
    Change packet: Src=P1; Dst=TTNT-P5; DstSv=P5; Data—swaps Dst to DstSv and sets next hop to TTNT-P5
    Goes out TTNT to TTNT-P5
7. TTNT-P5 forwards up to local Router (P5-HART)
8. @P5-HART: Src=P1; Dst=P5; Data—swaps DstSv back to Dst, forwards to P3
9. @P5: Src=P1; Dst=P5; Data
Use Case 3: Routing Data on a HART Network Using Replication and Load Balancing
Steps 1-3 (FIG. 69):
Data Packet stream leaves FS2
    Src=17.1.2.12; Dst=19.1.7.11
    FS2→H1
H1 looks up policy for data traffic:
    Load balance across 3 (M-CDL1, M-CDL2, A210)
    Redundant x2
H1 sends to H2
    Src=17.1.2.12; Dst=19.1.7.11
    Copy 1$^{st}$ packet to M-CDL1 and M-CDL2
    Copy 2$^{nd}$ packet to A210 and M-CDL1
    Copy 3$^{rd}$ packet to M-CDL2 and A210
    Repeat . . .
    H1→M-CDL(1,2) & A210→H2

H2 receives
    Src=17.1.2.12; Dst=19.1.7.11
    H2→GCS1
GCS1 receives
Link Fault while Routing Data Across the HART Network
In case of link failure, other links should pick up "slack" and connection will continue as is with no interruption (FIG. 70).

Routing Control Messages Across the HART Network Steps 1-4 (FIG. 71):
Control message Packets leave FS 1
    Src=17.1.2.11; Dst=19.1.7.12
    FS1→H1
H1 looks up policy (control message traffic):
    Send all packets across A210
    Replicate control packets across alternating SatCom links (WGS and Inmarsat).
H1 sends to H2
    Src=17.1.2.11; Dst=19.1.7.12
    Send all packets across A210
    Copy $1^{st}$ packet to WGS
    Copy $2^{nd}$ packet to Inmarsat
    Repeat . . .
    H1→A210/SatCom→H2
H2 receives
    Src=17.1.2.11; Dst=19.1.7.12
    H2→GCS2
GCS2 receives
Link Fault while Routing Control Messages Across the HART Network
In case of link failure, other links should pick up "slack" and the connection will continue as is, with no interruption (FIG. 72).

Glossary

AN: Airborne Network
API: Application Programming Interface
ARC: HARTs Autonomous Router Configuration
AS(es): Autonomous System(s)—a collection of connected Internet Protocol (IP) routing devices under one common network controller
AXP: Cisco Application Extension Platform, an add-on card installed in a Cisco router
BACN: Battlefield Airborne Communications Node
BGP: Border Gateway Protocol—Protocol used to route between Autonomous Systems
BGP-MX: Border Gateway Protocol
COTS: Commercial Off-the-Shelf
CT: Ciphertext—Black side of red/black network
DCI: HARTs Device Configuration Interface
DISN: Defense Information System Network
DNS: Domain Name Service
DSCP: DiffServ Code Point
FSOC: Free Space Optics Communications
GCS: Ground Control Station
GIG: Global Information Grid
GUI: Graphical User Interface
HAIPE(s): High Assurance Internet Protocol Encryptor—a Type 1 encryption device that complies with the National Security Agency's HAIPE IS (High Assurance Internet Protocol Interoperability Specification).
HART: Hybrid Autonomous Router for Tactical Networks
HART-E: HART-Edge Router
HART-G: HART-Gateway Router
HART-I: HART-Interior Router
HAS-flag: HART Address Switching flag
INE: Inline Network Encryptor—broad term for HAIPE-like devices
IP: Internet Protocol
JALN: Joint Aerial Layer Network
JCAN: Joint Capability for Airborne Networking subnets
LQM: Link Quality Metric
M-CDL: Mini-CDL
Mini-CDL: Miniature Common Data Link Radio
OSPF: Open Shortest Path First (OSPF) is an adaptive routing protocol for Internet Protocol (IP) networks.
PT: Plaintext—Red side of red/black network
QNT: Quint Networking Technology (QNT) program is a Defense Advanced Research Projects Agency-led (DARPA) technology program to produce a very small and modular digital communications system for a variety of ground and airborne applications.
RIP: Routing Information Protocol (RIP) is a distance-vector routing protocol, which employs the hop count as a routing metric.
SatCom: A Satellite Communication link
SNMP: Simple Network Management Protocol
TCP/IP: Transport Control Protocol for Internet Protocol, a collection of protocols for routing data on an IP network.
TAT: HART Topology and Address Tracking
TTNT: Tactical Targeting Network Technology
TRL: Technology Readiness Level
UAV: Unmanned Aerial Vehicle
UAS: Unmanned Aircraft Systems
WNW: Wideband Networking Waveform

What is claimed is:

1. A method of routing an Internet Protocol (IP) packet from a routing device comprising:
    receiving a first IP packet having a first IP header and a first IP data field, the first IP header having a final destination corresponding to a destination device communicatively coupled to the routing device via at least two parallel network links, the at least two parallel network links including a first network link communicatively coupling the routing device to a first device and a second network link communicatively coupling the routing device to a second device, wherein a destination address field of the first IP header includes an IP address for the destination device;
    sending a second IP packet having a second IP header and a second IP data field over the first network link, wherein the second IP data field is identical to the first IP data field, wherein a destination address field in the second IP header includes an IP address for the first device, wherein the destination address field in the second IP header is the corresponding field to the destination address field in the first IP header; and
    sending a third IP packet having a third IP header and a third IP data field over the second network link, wherein the third IP data field is identical to the first IP data field, wherein a destination address field in the third IP header includes an IP address for the second device;
    wherein the destination address field in the third IP header is the corresponding field to the destination address field in the first IP header.

2. The method of claim 1, comprising:
    receiving a fourth IP packet having a fourth IP header and a fourth IP data field, the fourth IP header having a final destination corresponding to the destination device, wherein a destination address field of the fourth IP header includes an IP address for the destination device;

determining whether the fourth IP packet is a type to be replicated;

if the fourth IP packet is a type to be replicated, sending replicated IP packets by:

sending a fifth IP packet having a fifth IP header and a fifth IP data field over the first network link, wherein the fifth IP data field is identical to the fourth IP data field, wherein a destination address field in the fifth IP header includes an IP address for the first device, wherein the destination address field in the fifth IP header is the corresponding field to the destination address field in the fourth IP header; and sending a sixth IP packet having a sixth IP header and a sixth IP data field over the second network link, wherein the sixth IP data field is identical to the fourth IP data field, wherein a destination address field in the sixth IP header includes an IP address for the second device, wherein the destination address field in the sixth IP header is the corresponding field to the destination address field in the fourth IP header; and if the fourth IP packet is not a type to be replicated, sending a non-replicated IP packet by sending a seventh IP packet over one of the at least two parallel network links without sending a replicated IP packet over any of the at least two parallel network links.

3. The method of claim 2, wherein determining whether the fourth IP packet is a type to be replicated includes determining whether at least one of the differentiated services code point (DSCP) or protocol ID field of the fourth IP packet matches a DSCP or protocol ID for a replicated IP packet type;

if at least one of the DSCP or protocol ID fields matches a DSCP or protocol ID field for a replicated IP packet type, sending the replicated IP packets; and if neither the DSCP or protocol ID fields matches a DSCP or protocol ID field for a replicated IP packet type, sending the non-replicated IP packet.

4. The method of claim 1, comprising:

receiving a plurality of subsequent IP packets from a data flow of the first IP packet, wherein the at least two parallel network links include at least three parallel network links;

sending a plurality of outgoing IP packets having IP data fields copied from a respective one of the plurality of subsequent IP packets; and load balancing the plurality of outgoing IP packets across the at least three parallel network links while also replicating each of the plurality of outgoing IP packets across distinct ones of the at least three parallel network links.

5. The method of claim 4, wherein load balancing the plurality of outgoing IP packets across the at least three parallel network links while also replicating each of the plurality of outgoing IP packets includes:

sending a first subset of the plurality of outgoing IP packets over the first network link and replicating each of the first subset of the plurality of outgoing IP packets over another of the at least three parallel links; and sending a second subset of the outgoing IP packets over the second network link and replicating each of the second subset of the plurality of outgoing IP packets over another of the at least three parallel links.

6. The method of claim 5, wherein replicating each of the first subset of the plurality of outgoing IP packets includes sending a replica of each of the first subset of the plurality of outgoing IP packets over a third network link of the at least three network links, wherein replicating each of the second subset of the plurality of outgoing IP packets includes sending a replica of each of the second subset of the plurality of outgoing IP packets over the third network link.

7. The method of claim 5, wherein load balancing the plurality of outgoing IP packets across the at least three parallel network links while also replicating each of the plurality of outgoing IP packets includes:

sending replicated IP packets over a pair of the at least three network links and rotating which of the at least three network links are in the pair.

8. The method of claim 1, comprising:

after receiving the first IP packet, receiving subsequent IP packets from a data flow of the first IP packet;

sending subsequent outgoing IP packets having IP data fields copied from the subsequent IP packets, wherein the second IP packet and the third IP packet are sent prior to sending any of the subsequent IP packets.

9. A routing module comprising:

a processor readable medium having software stored thereon, the software, when executed by one or more processing devices, configured to:

receive a first IP packet having a first IP header and a first IP data field, the first IP header having a final destination corresponding to a destination device communicatively coupled to the routing device via at least two parallel network links, the at least two parallel network links including a first network link communicatively coupling the routing device to a first device and a second network link communicatively coupling the routing device to a second device, wherein a destination address field of the first IP header includes an IP address for the destination device;

send a second IP packet having a second IP header and a second IP data field over the first network link, wherein the second IP data field is identical to the first IP data field, wherein a destination address field in the second IP header includes an IP address for the first device, wherein the destination address field in the second IP header is the corresponding field to the destination address field in the first IP header; and send a third IP packet having a third IP header and a third IP data field over the second network link, wherein the third IP data field is identical to the first IP data field, wherein a destination address field in the third IP header includes an IP address for the second device, wherein the destination address field in the third IP header is the corresponding field to the destination address field in the first IP header.

10. The routing module of claim 9, wherein the software is configured to:

receive a fourth IP packet having a fourth IP header and a fourth IP data field, the fourth IP header having a final destination corresponding to the destination device, wherein a destination address field of the fourth IP header includes an IP address for the destination device;

determine whether the fourth IP packet is a type to be replicated;

if the fourth IP packet is a type to be replicated, sending replicated IP packets by:

send a fifth IP packet having a fifth IP header and a fifth IP data field over the first network link, wherein the fifth IP data field is identical to the fourth IP data field, wherein a destination address field in the fifth IP header includes an IP address for the first device, wherein the destination address field in the fifth IP header is the corresponding field to the destination address field in the fourth IP header; and send a sixth IP packet having a sixth IP header and a sixth IP data field over the second network link, wherein the sixth IP data field is identical to the fourth IP data field, wherein a destination address field in the sixth IP header includes an IP address for the second device, wherein the destination address field in the sixth IP header is the corresponding field to the destination address field in the fourth IP header; and if the fourth IP packet is not a type to be replicated, send a non-replicated IP packet by sending a seventh IP packet over one of the at least two parallel network links without sending a replicated IP packet over any of the at least two parallel network links.

11. The routing module of claim 10, wherein determine whether the fourth IP packet is a type to be replicated includes determine whether at least one of the differentiated services code point (DSCP) or protocol ID field of the fourth IP packet matches a DSCP or protocol ID for a replicated IP packet type;

wherein the software is configured to:
if at least one of the DSCP or protocol ID fields matches a DSCP or protocol ID field for a replicated IP packet type, send the replicated IP packets; and
if neither the DSCP or protocol ID fields matches a DSCP or protocol ID field for a replicated IP packet type, send the non-replicated IP packet.

12. The routing module of claim 9, wherein the software is configured to:
receive a plurality of subsequent IP packets from a data flow of the first IP packet, wherein the at least two parallel network links include at least three parallel network links;
send a plurality of outgoing IP packets having IP data fields copied from a respective one of the plurality of subsequent IP packets; and
load balance the plurality of outgoing IP packets across the at least three parallel network links while also replicating each of the plurality of outgoing IP packets across distinct ones of the at least three parallel network links.

13. The routing module of claim 12, wherein load balance the plurality of outgoing IP packets across the at least three parallel network links while also replicating each of the plurality of outgoing IP packets includes:
send a first subset of the plurality of outgoing IP packets over the first network link and replicate each of the first subset of the plurality of outgoing IP packets over another of the at least three parallel links; and
send a second subset of the outgoing IP packets over the second network link and replicate each of the second subset of the plurality of outgoing IP packets over another of the at least three parallel links.

14. The routing module of claim 13, wherein replicate each of the first subset of the plurality of outgoing IP packets includes send a replica of each of the first subset of the plurality of outgoing IP packets over a third network link of the at least three network links,
wherein replicate each of the second subset of the plurality of outgoing IP packets includes sending a replica of each of the second subset of the plurality of outgoing IP packets over the third network link.

15. The routing module of claim 13, wherein load balance the plurality of outgoing IP packets across the at least three parallel network links while also replicate each of the plurality of outgoing IP packets includes:
send replicated IP packets over a pair of the at least three network links and rotate which of the at least three network links are in the pair.

16. The routing module of claim 9, wherein the software is configured to:
after receiving the first IP packet, receive subsequent IP packets from a data flow of the first IP packet;
send subsequent outgoing IP packets having IP data fields copied from the subsequent IP packets,
wherein the second IP packet and the third IP packet are sent prior to sending any of the subsequent IP packets.

17. The routing module of claim 9, wherein the routing module is an add-on card for a router.

18. The routing module of claim 9, wherein the routing module is a program product.

19. A routing device comprising:
a processor readable medium having software stored thereon, the software, when executed by one or more processing devices, configured to:
receive a first IP packet having a first IP header and a first IP data field, the first IP header having a final destination corresponding to a destination device communicatively coupled to the routing device via at least two parallel network links, the at least two parallel network links including a first network link communicatively coupling the routing device to a first device and a second network link communicatively coupling the routing device to a second device, wherein a destination address field of the first IP header includes an IP address for the destination device;
send a second IP packet having a second IP header and a second IP data field over the first network link, wherein the second IP data field is identical to the first IP data field, wherein a destination address field in the second IP header includes an IP address for the first device, wherein the destination address field in the second IP header is the corresponding field to the destination address field in the first IP header; and
send a third IP packet having a third IP header and a third IP data field over the second network link, wherein the third IP data field is identical to the first IP data field, wherein a destination address field in the third IP header includes an IP address for the second device, wherein the destination address field in the third IP header is the corresponding field to the destination address field in the first IP header.

20. The routing device of claim 19, wherein the software is configured to:
receive a fourth IP packet having a fourth IP header and a fourth IP data field, the fourth IP header having a final destination corresponding to the destination device, wherein a destination address field of the fourth IP header includes an IP address for the destination device;
determine whether at least one of the differentiated services code point (DSCP) or protocol ID field of the fourth IP packet matches a DSCP or protocol ID for a replicated IP packet type;
if at least one of the DSCP or protocol ID fields matches a DSCP or protocol ID field for a replicated IP packet type, sending replicated IP packets by:

send a fifth IP packet having a fifth IP header and a fifth IP data field over the first network link, wherein the fifth IP data field is identical to the fourth IP data field, wherein a destination address field in the fifth IP header includes an IP address for the first device, wherein the destination address field in the fifth IP header is the corresponding field to the destination address field in the fourth IP header; and send a sixth IP packet having a sixth IP header and a sixth IP data field over the second network link, wherein the sixth IP data field is identical to the fourth IP data field, wherein a destination address field in the sixth IP header includes an IP address for the second device, wherein the destination address field in the sixth IP header is the corresponding field to the destination address field in the fourth IP header; and if neither the DSCP or protocol ID fields matches a DSCP or protocol ID field for a replicated IP packet type, send a non-replicated IP packet by sending a seventh IP packet over one of the at least two parallel network links without sending a replicated IP packet over any of the at least two parallel network links.

* * * * *